United States Patent
Zoken et al.

(10) Patent No.: US 11,472,234 B2
(45) Date of Patent: Oct. 18, 2022

(54) MESH REGISTRATION SYSTEM AND METHOD FOR DIAGNOSING TREAD WEAR

(71) Applicant: TireAudit.com, Inc., San Rafael, CA (US)

(72) Inventors: Jack M. Zoken, San Rafael, CA (US); Alper Yilmaz, Lewis Center, OH (US)

(73) Assignee: Tireaudit.com, Inc., San Rafael, CA (US)

( * ) Notice: Subject to any disclaimer, the term of this patent is extended or adjusted under 35 U.S.C. 154(b) by 17 days.

(21) Appl. No.: 16/983,743

(22) Filed: Aug. 3, 2020

(65) Prior Publication Data

US 2021/0101414 A1 Apr. 8, 2021
US 2022/0144019 A9 May 12, 2022

Related U.S. Application Data

(63) Continuation-in-part of application No. 16/279,193, filed on Feb. 19, 2019, now Pat. No. 10,789,773, (Continued)

(51) Int. Cl.
*B60C 11/24* (2006.01)
*G01B 11/22* (2006.01)
(Continued)

(52) U.S. Cl.
CPC ............ *B60C 11/243* (2013.01); *G01B 11/22* (2013.01); *G01M 17/027* (2013.01); *G06T 7/001* (2013.01); *G06T 7/60* (2013.01)

(58) Field of Classification Search
CPC ..... B60C 11/243; B60C 11/246; G01B 11/22; G01B 11/24; G01M 17/027; G06T 7/001;
(Continued)

(56) References Cited

U.S. PATENT DOCUMENTS 5,054,918 A * 10/1991 Downing ............ G01B 11/2504
33/203.11
5,245,867 A * 9/1993 Sube ...................... G01B 11/22
73/146

(Continued)

FOREIGN PATENT DOCUMENTS

CH 2976090 12/2012
CN 101435744 10/2011
(Continued)

OTHER PUBLICATIONS

U.S. Appl. No. 10/247,543, filed Apr. 2, 2019, Rhoades.
(Continued)

*Primary Examiner* — Roy M Punnoose
(74) *Attorney, Agent, or Firm* — Dunlap Codding, P.C.

(57) ABSTRACT

An automated tread analysis system and methods for using are described. The automated tread analysis system may include a sensing system having a plurality of cameras providing a plurality of sequential two-dimensional images. The automated tread analysis system may also include an analysis system configured to provide at least one surface model of a first object via photogrammetry using the plurality of sequential two-dimensional images. The automated tread system may execute processing software reading data corresponding to the at least one surface model of the first object. The surface model may correspond to a current condition of the first object. The processing software executed by the user system may analyze the at least one surface model of the first object and provide at least one indicative wear metric based on the analysis of the surface model of the first object.

18 Claims, 50 Drawing Sheets

Related U.S. Application Data which is a continuation-in-part of application No. 15/451,124, filed on Mar. 6, 2017, now Pat. No. 10,247,641.

(60) Provisional application No. 62/742,407, filed on Oct. 7, 2018, provisional application No. 62/631,830, filed on Feb. 18, 2018, provisional application No. 62/303,740, filed on Mar. 4, 2016.

(51) Int. Cl.
*G01M 17/02* (2006.01)
*G06T 7/00* (2017.01)
*G06T 7/60* (2017.01)

(58) Field of Classification Search
CPC ............ G06T 7/60; G06T 2207/30164; G06T 7/0006; G06T 7/579
USPC ........................................................ 356/630
See application file for complete search history.

(56) References Cited

U.S. PATENT DOCUMENTS

| | | | |
|---|---|---|---|
| 5,438,417 A | 8/1995 | Busch | |
| 5,485,406 A * | 1/1996 | Wada | G01M 17/027 73/146 |
| 6,094,215 A | 7/2000 | Sundahl | |
| 6,789,416 B1 | 9/2004 | Tracy | |
| 7,177,740 B1 | 2/2007 | Guangjun | |
| 8,037,744 B2 | 10/2011 | Hanada | |
| 8,498,467 B2 | 7/2013 | Bourgeois | |
| 8,600,192 B2 | 12/2013 | Liu | |
| 8,760,447 B2 | 6/2014 | Bendall | |
| 8,948,491 B2 | 2/2015 | Sekiguchi | |
| 9,002,063 B2 | 4/2015 | Joly | |
| 9,008,368 B2 | 4/2015 | Joly | |
| 9,123,112 B2 | 9/2015 | Vinciguerra | |
| 9,189,841 B2 | 11/2015 | Novel | |
| 9,239,274 B2 | 1/2016 | Joly | |
| 9,805,697 B1 | 10/2017 | Dorrance | |
| 9,953,411 B2 | 4/2018 | Bourgeois et al. | |
| 10,247,641 B2* | 4/2019 | Zoken | G01M 17/027 |
| 10,507,700 B2* | 12/2019 | Neau | G01B 11/24 |
| 10,789,773 B2* | 9/2020 | Zoken | G06T 7/60 |
| 2003/0218607 A1* | 11/2003 | Baumberg | G06T 7/30 345/419 |
| 2005/0057758 A1 | 3/2005 | Uehara | |
| 2005/0058333 A1 | 3/2005 | Kaneko | |
| 2005/0268707 A1 | 12/2005 | Dale, Jr. et al. | |
| 2006/0208902 A1* | 9/2006 | Brey | B60C 11/246 340/457.4 |
| 2007/0021669 A1 | 1/2007 | Miga et al. | |
| 2007/0295071 A1 | 12/2007 | Iwase | |
| 2009/0000370 A1 | 1/2009 | Lionetti | |
| 2009/0022393 A1 | 1/2009 | Bar-Zohar | |
| 2009/0040533 A1* | 2/2009 | Takahashi | G01B 11/2522 356/612 |
| 2009/0226073 A1* | 9/2009 | Honda | G06K 9/6255 382/141 |
| 2009/0272183 A1 | 11/2009 | Sukegawa | |
| 2010/0232681 A1 | 9/2010 | Fujieda | |
| 2010/0309309 A1 | 12/2010 | Bing | |
| 2011/0013823 A1 | 1/2011 | Joly | |
| 2011/0018999 A1 | 1/2011 | Joly | |
| 2011/0019903 A1 | 1/2011 | Joly | |
| 2011/0102550 A1 | 5/2011 | Daniel | |
| 2011/0246128 A1 | 10/2011 | Nicholson et al. | |
| 2012/0007956 A1 | 1/2012 | Joly | |
| 2012/0008148 A1 | 1/2012 | Pryce | |
| 2012/0081541 A1 | 4/2012 | Kang | |
| 2012/0086800 A1 | 4/2012 | Vladimirsky | |
| 2013/0002856 A1 | 1/2013 | Mizutani | |
| 2013/0128029 A1 | 5/2013 | Leobal | |
| 2013/0129182 A1 | 5/2013 | Noyel | |
| 2013/0201326 A1 | 8/2013 | Tsujii | |
| 2013/0258059 A1 | 10/2013 | Ma | |
| 2013/0266189 A1 | 10/2013 | Vinciguerra | |
| 2013/0266225 A1 | 10/2013 | Vinciguerra | |
| 2014/0043472 A1 | 2/2014 | Takahashi | |
| 2014/0132740 A1 | 5/2014 | Clark | |
| 2014/0232852 A1 | 8/2014 | Nobis | |
| 2014/0307941 A1 | 10/2014 | Zanella | |
| 2015/0035971 A1 | 2/2015 | Bogenschuetz | |
| 2015/0178412 A1 | 6/2015 | Grau | |
| 2015/0269792 A1 | 9/2015 | Wood | |
| 2015/0330773 A1* | 11/2015 | Uffenkamp | G01B 11/25 356/631 |
| 2016/0029006 A1* | 1/2016 | Zoken | H04N 13/221 348/50 |
| 2016/0033368 A1 | 2/2016 | Neau | |
| 2016/0069779 A1 | 3/2016 | Uffenkamp | |
| 2016/0221404 A1 | 8/2016 | Lee | |
| 2016/0343126 A1 | 11/2016 | Miller | |
| 2017/0030709 A1 | 2/2017 | Tanaka | |
| 2017/0160079 A1 | 6/2017 | Takebuchi | |
| 2017/0227942 A1 | 8/2017 | Thomson | |
| 2017/0254727 A1 | 9/2017 | Zoken | |
| 2020/0047569 A1* | 2/2020 | De Stasio | G01M 17/027 |

FOREIGN PATENT DOCUMENTS

| | | |
|---|---|---|
| FR | 2938330 | 5/2010 |
| FR | 2976090 | 12/2012 |
| JP | 2009115512 | 5/2009 |
| JP | 2009229439 | 10/2009 |
| WO | WO 2014/070156 | 5/2014 |
| WO | WO 2015/016888 | 2/2015 |
| WO | WO 2015/059457 | 4/2015 |

OTHER PUBLICATIONS

National Highway Traffic Safety Administration. 49 CFR Part 571. http://www.nhtsa.gov/cars/rules/rulings/TirePresFinal/safetypr.html, 2003.
Weismann, S, Sackman J. et al. (Jul. 2003). Extending the Lifespan of Tires: Final Report, Symplectic Engineering Corporation; and Institute for Transportation Studies University of California at Berkeley.
Vellequett, L. (Apr. 2, 2012). Quick Alignment Tool Bolster Profits. Automotive News. http://www.autonews.com/article/20120402/RETAIL07/304029984/quick-alignment-tool-bolsters-profits.
Tire Smart Fact Sheet, https://rma.org/fact-sheets, 2016.
How Safe are Worn Tires?, Consumer Reports. https://www.consumerreports.org/cro/2012/12/how-safe-are-worn-tires/index.htm, Apr. 2014.
Singh, S et al., Tire Pressure Maintenance—A Statistical Investigation. National Highway, Apr. 2009.
UK-wide survey of 340,000 tyres reveals over 10 million vehicles could be driven with an illegal tyre in 2016. Jul. 14, 2016. TyreSafe, https://www.tyresafe.org/media-centre/latest-news/uk-wide-survey-340000-tyres-reveals-10-million-vehicles-driven-illegal-tyre-2016/.
Torrey, W. et al., An Analysis of the Operational Costs of Trucking, American Transportation Research Institute. Sep. 2015.
Wheel Alignment Education Guide for Heavy Trucks, http://www.hunter.com/Portals/0/Media/995-T-2, 2006.
Under-inflated Tires Are No. Longer Just an Efficiency Issue: They Can Affect Your Safety Profile. Heavy Duty Trucking, http://www.truckinginfo.com/article/story/2011/07/under-inflated-tires-are-no-longer-just-an-efficiency-issue-they-can-affect-your-safety-profile.aspx, Jul. 6, 2011.
Choi, E., Tire-Related Factors in the Pre-Crash Phase, National Highway Traffic Safety Administration, https://crashstats.nhtsa.dot.gov/Api/Public/ViewPublication/811617, Apr. 2012.
Tire Dealer Profile, Modern Tire Dealer, http://www.moderntiredealer.com/uploads/stats/mtd-36-38.pdf, 2012.

(56) References Cited

OTHER PUBLICATIONS

Radial Tire Conditions Guide. A Comprehensive Review of Tread and Tire Wear Conditions. The Maintenance Council, American Trucking Association, Copyright 1994, The Maintenance Council.
Passenger and Light Truck Conditions Manual. Tire Industry Association, http://www.tia-lakin.pkcvmedia.com, 2010.
http://mustangforums.com/articles/tire-tech-what-does-your-tire-wear-tell-you/ Oct. 8, 2014.
Facts Issues 2015. Modern Tire Dealer.
US Dept of Transportation. http://www.rita.dot.gov/bts/sites/rita.dot.gov.bts/files/publications/national_transportation_statistics/html/table_01_11.html, 2014.
Kraus, K., Photogrammetry: Geometry from Image and Laser Scans. Walter de Gruyter, 2007.
Bodziak, William, Tire Impression and Tire Track Evidence: Recovery and Examination, CRC Press, 2008.
Federal Research Action Plan on Recycled Tire Crumb Used on Playing Fields and Playgrounds https://www.epa.gov/sites/production/files/2016-02/documents/federal_research_action_plan_tirecrumb_final_2, 2015.
WARM Version 13, EPA. https://www3.epa.gov/warm/pdfs/Tires, 2015.
Hunter promotes 'Shop of the Future' for building trust, TireBusiness Review, http://www.tirebusiness.com/article/20161103/NEWS/161109977/hunter-promotes-shop-of-the-future-for-building-trust, 2016.
The Art of Purchasing Quick Inspections, TireBusiness Review, http://www.tirereview.com/quick-inspections/, Dec. 1, 2015.
Garfield. H., Tire Guide, Tire Guides Inc., 1101 South Rogers Circle Suite 6, Boca Raton, FL, 2012.
Cohn, Al., Truck Tires: Rules and Regulations, Tire Review, http://www.tirereview.com/truck-tires-rules-regulations/, Oct. 16, 2013.
3D Tyre Measurements Technology from Sigmavision, http://www.sigmavision.com/ 3 D swath.
One Easy Step Customers simply drive over TreadSpec and the software does the rest, http://www.tireprofiles.com/treadspec/ -line scan.
Circumferential Tread Wear Imaging System—http://www.starrett.com/metrology/product-detail/Metrology-Equipment/Laser-Measurement/Tire-Industry/Tread-Wear-Imaging-System/CTWIST-PCR—lab based turntable laser.
Brake Pad Wear Patterns, http://www.phoenixfriction.com/t-disc-brake-pad-wear-patterns.
http://www.normreevesvw.com/signs-your-timing-belt-needs-replaced.
http://aviationmiscmanuals.tpub.com/TM-1-1500-204-23-1/css/TM-1-1500-204-23-1_153 pulley wear patterns.
https://www.motorsforum.com/tech/brake-pad-rotor-wear-pattern-25495-.
USPTO, International Search Report and Written Opinion Regarding PCT Application No. PCT/US17/20956, dated May 26, 2017.

* cited by examiner

MESH REGISTRATION SYSTEM AND METHOD FOR DIAGNOSING TREAD WEAR

CROSS-REFERENCE TO RELATED APPLICATION(S)

The present application is a continuation-in-part claiming the benefit of U.S. Ser. No. 16/279,193, filed on Feb. 19, 2019, which claims the benefit of U.S. Ser. No. 62/631,830, filed Feb. 18, 2018, and U.S. Ser. No. 62/742,407, filed Oct. 7, 2018, and is a continuation in part of U.S. Ser. No. 15/451,124, filed on Mar. 6, 2017, which claims the benefit of U.S. Ser. No. 62/303,740, filed Mar. 4, 2016, all of which are hereby incorporated by reference in their entirety.

BACKGROUND

Unevenly and overly worn tread on tires may reduce tire life and increase fuel consumption, besides being a hazard to drivers. Further, uneven wear on tire tread may waste tires and accelerate scrap growth creating stockpiles of tires posing a threat to public health, safety and the environment.

Many factors may cause such wear on tire tread including failure to rotate tires, underinflation of tires, alignment issues, and/or the like. It is estimated that tires may lose about 17.8 percent of their life potential due to underinflation. Factoring in the effects of misalignment and other issues, it is estimated that over a quarter of a tire's life may be lost due to uneven wear on tire tread amounting to approximately $37 in lost tread life per tire for over 300 million tires sold just in the United States. This adds up to over 11 billion dollars lost per year due to uneven wear on tire tread.

Despite the high cost of new tires, studies have shown that tires are not well maintained. The tire manufacturer trade association known as the Rubber Manufacturers Association (RMA) estimates that only 17 percent of people may be considered "Tire Smart" (i.e., understand basics of maintaining tires). Moreover, ten percent of U.S. motorists may drive on at least one bald tire with 50 percent of passenger vehicles estimated to be misaligned, and more than 50 percent of vehicles may be underinflated.

Overworn tires also may contribute to accidents. A study performed by the National Highway Traffic Safety Administration determined that tire-related crashes were more likely as tire tread wears. For example, the accident rate of a car was estimated at 2.4 percent with full tread depth compared to an accident rate of 26 percent when the tread is worn down (e.g., 0-2/32 inch depth). Underinflated tires may also be a risk. Tires underinflated by 25 percent may more than triple the occurrence of an accident.

Tread of tires is characterized by a surface with grooves and tread blocks. The tread blocks are designed to wear down over time, and thus the depths of the grooves may be an indicator of the nature of wear. The span and depth of a tire groove may relate to tracking the motion causing wear. Many tire related problems are assessed by a tire professional examining a latitudinal swath (i.e., cross-section) of a tire. The tread depth gauge is the lifeblood of a tire professional. For example, fleet managers use the tread depth gauge to capture ongoing (e.g., weekly, monthly) measurements of tread wear for trend analysis, diagnosis of surface wear, and/or the like. Tire dealers also use tread depth gauges when evaluating tires for replacement and/or servicing. Using a tread depth gauge to monitor tire wear, however, is error prone and may be difficult to read. Additionally, this measurement process may be dirty and place a user into contact with hazardous materials such as carbon black, a known carcinogen.

Tire impression forensics is the science of matching tire tracks to tire type. However, current practice is limited to the use of websites and a guide. For example, the Tire Industry Association (TIA) and the Technology & Maintenance Council (TMC) offer diagnostic guides that include characterizations of myriad different tire problems. Each tire problem includes a textual description of the issue with a sample photo, along with a recommended course of action. No tool currently exists in the marketplace, however, that provides the ability to electronically match worn tire tread track to tires and/or provide automatic tread identification.

Treadwear related diagnostics may be especially complicated to diagnose as tire tread may degrade in a three-dimensional (3D) pattern. Complicating the diagnostic issues, wear patterns may appear similar to one another, especially in early stages of wear. As such, a need exists for a system and method that provides an automated technique for three-dimensional analysis of tread wear.

BRIEF DESCRIPTION OF THE DRAWINGS

Several embodiments of the present disclosure are hereby illustrated in the appended drawings. It is to be noted however, that the appended drawings only illustrate several typical embodiments and are therefore not intended to be considered limiting of the scope of the present disclosure. Further, in the appended drawings, like or identical reference numerals or letters may be used to identify common or similar elements, and not all such elements may be so numbered. The figures are not necessarily to scale, and certain features and certain views of the figures may be shown as exaggerated in scale or in schematic in the interest of clarity and conciseness. Various dimensions shown in the figures are not limited to those shown therein and are only intended to be exemplary.

DETAILED DESCRIPTION

Figure 1A:
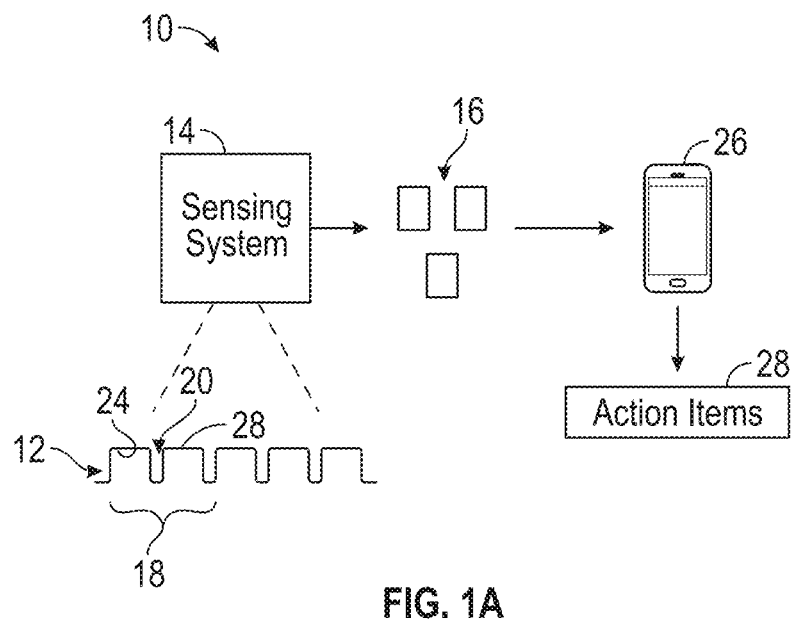
FIG. 1A is a block diagram of an exemplary automated tread registration system in accordance with the present disclosure.

The present disclosure describes an automated tread registration system for measuring and/or analyzing tread wear. The present disclosure describes in detail the automated mesh registration system in relation to tread on tires, however, the system and method as described herein may be applied to other fields of interest including, but not limited to, shoe tread, tooth enamel wear, and/or any physical surface having a raised pattern and/or cut pattern capable of wear (e.g., damage, erosion, frictional destruction and/or the like).

Tread may be characterized by a surface having grooves. The surface may wear down over time and/or with use, and thus, span and/or depth of the grooves (i.e., distance from surface) may be an indicator of wear, nature of wear, diagnosis of wear, and/or aid in analysis for one or more action items (e.g., change tire, rotate tire). For example, a racing slick tire may be designed without grooves to maximize traction. Predefined holes, however, positioned circumferentially around the tire may provide an indicator of wear.

Generally, one or more three dimensional scans (e.g., formed by a series of overlapping 2D images or a laser) may be captured to form one or more surface model of an object. In some embodiments, a baseline scan may be obtained to form one or more baseline surface models. For example, the baseline scan may be from a new tire (i.e., no or substantially limited wear). The baseline surface model may be compared against secondary surface models as the tire is used. For example, one or more secondary scans may be obtained after the tire has been used a predetermined amount of time or for a predetermined amount of mileage to provide one or more secondary surface models. The secondary surface models may be compared against the baseline surface models for analysis and/or determination of one or more metrics (e.g., wear metrics) and identification of one or more action items including, but not limited to, tire replacement, tire inflation, tire rotation, wheel alignment, and/or the like. Wear metrics may include, but are not limited to, camber wear, overinflation, underinflation, heel toe wear, toe wear, and/or the like. In some embodiments, multiple secondary surface models may be compared against each other for analysis and/or determination of one or more wear metrics and of one or more action items.

Groove positioning, groove direction, groove width, groove depth or other tire elements, may be used to register baseline scans with the secondary scans. In some embodiments, the baseline scan may be used to form a three dimensional model (e.g., surface model) of the new tire. Using the secondary surface model(s), one or more scaled description of contours associated with grooves in the tread of the tire may be extracted from the scan. Using a 2D view, for example, of the three dimensional model of the new tire, the two dimensional grooves of the scans may be registered. For example, for each secondary scan, a three-dimensional contour of varying width and/or depth may be produced in relation to each groove until the two dimensional groove (i.e., width only) matches width of the three-dimensional groove of the three dimensional model. Depth of the groove may then be determined. Comparison of the baseline scan and/or secondary scans taken at distinct instants of time may include a multiple step process.

In some embodiments, a convex hull of the three dimensional model may be created for the baseline scan and/or secondary scans using the two dimensional images used to create the three dimensional model. The three dimensional models resulting from the scans may then be oriented and aligned. Groove depth may be determined using the convex hull.

Before describing various embodiments of the present disclosure in more detail by way of exemplary descriptions, examples, and results, it is to be understood that the embodiments of the present disclosure are not limited in application to the details of systems, methods, and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the concepts of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims and/or the specification is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error that exists among the study subjects. Further, in this detailed description, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Further, an embodiment having a feature characterized by the range does not have to be achieved for every value in the range, but can be achieved for just a subset of the range. For example, where a range covers units 1-10, the feature specified by the range could be achieved for only units 4-6 in a particular embodiment.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Software may include one or more computer readable instructions that when executed by one or more components cause the one or more component to perform a specified function. It should be understood that algorithms or process instructions described herein may be stored on one or more non-transitory computer readable medium. Exemplary non-transitory computer readable medium may include random access memory, read only memory, flash memory, and/or the like. Such non-transitory computer readable mediums may be electrically based, optically based, and/or the like.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), and application specific integrated circuit (ASIC), field programmable gate array (FPGA), a combination of hardware and software, and/or the like. The term "processor" as used herein means a single processor or multiple processors working independently or together to collectively perform a task.

Certain exemplary embodiments of the invention will now be described with reference to the figures. In general, such embodiments relate to automated methods for three-dimensional analysis and identification of tire related issues. However, the system and methods described herein may be applicable to other fields of interest having tread and/or wearing of tread. For example, the comparison of current tread life to original tread life may be used in a number of application, in addition to tire wear, including, but not limited to, shoe tread, stair tread, framing hammer deterioration, rubber utility mat deterioration, pistol grip deterioration, plyer jaw deterioration, rifling (e.g., shell casing) deterioration, and/or the like. Other fields of interest may include mechanical wear related to brake pads, pulleys, timing belts, drill bits, razor blades, brake rotors, teeth (e.g., chemical wear and/or mechanical wear), and/or the like.

In another example, by comparing tread wear on sneakers or shoes, an orthopedist or podiatrist may be able to diagnose improper stride in a patient and be able to recommend corrective measures based on the nature of wear of the tread of the sneaker or shoe. While this may be done with a qualitative analysis, the quantitative methods, as described herein, may provide analysis of small incremental changes and trends that may be detected. As such, assessments may be made as to whether corrective measures currently being used are improving, hindering or stagnating the issues and/or whether additional or slight alterations may further improve remedies.

In another example, analysis of shoe tread may be developed in a similar manner as described herein related to tire tread analysis. Generally, a quantitative analysis of shoe tread may be developed and/or measured using the techniques described herein. For example, analysis of current tread patterns as compared to original tread patterns may be performed to identify alterations in depth and height of the treads, grooves between the three-dimensional model of the current tread and the original tread, deformations to the tread pattern caused by wear (e.g., by performing edge detection as described in further detail herein).

Referring to the Figures, and in particular to FIG. 1A, illustrated therein is a block diagram of an exemplary automated tread analysis system 10 in accordance with the present disclosure. Generally, the automated tread analysis system 10 may be configured to determine and/or analyze tread depth for one or more objects 12.

The automated tread analysis system 10 may include a sensing system 14 configured to provide one or more overlapping images 16 (e.g., scans) of the object 12, preferably taken from distinct and known capture locations. The object 12 (e.g., tire tread) generally includes one or more raised or cut patterns 18 having one or more grooves 20 (e.g., tire groove) and one or more protrusions 22 (e.g., tread block). The protrusions 22 may include one or more surfaces 24. For example, if a tire is the object 12, the protrusions 22 may be blocks of the tire (as known in the art), with the surface 24 of the protrusions 22 being a normalized surface.

Generally, the sensing system 14 may obtain and transmit the one or more images 16 to a user system 26 for determination of one or more surface models of the object 12, tread depth of the grooves 20, orientation of object 12 during use, registration of the object 12 using a baseline scan and/or a secondary scan as described in further detail herein, and/or the like. By analyzing variations in tread depth, orientation, registration and/or the like as described in further detail herein, the user system 26 may further identify one or more metrics (e.g., tread wear, camber wear, underinflation, overinflation, heel toe wear, and/or toe wear) and/or one or more actions items (e.g., rotate tires, provide new tire) based on the metric. The metric and/or the action items may be then provided in one or more reports 28.

The sensing system 14 may be any system configured to provide one or more images 16 of the object 12 showing grooves 20 and protrusions 22 of the object 12. For example, the sensing system 14 may include, but is not limited to, a laser scanning system (turntable/lab based and driveover systems), a high-density detector array (e.g., high density charge-couple device (CCD array), CMOS, array of photodetection elements coupled to an imaging lens, and/or the like. Resolution of the images 16 may be such that a three-dimensional model of the object 12 may be created from the images 16. It should be noted that the entirety of the object 12 need not be captured and/or modeled. For example, only a limited tire tread swath may be captured as reconstruction of the entire circumference of the tire may not be needed for diagnosis and/or action items. The size of the tire tread swath may be circumferentially long to enable orientation between images and registration as described in further detail herein. Additionally, the size of the tire tread swath may be based on particular diagnostics to be determined using the tire tread swath. For example, heel toe wear and toe alignment issues may be observed circumferentially, and as such, a longer swath may facilitate such measurement.

In some embodiments, the sensing system 14 may include one or more cameras mounted to and/or within the wheel well of an automobile. Cameras may be mounted in any direction such that each camera is able to provide one or more images 16 of the object 12 showing grooves 20 and protrusions 22 of the object 12. When multiple cameras are used, the cameras can be positioned to provide overlapping images such that stereoscopic image analysis can be used to triangulate relative locations of the object 12 in 3D space for creating surface model(s) of the object 12. In some embodiments, the sensing system 14 mounted to and/or within the wheel well may be configure to provide a circumferential view of the object 12 as the object 12 rotates about a fixed axis.

Figure 2:
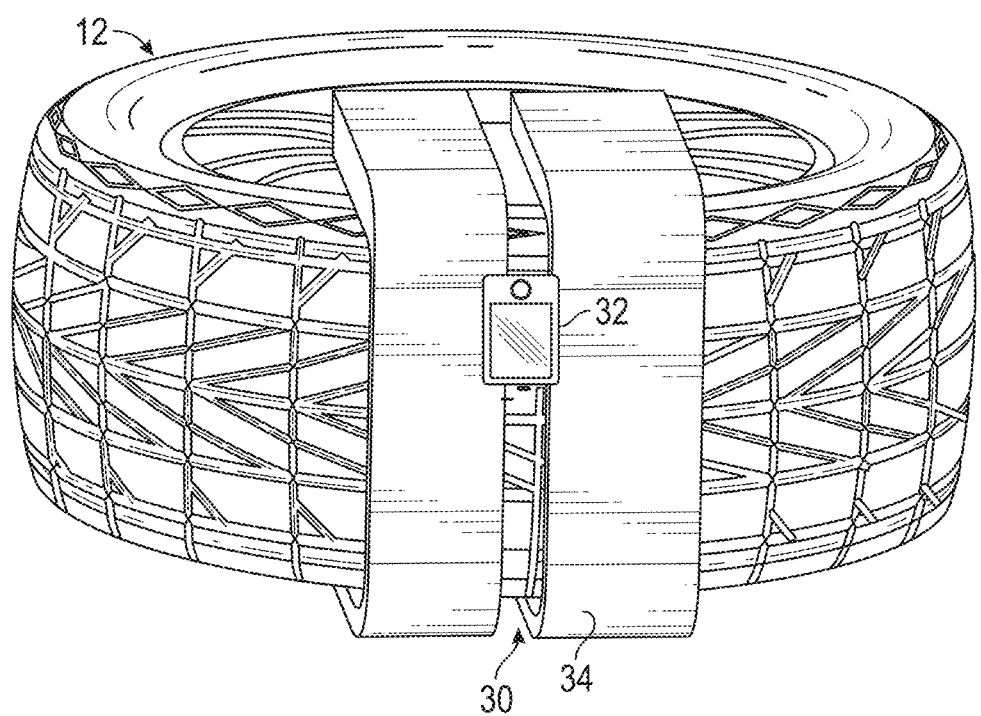
FIG. 2 is a perspective view of an exemplary sensing system for use in the automated tread registration system illustrated in FIG. 1A.
Figure 3:
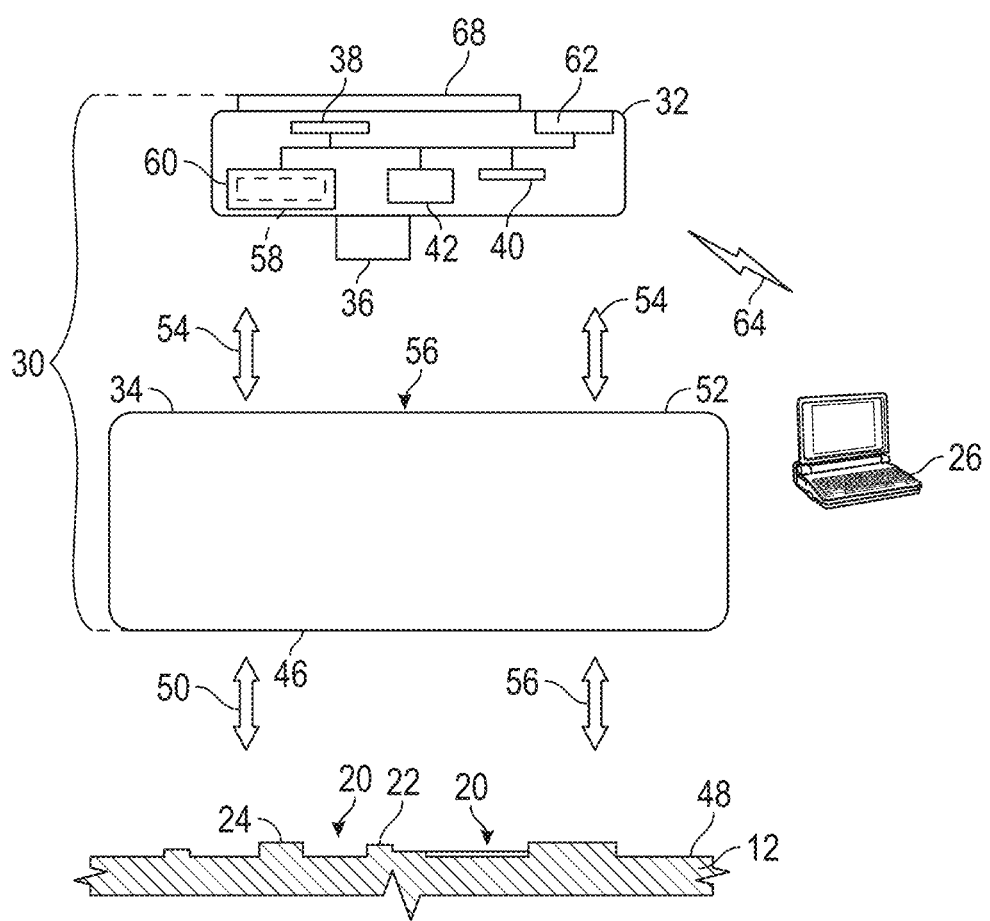
FIG. 3 is a diagrammatic view of the exemplary sensing system illustrated in FIG. 2.

FIGS. 2 and 3 illustrate an exemplary sensing system 14 for use in the automated tread analysis system 10 in accordance with the present disclosure. In some embodiments, the sensing system 14 may include an imaging, documenting and analyzing (IDA) system 30 further described in detail in U.S. Pat. No. 9,291,527, which is hereby incorporated by reference in its entirety. Generally, the IDA system 30 includes one or more digital imaging devices 32 and a guidance dolly 34. The digital imaging device 32 in conjunction with the guidance dolly 34 may be configured to acquire a plurality of sequential, overlapping, two-dimensional scans (e.g., images) of at least a portion of the object 12. The guidance dolly 34 may serve as an acquisition platform in that the digital imaging device 32 may be configured to move along a predefined trajectory and at a predefined spacing from the object 12 on the guidance dolly 34. The defined trajectory may include a linear path, a helical path, a spiral path, a fanciful path, and/or the like.

The digital imaging device 32 may include one or more lens 36, one or more image sensors 38, imaging device control circuitry 40, and a digital memory 42. The len(s) 36 may function to project the field of view onto the image sensor(s) 38. In some embodiments, the digital imaging device 32 may be a Smartphone having a single or multiple cameras. The image sensor(s) 38 may convert the field of view into a two-dimensional digitized image, and the imaging device control circuitry 40 may convert each two-dimensional digitized image 16 into a corresponding digital image file, as well-known in the relevant art. The digital memory 42 may be used for storing the acquired and converted digital image files.

As shown in FIG. 3, a dolly contact surface 46 may be configured to provide placement of the guidance dolly 34 into physical contact with a surface 48 of the object 12, as indicated by arrows 50. During operation, the digital imaging device 32 may be placed against a guidance surface 52, as indicated by arrows 54, for acquisition of digital images. Further, a guidance channel 56 extends between the guidance surface 52 and the dolly contact surface 46 such that the digital imaging device 32 may be able to image the object 12 from various positions on the guidance surface 52. The guidance channel 56 may also provide for insertion of the lens 36 for imaging devices wherein the lens 36 protrudes. As the digital imaging device 32 is positioned against the guidance surface 52 with the lens 36 positioned adjacent to or inside of the guidance channel 56, the guidance dolly 34 may function to maintain the digital imaging device 32 at a desired distance and/or orientation relative to the surface of the object 12.

The guidance dolly 34 may serve as the acquisition platform to provide a systematic way to acquire images 16 from the digital imaging device 32 when moving along a pre-defined trajectory. The predefined trajectory may enable extraction of an adequate sample of the object 12 and, in some embodiments, may provide for adequate photogrammetric angle separation (i.e., parallax) and image matching between successive image captures. The guidance dolly 34 may provide support at the surface of the object 12 so as to maximize stability of the digital imaging device 32 relative to the object 12, while images are being acquired.

In some embodiments, an IDA software application 58 within a software module 60 of the IDA system 30 may be capable of digitally converting the digital images 16 into one or more three dimensional data image files representative of the surface 48 of the object 12 (e.g., surface models). In some embodiments, conversion of the digital images 16 into one or more three dimensional data image files may be included within the user system 26. In some embodiments, the digital imaging device 32 may further include a wired or wireless communication module 62 (e.g., Bluetooth module), for communicating with the user system 26 via a network 64. The network 64 may be almost any type of network. For example, the network 64 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 64 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, combinations thereof, and/or the like. It is conceivable that in the near future, embodiments of the present disclosure may use more advanced networking topologies.

Once images 16 are acquired, the digital imaging device 32 and/or the user system 26 may function to generate a three-dimensional mesh (e.g., one or more surface models), in accordance with best videogrammetry practice. For example, software including, but not limited to 123D Catch available from Autodesk having a principal place of business in San Rafael, Calif., Photosynth available from Microsoft having a principal place of business in Redmond, Wash., and/or the like can be used to convert the images 16 into the three-dimensional mesh.

Figure 1B:
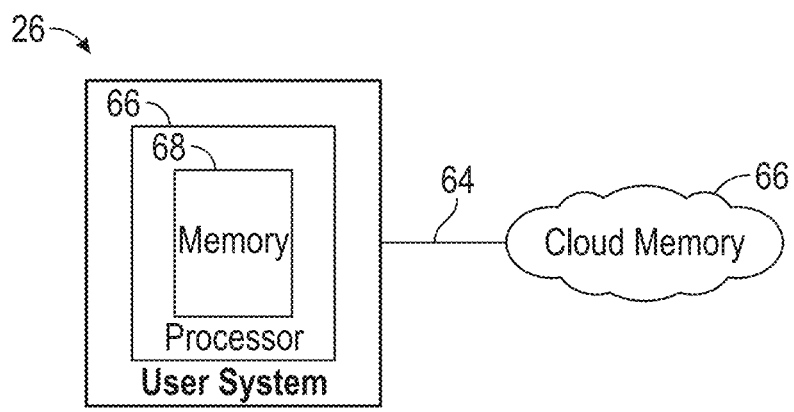
FIG. 1B is a block diagram of an exemplary user system for use in the automated tread registration system illustrated in FIG. 1A.

Referring to FIGS. 1A and 1B, the user system 26 may be capable of interfacing and/or communicating with the sensing system 14 via the network 64. The user system 26 may include, but is not limited to implementation as a variety of different types of computer systems, such as a server system having multiple servers in a configuration suitable to provide a commercial based business system (such as a commercial web-site and/or data center), a personal computer, a smart phone, a net-work capable television set, a tablet, an e-book reader, a laptop computer, a desktop computer, a network capable handheld device, a digital video recorder, a wearable computer, a ubiquitous computer, and/or the like.

Generally, the user system 26 may be implemented as a single or plurality of processors 66 working together, or independently to execute the logic as described herein. Exemplary processors 66 may include, but are not limited to, a digital signal processor (DSP), a central processing unit (CPU), a field programmable gate array (FPGA), a microprocessor, a multi-core processor, and/or combinations thereof, for example. It is to be understood, that in certain embodiments, using more than one processor 66, the processors 66 may be located remotely from one another, in the same location, or comprising a unitary multi-core processor. The one or more processors 66 may be capable of reading and/or executing processor executable code and/or capable of creating, manipulating, retrieving, altering, and/or storing data structures into one or more memories 68.

The one or more memories 68 may be capable of storing processor executable code. Additionally, the one or more memories 68 may be implemented as a conventional non-transitory memory, such as, for example, random access memory (RAM), a CD-ROM, a hard drive, a solid state drive, a flash drive, a memory card, an optical drive, combinations thereof, and/or the like, for example.

In some embodiments, the one or more memories 68 may be located in the same physical location as the one or more processors 66. Alternatively, the one or more memories 68 may be located in a different physical location and communicate via a network, such as network 64. Additionally, one or more of the memories 68 may be implemented as a "cloud memory" (i.e., one or more memories 68 may be partially or completely based on or accessed using a network).

The one or more memories 68 may store processor executable code and/or information comprising one or more databases and program logic (i.e., computer executable logic). In some embodiments, the processor executable code may be stored as a data structure, such as a database and/or data table, for example. For example, one of the databases can be an image database storing three dimensional models of tire swaths. In another example, one of the databases may store orientation information for tire swaths. In another example, one of the databases may store registration information for tire swaths. In some embodiments, each database may be linked and/or interconnected with one or more databases such that data between each database may be shared and/or incorporated into a single database.

The one or more processors 66 may be configured to receive input (e.g., from a user) and provide output (e.g., one or more reports). The user system 26 comprising the one or more processors 66 may include one or more non-transient memory comprising processor executable code and/or software applications, for example.

In some embodiments, the user system 26 may be a smartphone with the processor 66 configured to run one or more applications. The one or more application may be downloaded by a user to the user system 26. In some embodiments, the user system 26 may communicate with a server and/or cloud storage system when connected to a network (such as network 64. To that end, the user system 26 may be configured to run when disconnected and/or connected to the network.

Referring to FIGS. 1A, 1B, 4A and 4B, in use, the user system 26 may receive and/or capture one or more images 16 of the object 12 to collect information of the state of the object 12 at a particular instant of time. The images 16 may be uploaded to a cloud storage system, for example and converted to a three dimensional model 71 as discussed above. In some embodiments, the images 16 of the object 12 may be of a new and/or relatively new tire having little to no wear. The images 16 may be used to form a baseline surface model of the object 12. In some embodiments, the images 16 of the object 12 may be captured subsequent to the baseline scan and be used to form a secondary surface model of a tire that has worn tread as compared to the baseline scan.

Figure 4A:
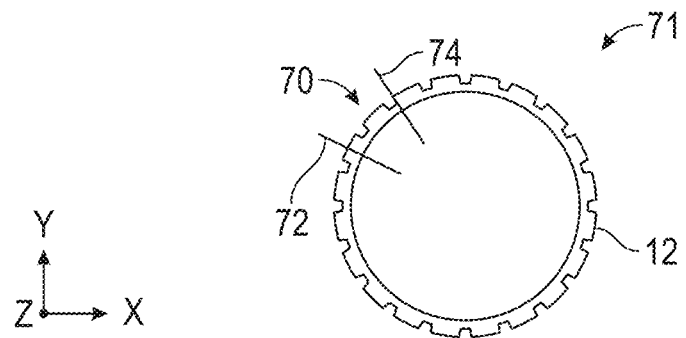
FIG. 4A is a side view of a three dimensional mesh of an object obtained using the automated tread registration system illustrated in FIG. 1A.
Figure 4B:
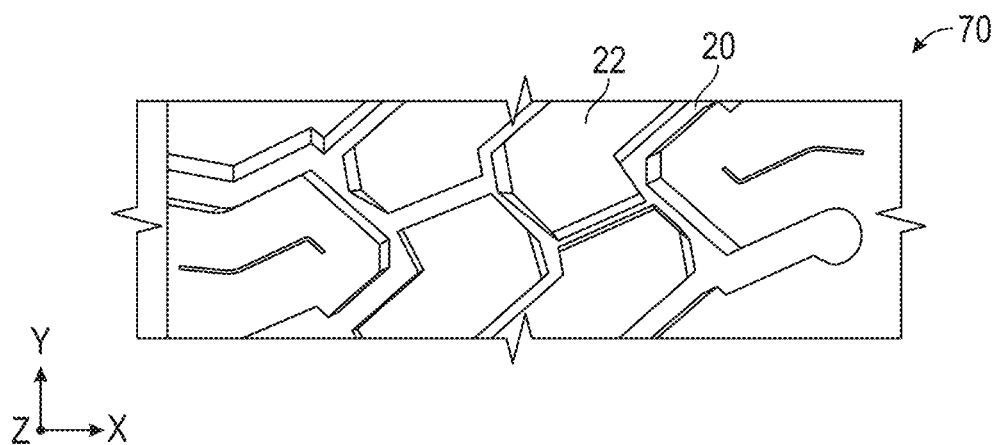
FIG. 4B is a top view of a tire swath of the three dimensional mesh illustrated in FIG. 4A.

One or more tire swaths 70 may be obtained from a three dimensional mesh 71 (e.g., surface model) of the object 12 provided by the sensing system 14. Tire swath 70 is a portion of the three-dimensional mesh 71. For example, FIG. 4A illustrates a side view of the three dimensional mesh 71 of the object 12. The area between lines 72 and 74 denotes a region where the tire swath 70 may be located. FIG. 4B illustrates a top view of the exemplary tire swath in FIG. 4A. Generally, by analyzing images of the tire swath 70, depth of the grooves 20 within the tire swath 70, orientation of the tire swath 70 during use of the object 12, and registration of the tire swath 70 as compared to similar and/or prior images, an analysis can be conducted (as set forth herein) to provide a diagnosis health of the object 12 and/or provide one or more action items related to the object 12 as described in further detail herein.

Figure 5A:
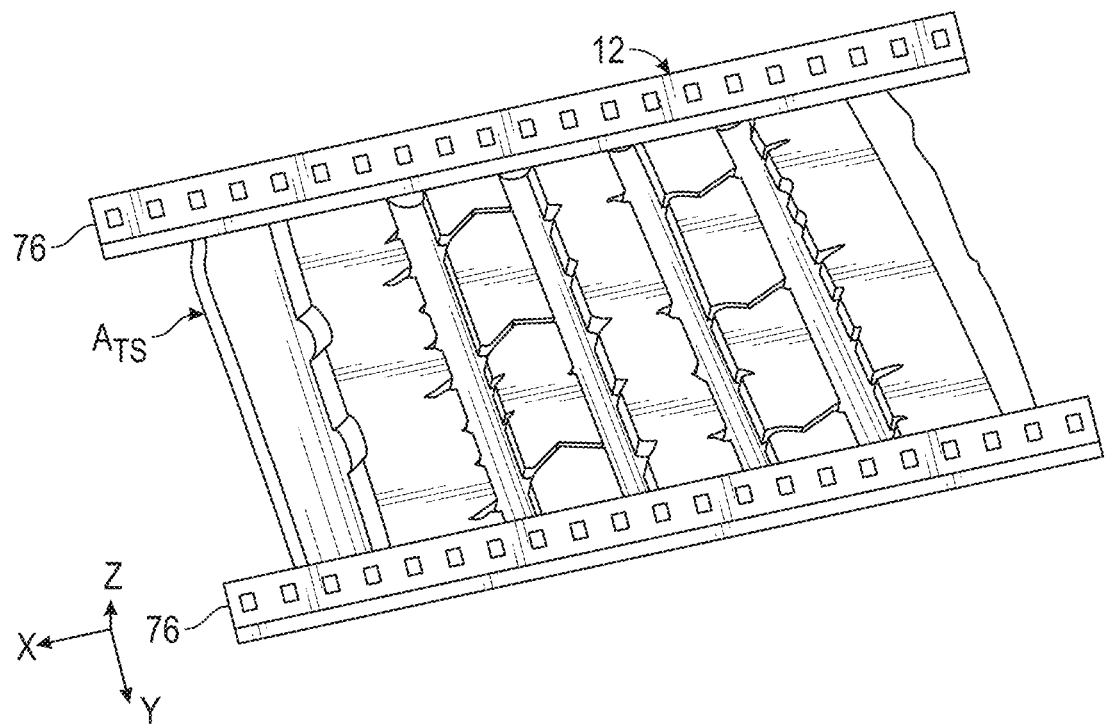
FIGS. 5A-5D illustrate exemplary photogrammetry targets for use with in the exemplary automated tread registration system in accordance with the present disclosure.

In some embodiments, an initial cleaning and/or rough orientation of the tire swath 70 may aid in subsequent processing steps. Referring to FIG. 5A, noise and elements not associated with or a part of the object 12 (e.g., driveway) may be removed from the three-dimensional mesh 71. In some embodiments, two or more targets 76 (i.e., known locations of the tire swath 70) in the Y axis may be determined. Portions of the tire swath 70 between targets 76 may be kept. For example, area ATs between the connected components of the targets 76 may be kept with elements outside of this area ATs being removed. Additionally, an incremental check of convexity across the tire swath 70 may be performed to remove non-convex portions 78. For example, a determination of significant alterations in shape, color, and/or texture may be identified within the tire swath 70, and associated portions removed.

Figure 5B:
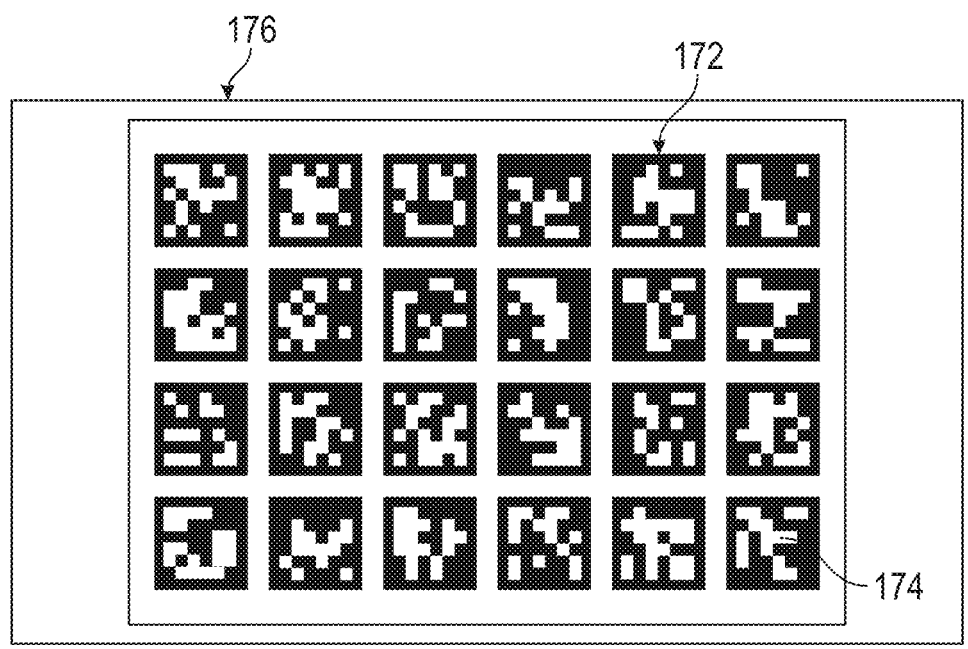

Referring to FIGS. 5A and 5B, the photogrammetry targets 76 and/or ground control points 174 may be one or more patterns 172 within the field of view of the digital imaging device(s) 32. Such targets 76 and/or ground control points 174 may aid in converting a-projective surface to a metric surface, for example. In some embodiments, the targets 76 and/or ground control points 174 may be affixed to the object 12, either to convert the projective surface to a metric surface, or if to further improve accuracy of three-dimensional reconstruction if already a metric surface. In some embodiments, two ground control points 174 or targets 76 may be used. Number and spacing of the ground control points 174 and/or targets may be determined based on setback of sensing system 14, circumferential span of object 12, parameters of camera(s) and/or the like.

In some embodiments, parameters of the digital imaging device(s) 32 may be unknown, and as such, scan of the object 12 may be too planar and/or flat such that photogrammetric three-dimensional construction may show errors related to distortion (e.g., bowl distortion). Such errors may be reduced by placing ground control points 174 and/or targets 76 within the field of view of the digital imaging device(s) 32. While the resulting three-dimensional construction may be accurate, the model may include the actual three-dimensional representation of the ground control points 174 and/or targets 76. In some embodiments, a rigid frame may be positioned on periphery of the object 12. One or more patterns 172 may be marked on the rigid frame. The frame may be light enough to be portable and configured to be removable or attached to the object 12 or periphery of the object 12.

In some embodiments, the photogrammetry targets 76 and/or ground control points 174 may be printed or machined on a rigid surface with dimensions similar to a credit card (e.g., 3.37 inches×2.125 inches) so as to be configured to fit within a wallet or purse, for example.

Figure 5C:
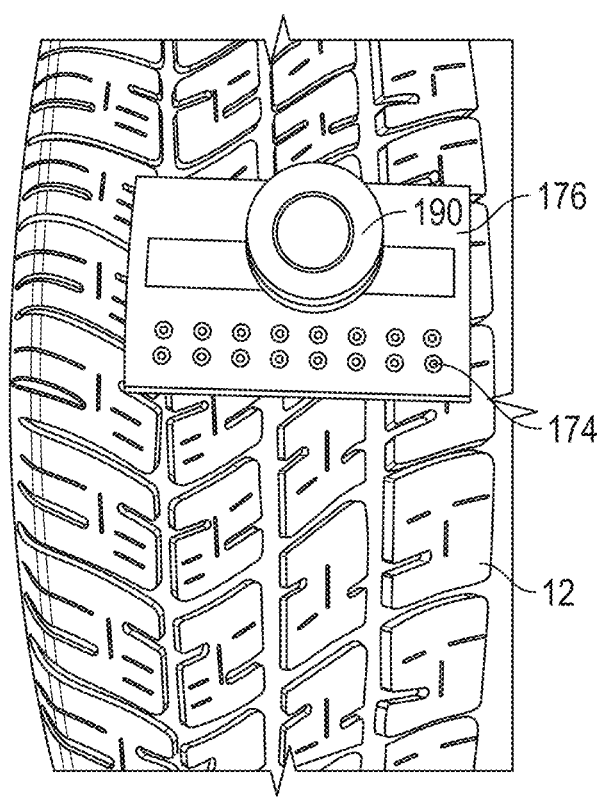
Figure 5D:
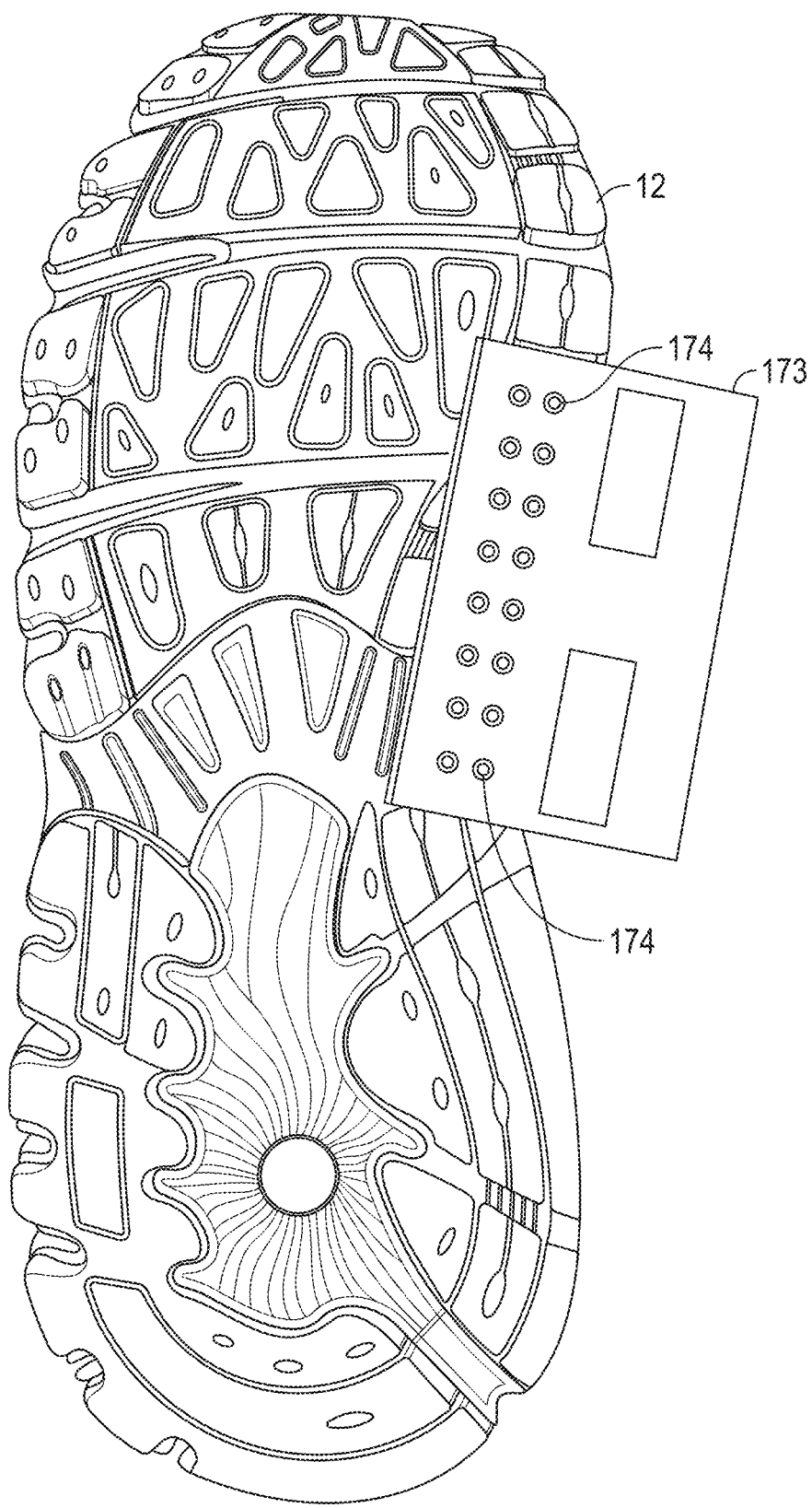
Figure 6:
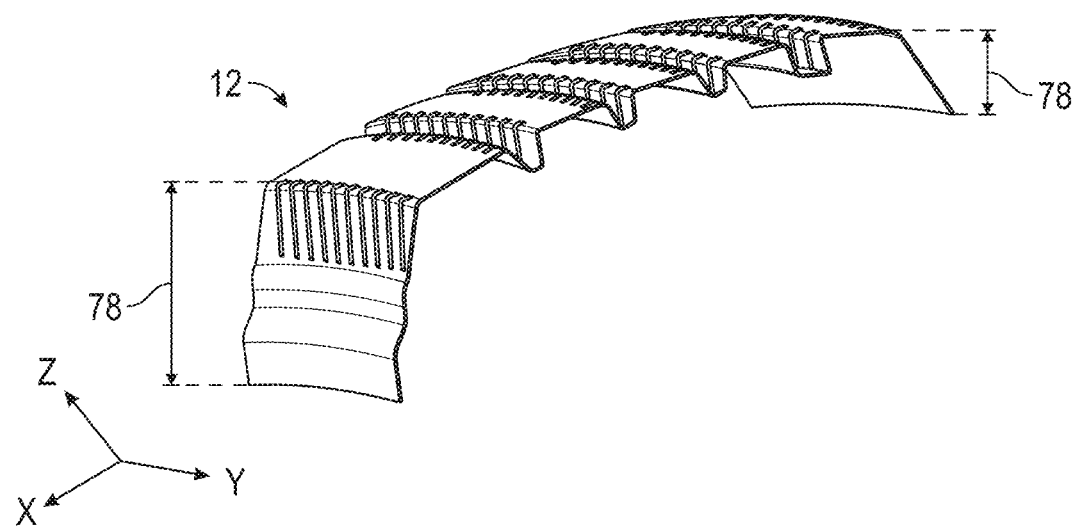
FIG. 6 is a perspective view of the tire swath of FIG. 5.

In some embodiments, the surface with ground control points 174 and/or targets 76 may be affixed to the object 12 (e.g., adhesive, magnet, and/or the like). For example, FIG. 5C illustrates a card marked with ground control points 173 is affixed to steel belts of a tire. In another example, the card is affixed to a sole of an athletic shoe as shown in FIG. 5D.

In some embodiments, a rough orientation may be performed on the tire swath 70. For example, an algorithm known as random sample consensus (RANSAC) may be used to find a best fit plane on the object 12 close to the XY plane (i.e., a best fit plane over the protrusions 22 (e.g., tread block)). This rough orientation may correct for large distortions.

Figure 7:
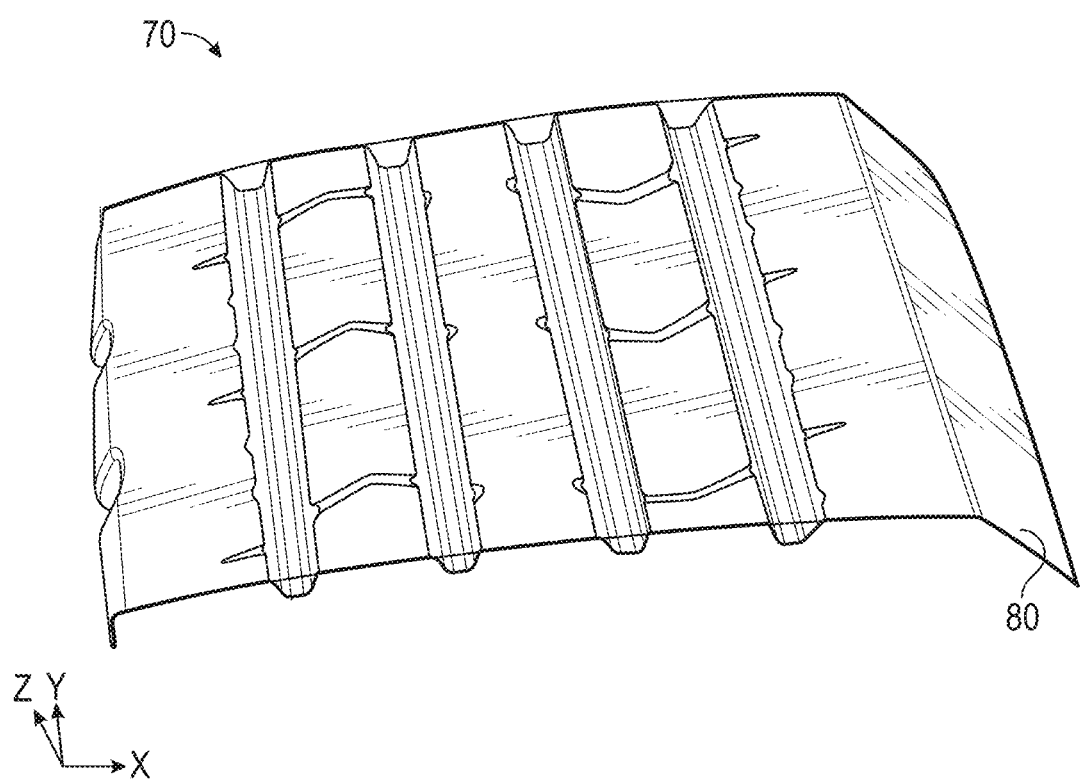
FIG. 7 is a perspective view of a tire swath having a convex hull associated therewith.
Figure 8:
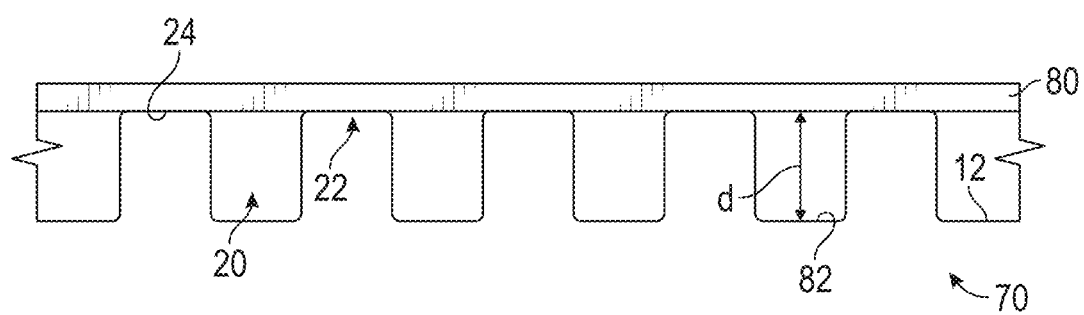
FIG. 8 is a side view of a tire swath illustrating depth of grooves.
Figure 9:
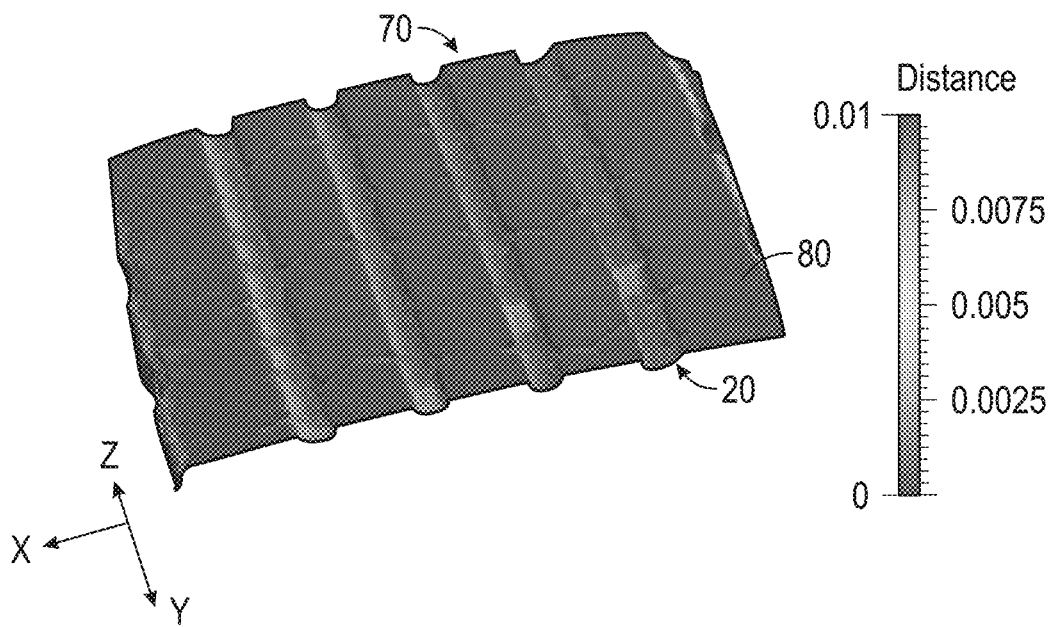
FIG. 9 is a perspective view of a tire swath illustrating depth of grooves.

Referring to FIGS. 1 and 7, a convex hull 80 for the tire swath 70 may be determined by the user system 26. Algorithms for determining the convex hull 80 for the tire swath 70 are known and included in commercially available software packages, such as Visualization Tool Kit (VTK) manufactured by Kitware having a principal place of business in Clifton, N.Y. and Qhull provided by The Geometry Center of The University of Minnesota. The convex hull 80 models an outer boundary of the tire swath 70 in a manner that extends over the grooves 20. The convex hull 80 may aid in determining depth of the grooves 20 of the tire swath 70. Depth of the grooves 20 may provide a basic test of health of the object 12. Generally, the convex hull 80 created for the tire swath 70 is the smallest convex set of the tire swath 70. To that end, the convex hull 80 of the tire swath 70 would follow the surface 24 of the protrusions 22. As such, depth of the grooves 20 within the tire swath 70 may be determined as a distance d between the convex hull 80 and the portion 82 of the tire swath 70 parallel to the tire swath 70 within the groove 20 as illustrated in FIG. 8. FIG. 9 illustrates the determination of depth of the grooves 20 for the entire tire swath 70. In some embodiments, the user system 26 may calculate and provide the user with a digital image illustrating depth of the grooves 20 for the tire swath 70 and/or the entire object 12. The depth of the grooves 20 can be determined by calculating a difference between a three-dimensional location of a point on the convex hull 80 that is perpendicular to a point of the object 12 that is at the bottom of the groove 20. By calculating multiple differences at various locations within the grooves 20 of the tire swath 70, the depth of the grooves 20 can be determined, modeled and graphically depicted. In some embodiments, the user system 26 may calculate and provide the user an average depth for the tire swath 70 and/or the entire object 12. The average depth can be calculated by calculating an average of the differences at various locations within the grooves 20 of the tire swath 70.

Figure 10A:
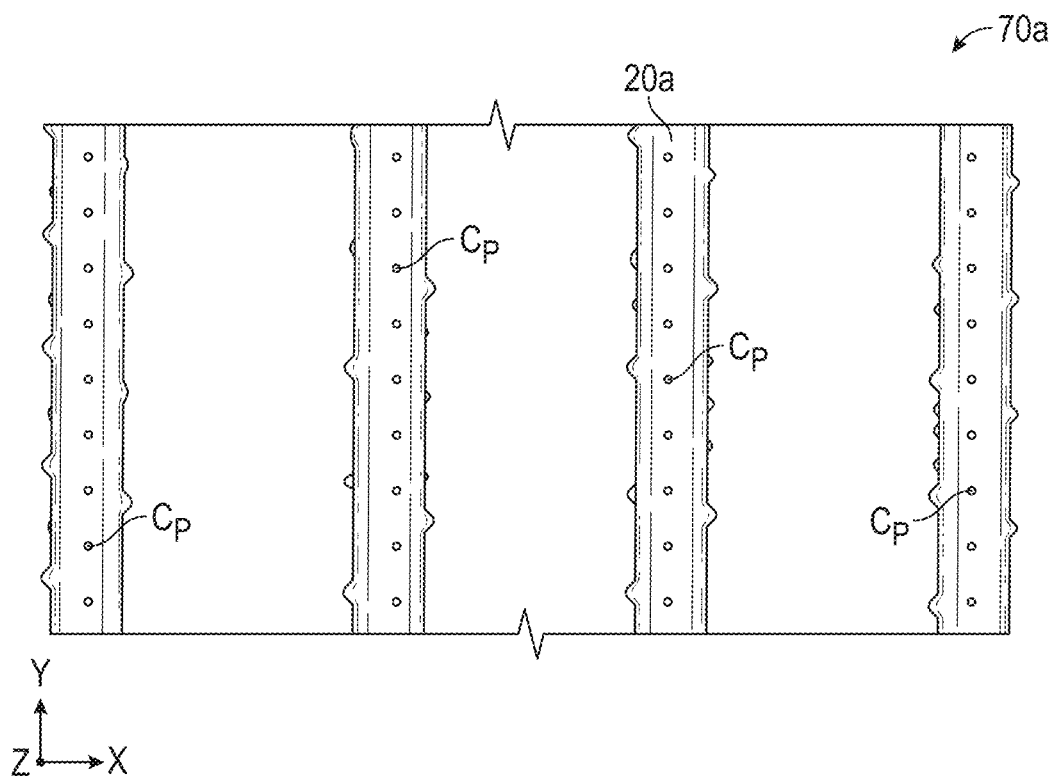
FIGS. 10A, 10B and 10C are perspective views of a tire swath within a bounding box.
Figure 10B:
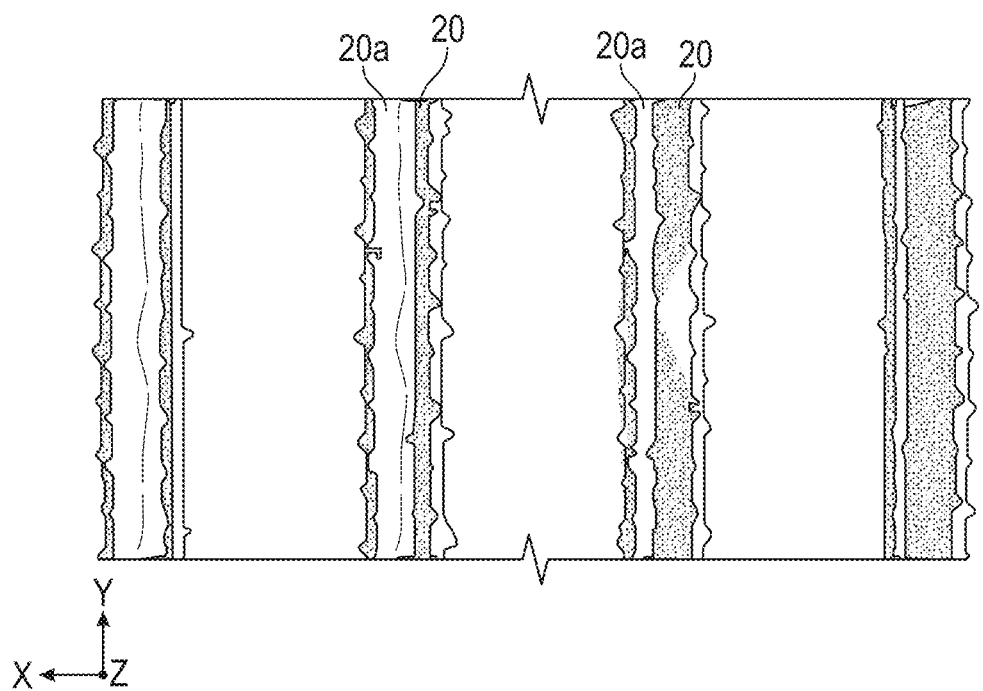

Referring to FIGS. 1, 10A and 10B, orientation of the tire swath 70 may further aid in diagnosing health of the object 12. Non-tread related wear (i.e., objects 12 without tread) may need orientation of the object 12 so that wear patterns may be analyzed. For example, a brake rotor may be assessed for run out if the rotor is first oriented. Objects 12 having tread may also benefit from orientation for diagnostics and the like. Generally, orientation may be based on how the tire swath 70 is positioned during use of the object 12. For example, orientation of the tire swath may be how the tire swath 70 would spin on the tire of the vehicle if the tire was properly aligned. It should be noted that some sensing systems 14 may be capable of providing information as to orientation of the entire three-dimensional model. For example, laser scanning systems (e.g., turntable/lab based and driveover systems) may be used to capture a full three-dimensional model, and as such, the orientation may be provided using an algorithm known as Principal Component Analysis, for example. In using a turn table system known with the art, the tire may be spun on a vertically or horizontally positioned wheel with the distance between the laser and tire being constant to enable and/or establish correct orientation of the three-dimensional model. Alternatively, if only the tire swath 70 is available, symmetry analysis may be used to facilitate orientation. Exemplary methods of orienting the tire swath 70 are discussed below.

In some embodiments, symmetry of the tread on the object 12 may be used to orient the tire swath 70. Tire symmetry is further described in the paper by Gregory Jackson entitled, *Symmetry in Automobile Tires and the Left-Right Problem*, University College (NSW), ADFA, Canberra, Australia 2600, which is hereby incorporated by reference in its entirety. Patterns of grooves 20, for example, on each side of the tire may often be identical even if staggered circumferentially. Such patterns of grooves 20 may repeat circumferentially about the tire. Further, sidewalls of the tire may be symmetric.

Figure 10C:
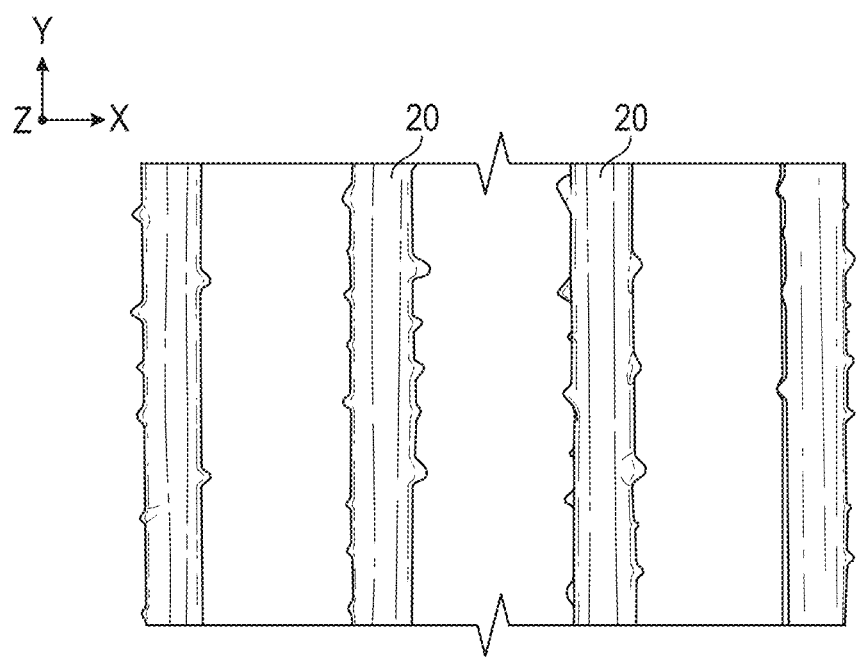

Referring to FIGS. 10A-10C, n some embodiments, the tire swath 70 may be oriented by determining symmetries associated with the tire swath 70. In some embodiments, orientation of the tire swath 70 may be on a tire swath 70a of a baseline surface model (e.g., a tire with limited or no wear) as a newer tire may be more symmetrical than a tire with wear. Generally, the pattern of the tire swath 70a may be exploited, and in particular the 180 degree symmetry. The grooves 20 of the tire swath 70a may be isolated and analyzed as this portion of the tire swath 70a may generally be invariant. Landmarks of the grooves 20a may be used to orient the tire swath 70a. For example, one or more center points $C_P$ of the grooves 20a as shown in FIG. 10A may be used to establish a vertical landmark at a center of each groove 20a. Such center points $C_P$ may then be registered to corresponding grooves 20 of the tire swath 70. Other landmarks may be used to orient the tire swath 70a including patterns of the grooves 20a, patterns of protrusions 22a, depth of grooves 20am width of grooves 20am direction of grooves 20a and/or the like.

The tire swaths 70 of tires with wear may then be registered to the tire swath 70a as illustrated in FIG. 10B. Further, an ICP may be performed and a distance between the tire swath 70 and the tire swath 70a may be determined. Further, a threshold scan may be performed to further limit the distance D between the tire swath 70 and the tire swath 70a such that grooves 20a and grooves 20 may be substantially identical as shown in FIG. 10C. In some embodiments, principle component analysis (PCA) may also be used to further orient the tire swath 70. The resulting transformation may then be applied to the entire tire swath 70.

Figure 11A:
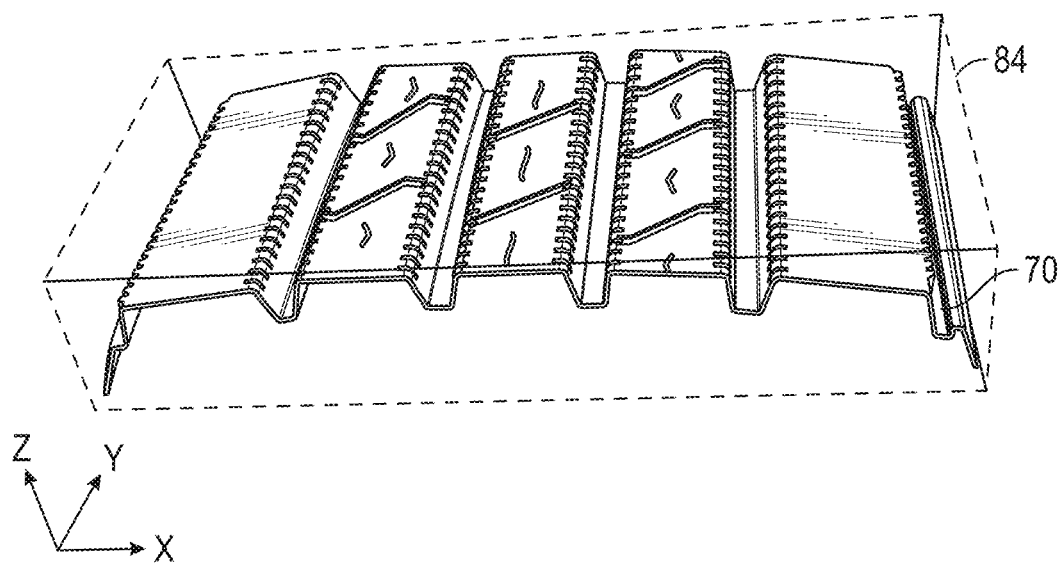
FIGS. 11A-11E illustrate orientation of a tire swath using the bounding box illustrated in FIGS. 10A, 10B and 10C to orient the tire swath in the X-axis, Y-axis and Z-axis.
Figure 11B:
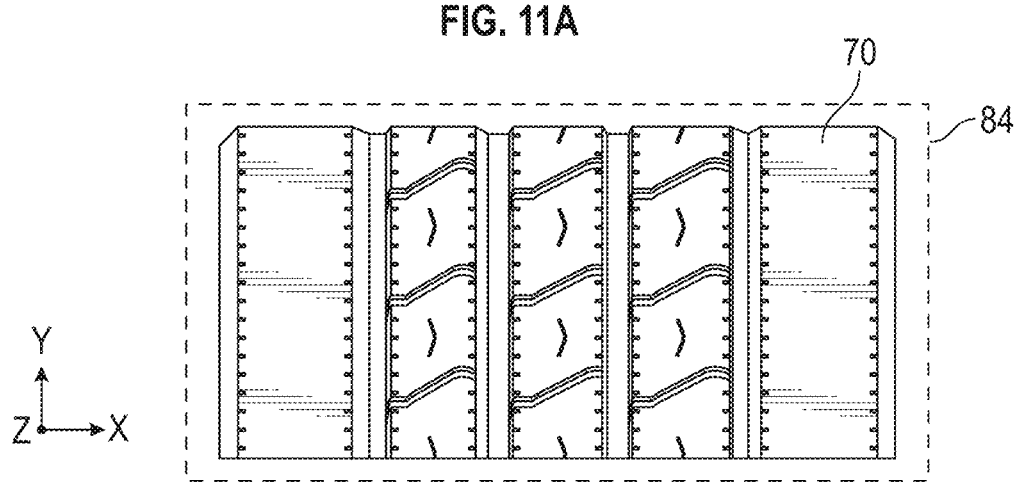
Figure 11C:
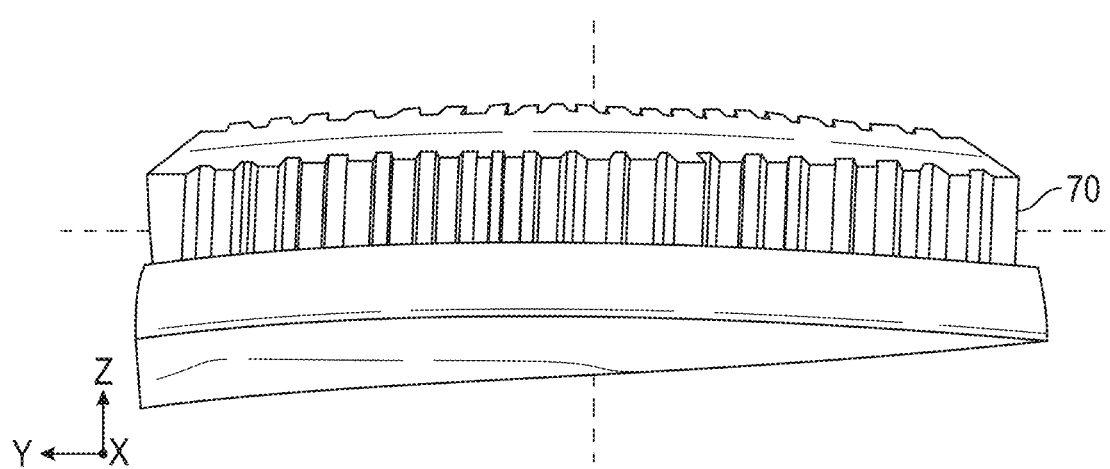
Figure 11D:
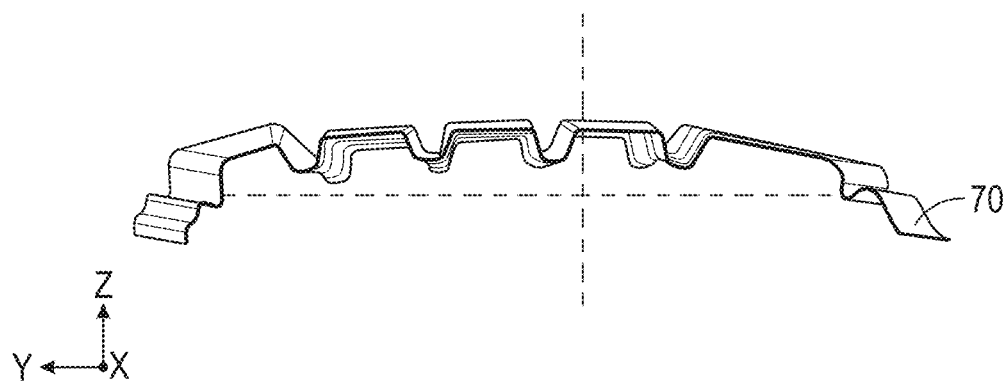
Figure 11E:
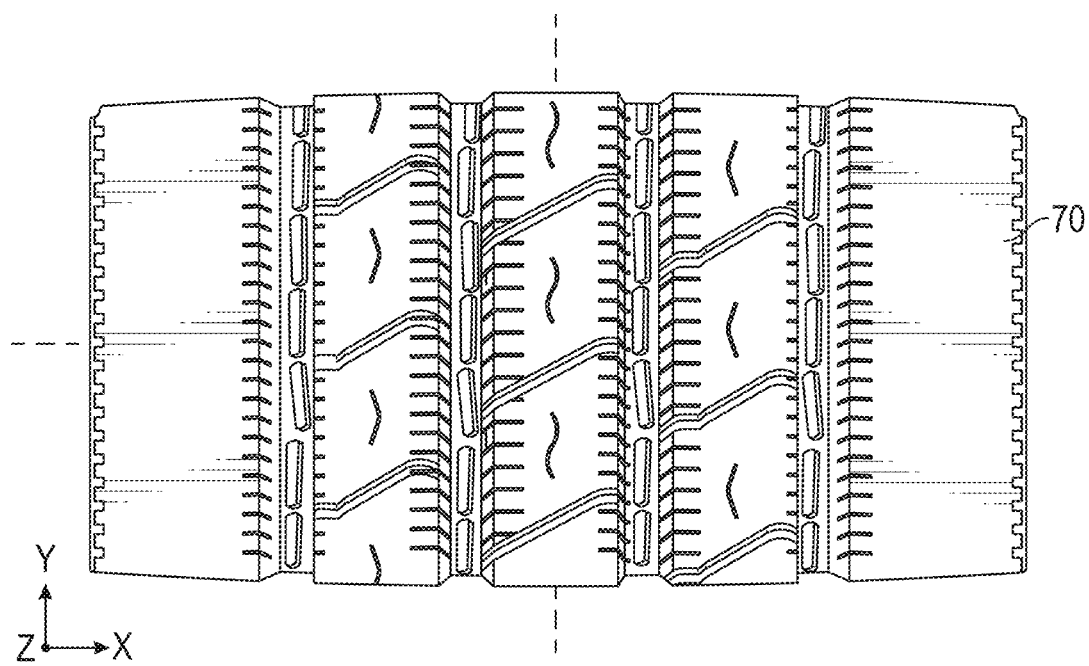

In some embodiments, the tire swath 70 may be oriented using a bounding box 84 as shown in FIG. 11A. Generally, the minimum oriented bounding box 84 may be determined and, using the bounding box 84 and principal component analysis, the tire swath 70 may be oriented along the X axis, Y axis and/or Z axis.

Referring to FIG. 11A, the bounding box 84 may be configured about the tire swath 70 as shown. Generally, the bounding box 84 is a box for a point set(s) in N dimensions within which all of the points lie. The bounding box 84 may be the minimum box for a point set (S) in N dimensions having the smallest measure within which all the points lie. The bounding box 84, once determined, may then be oriented to each axis (i.e., X-axis, Y-axis and/or Z-axis). In some embodiments, the bounding box 84 may be oriented to each axis using an algorithm known as principal component analysis to determine transformation T for aligning the bounding box 84 to the X-axis, Y-axis, and/or Z axis. For example, FIGS. 11B-11E illustrate the tire swath 70 being oriented to each of the X-axis (shown in FIG. 11C), the Y-axis (shown in FIG. 11D), and the Z-axis (shown in FIG. 11E).

Figure 12:
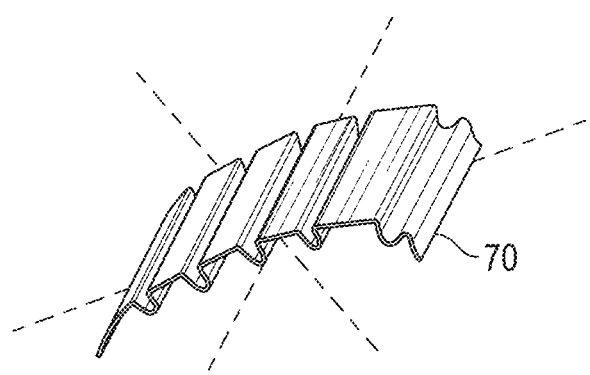
FIG. 12 is a perspective view of a tire swath oriented in the X-axis, Y-axis and Z-axis.
Figure 13A:
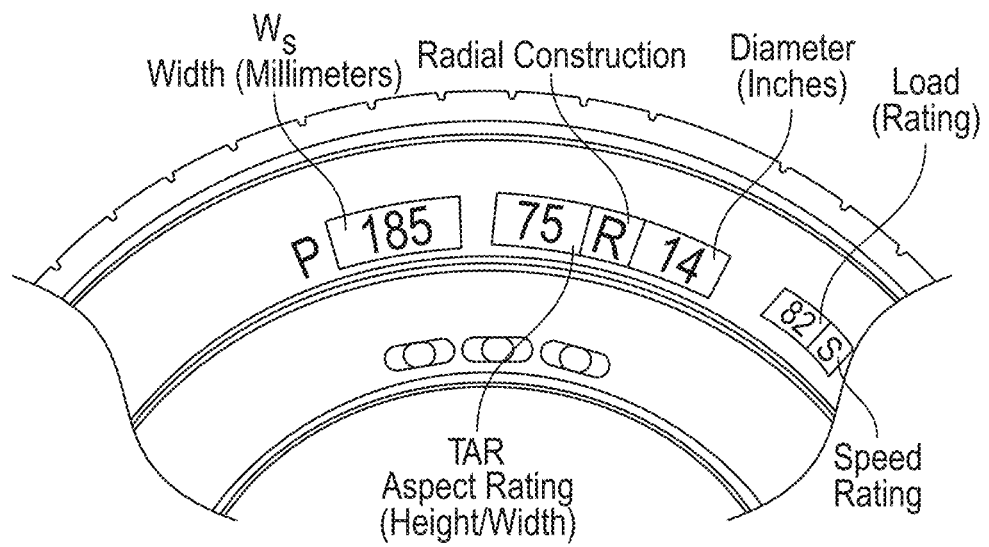
FIG. 13A is a diagrammatic view of a portion of tire having branding and associated designation as known within the industry.
Figure 13B:
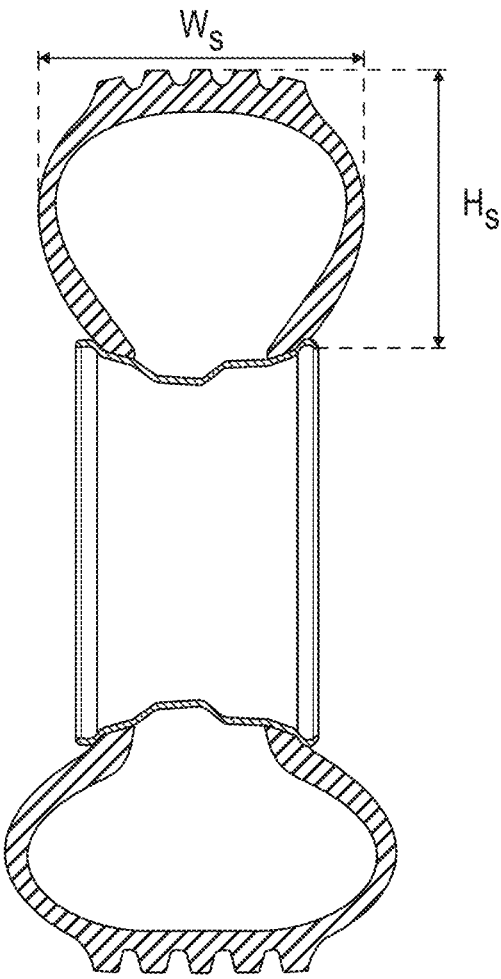
FIG. 13B is a diagrammatic view of a tire having known dimensions within the industry.

Referring to FIG. 12, once aligned in the X, Y and Z axis, the tire swath 70 may then be circumferentially translated. In some embodiments, angular orientation may also be adjusted. Referring to FIGS. 13A and 13B, to circumferentially translate the tire swath 70, the tire wheel radius $R_{TW}$ may be determined. Generally, tire wheel radius $R_{TW}$ may be estimated using the radius of the wheel $R_W$ and section height $H_S$ of the tire as shown in EQS. 1 and 2 below. The tire aspect ratio (TAR) and the section width $W_S$ of the tire may be known. For example, the tire aspect ratio (TAR) and the section width $W_S$ may be provided by the manufacturer of the tire and branded on the tire as shown in FIG. 13.

$$R_{TW} = R_W + H_S \tag{EQ. 1}$$

$$H_S = TAR * W_S \tag{EQ. 2}$$

Figure 14:
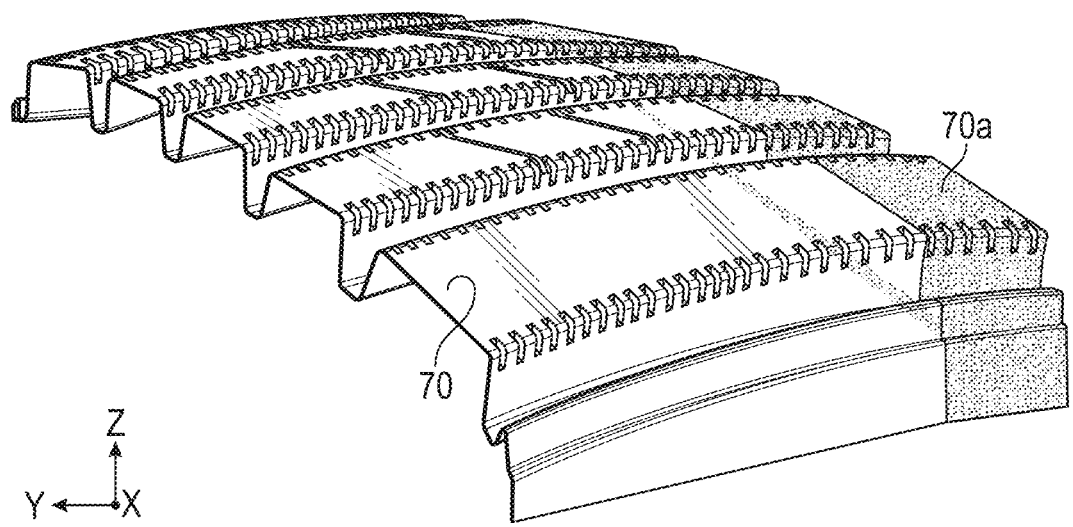
FIG. 14 is a perspective view of an oriented tire swath in accordance with the present disclosure.

In one example, the tire aspect ratio (TAR) may be 75 and the section width $W_S$ may be 295 mm. The section height $H_S$ may then be about 221.25 mm. The diameter of the wheel may be as 22.5 inches. As such the radius of the wheel is approximately 507 mm. The tire swath 70 may then be adjusted such that the circumferential radius of the tire is set at approximately 507 mm, and dimensions of the tire swath 70 may be adjusted to fit the tire as illustrated in FIG. 14. For example, the user system 26 may use a trial and error approach to fit the tire swath 70 and/or adjust the tire swath 70 such that the circumferential radius of the tire is set at approximately 507 mm. In some embodiments, a visual confirmation from a user may be provided to the user system 26 indicating that the adjustments to the tire swath 70 may be acceptable. In some embodiments, the user system 26 automatically (i.e., without human intervention) performs the adjustments to the tire swath 70 based on the determined and/or estimated circumferential radius of the tire.

Figure 15A:
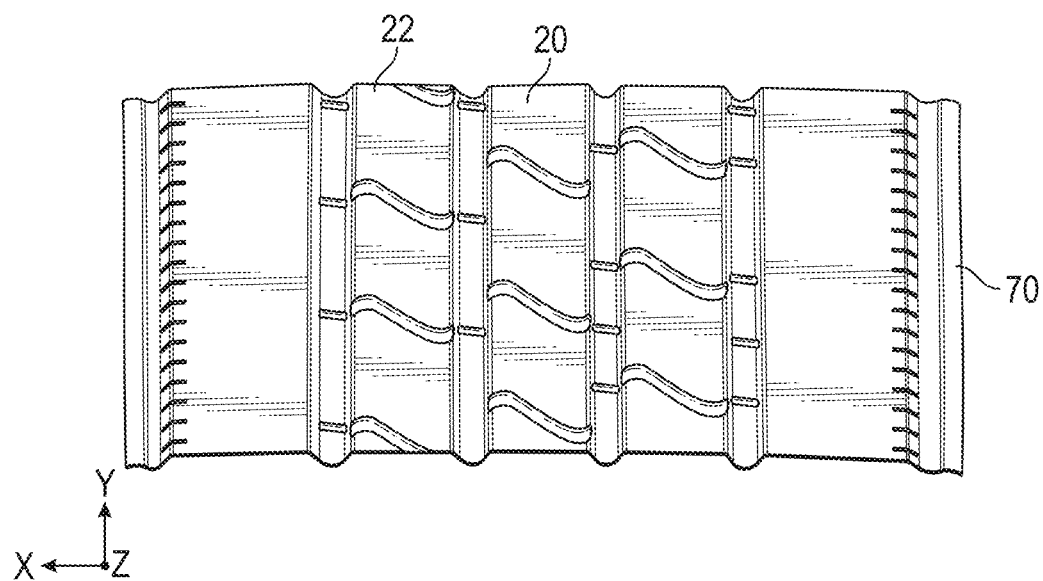
FIGS. 15A-15E illustrate orientation of a tire swath using grooves of the tire swath in accordance with the present disclosure.
Figure 15B:
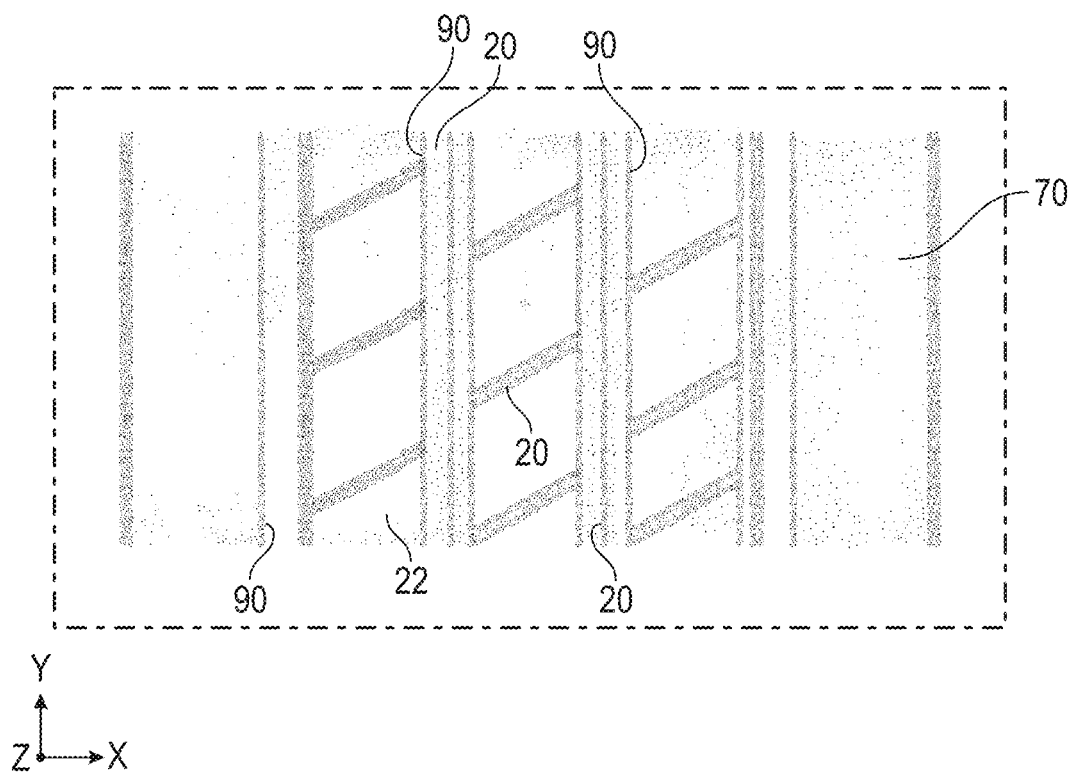
Figure 15C:
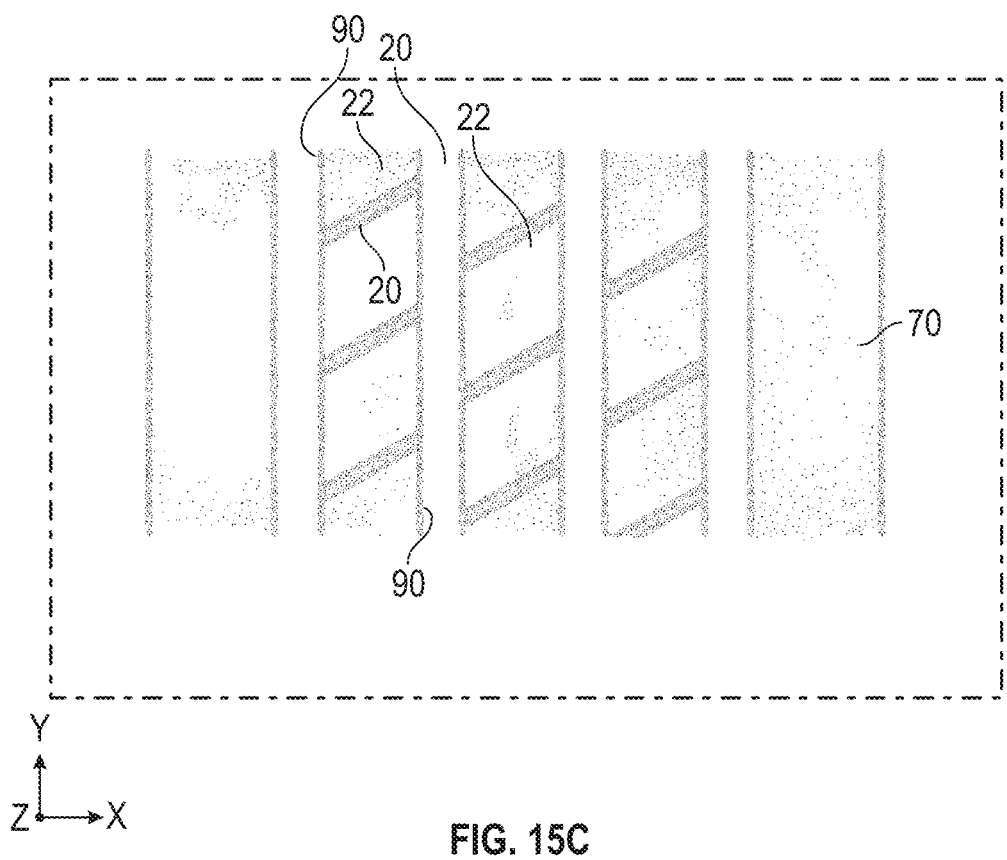
Figure 15D:
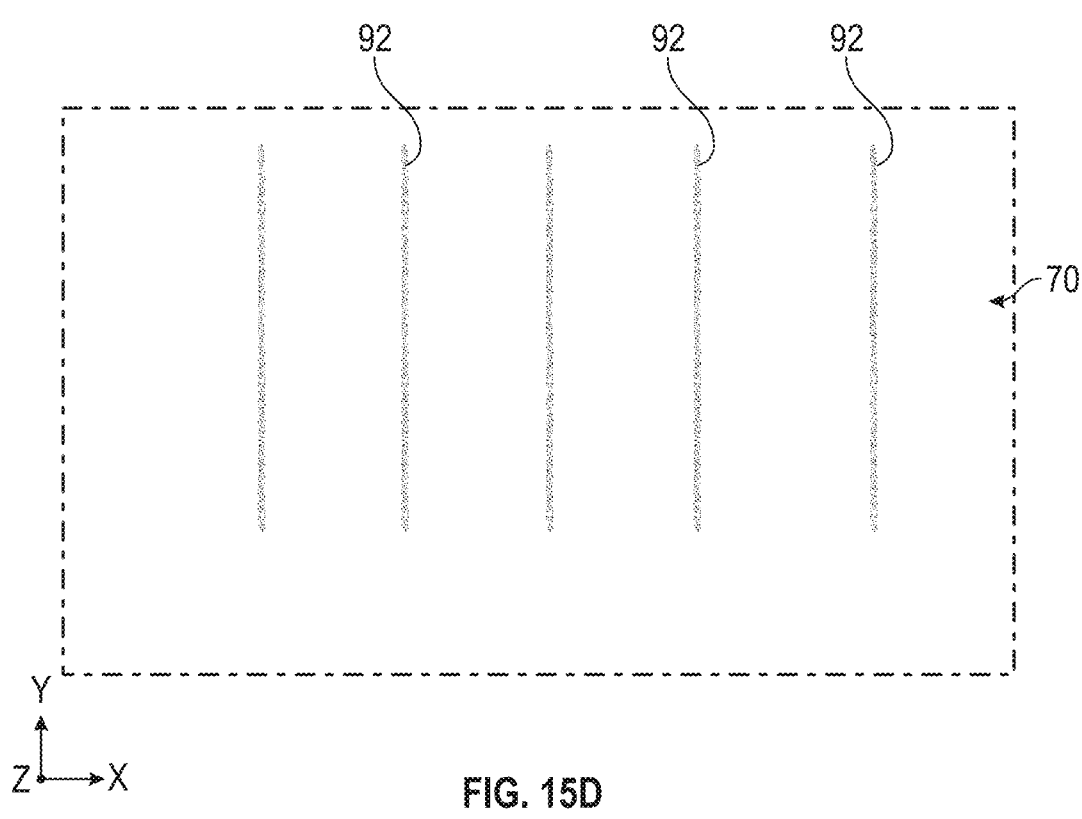
Figure 15E:
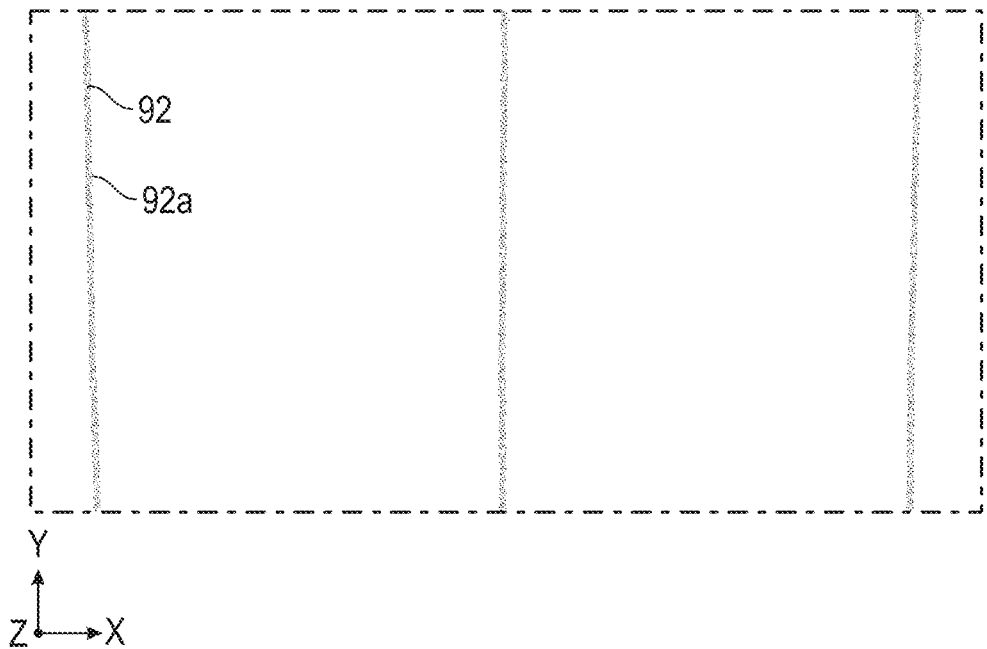

Referring to FIG. 15A, in some embodiments, the tire swath 70 may be further oriented using an Iterative Closest Point (ICP) algorithm. Generally, tire features (e.g., grooves 20, protrusions 22) that are configured to change circumferentially may be identified on the surface of the tire. Initially, edges 90 of the protrusions 22 may be highlighted by filtering the tire swath 70 based on curvature as shown in FIG. 15B. Knowing the depth for grooves 20, the tire swath 70 may be further filtered such that markings found within grooves 20 may be removed as shown in FIG. 15C. The tire swath 70 may be further filtered based on X normals to provide defined circumferential edges 92 as shown in FIGS. 15D and 15E, wherein FIG. 15E is a magnified view of FIG. 15D. The defined circumferential edges 92 may generally be clearly identifiable on tires without wear (i.e., new tires). The filtered tire swath 70 having defined circumferential edges 92 may be rotated to provide overlap of circumferential edges 92a of a baseline scan or secondary scan. Distance between the tire swath 70 and the baseline scan or secondary scan may be used to determine and/or adjust for correct alignment. Further, ICP may be performed to maximize overlap. Based on resulting transformation, orientation of the tire swath 70 may be fine-tuned.

Figure 16A:
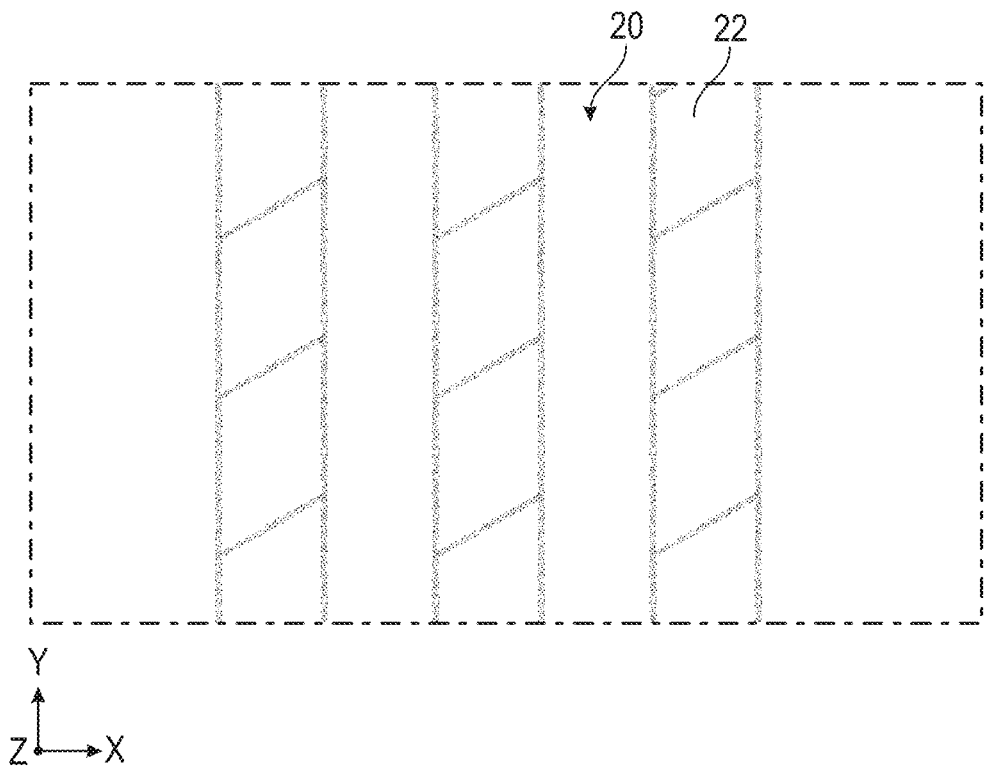
FIGS. 16A-16D illustrate orientation of a tire swath using tire pitch cycle in accordance with the present disclosure.
Figure 16B:
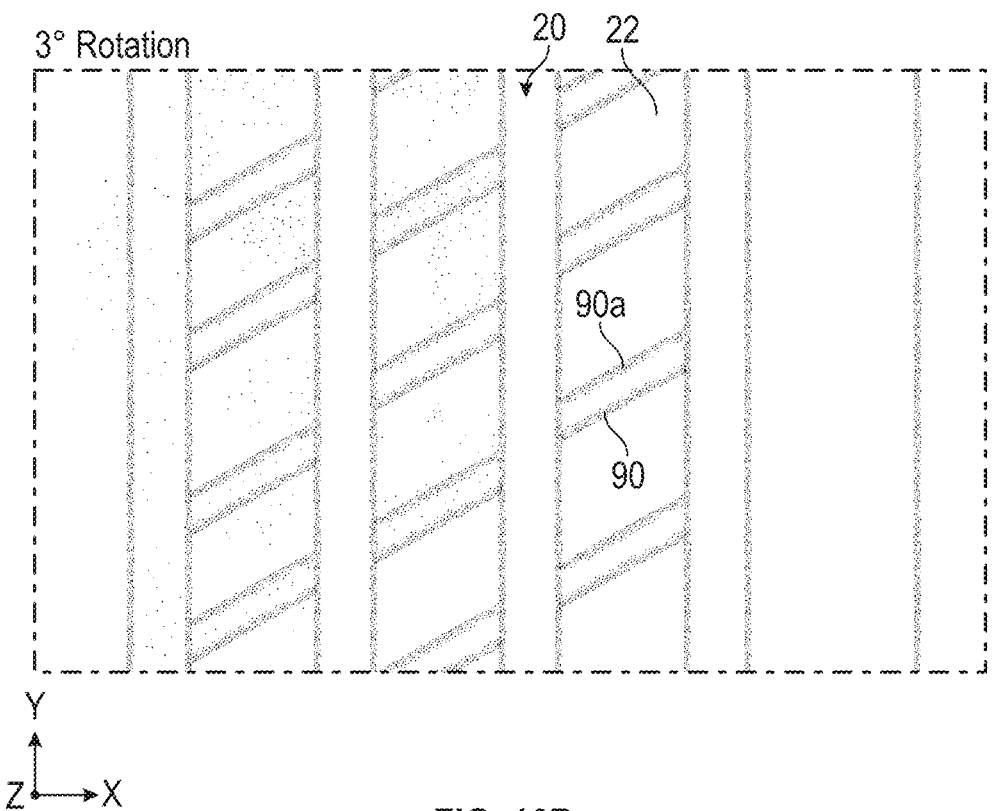
Figure 16C:
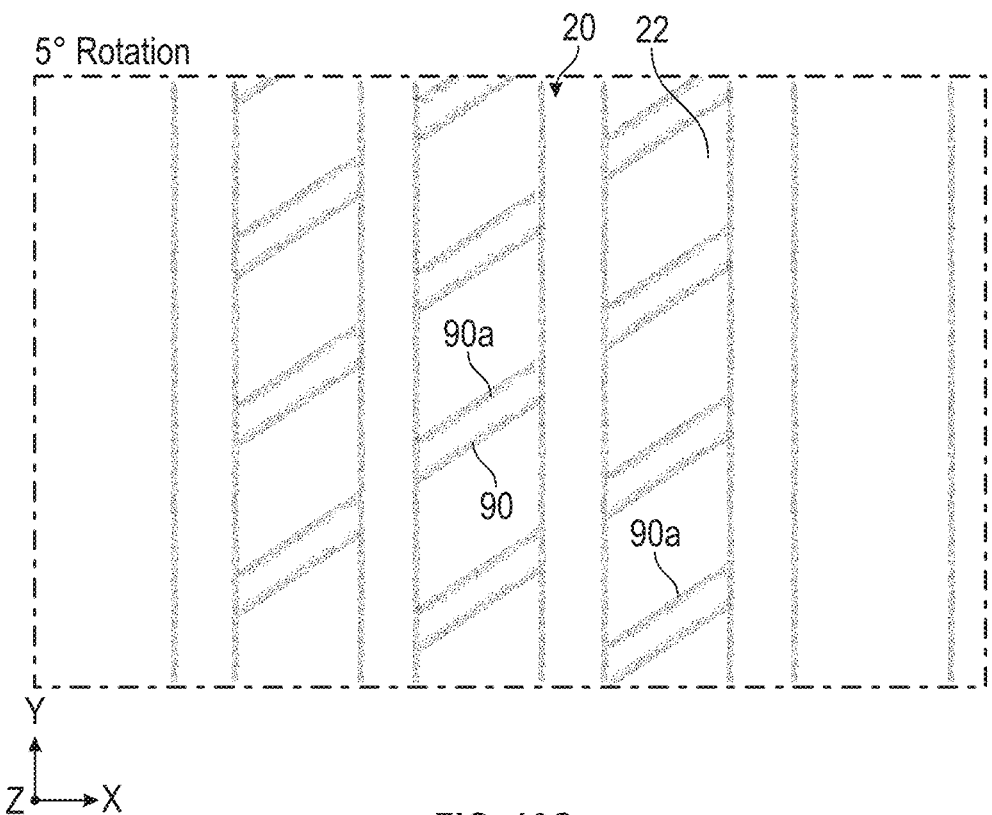
Figure 16D:
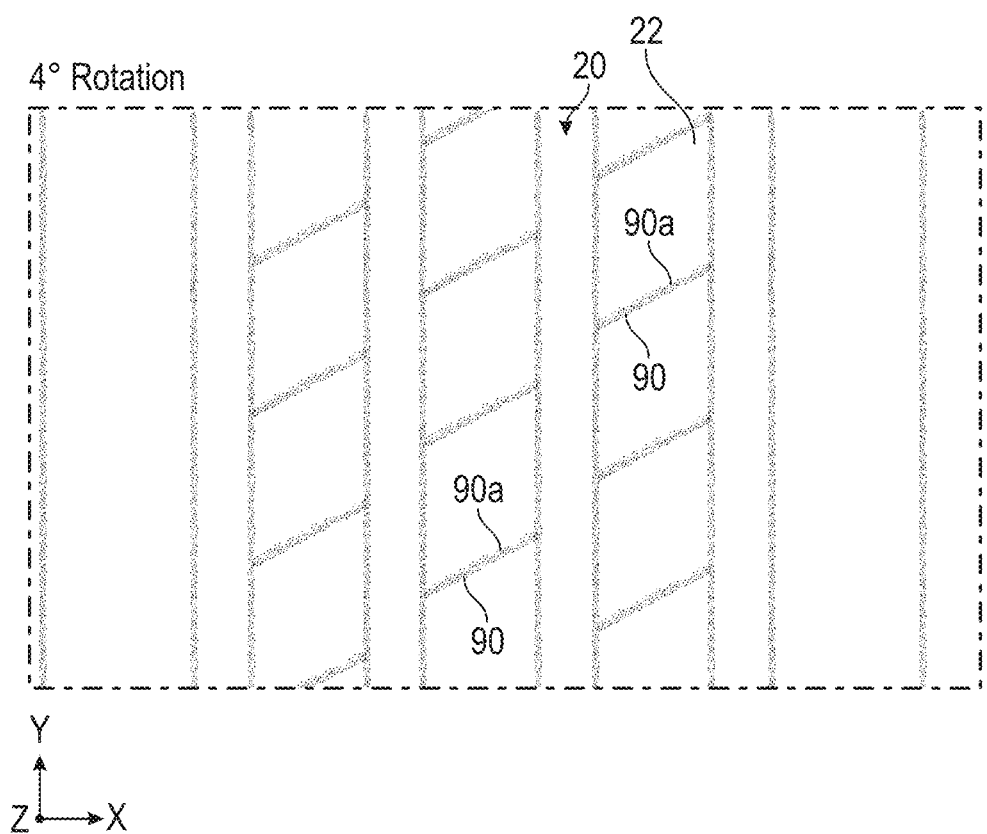

Referring to FIGS. 16A-16C, in some embodiments, tire pitch cycle (i.e., a repeating circumferential pattern on the tire swath 70) may be used to orient the tire swath 70. Initially, the tire swath 70 may be filtered such that grooves 20 may be highlighted. For example, edges of grooves 20 may be filtered to highlight grooves 20 and one or more protrusions 22 as shown in FIG. 16A. Protrusions 22 on the tire swath 70 may repeat circumferentially in a recognizable pattern at a certain cycle (i.e., tire pitch cycle). Referring to FIG. 16B, the tire swath 70 may be rotated on common tire pitch cycles to determine a best fit for edges 90 of the tire swath 70 and edges 90a of a baseline scan or secondary scan. Common tire pitch cycles within the industry include 2, 3, 4, 5, 6, 10, 12 and 15 degree rotations. FIG. 16B illustrates a 3 degree rotation wherein edges 90 and 90a do not align. Similarly, FIG. 16C illustrates a 5 degree rotation wherein edges 90 and 90a do not align. FIG. 16D, however, illustrates a 4 degree rotation wherein edges 90 and 90a do align. As such, the tire pitch cycle may be determined to be 4 degrees.

Figure 17A:
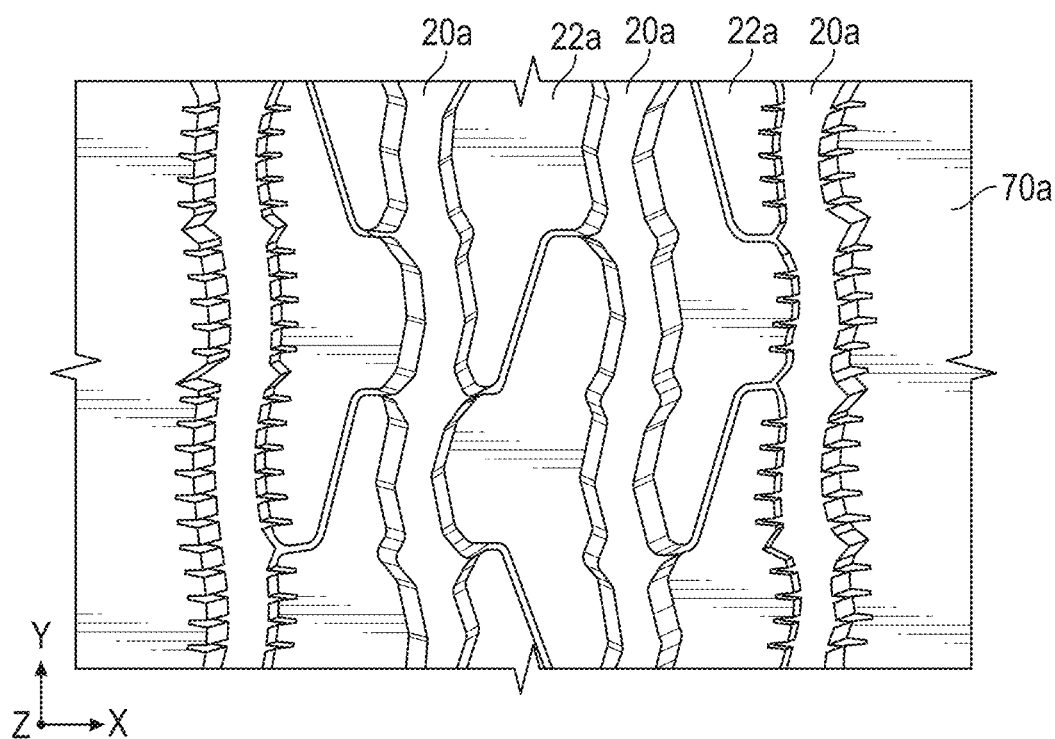
FIG. 17A is a top view of a tire swath of a new tire.
Figure 17B:
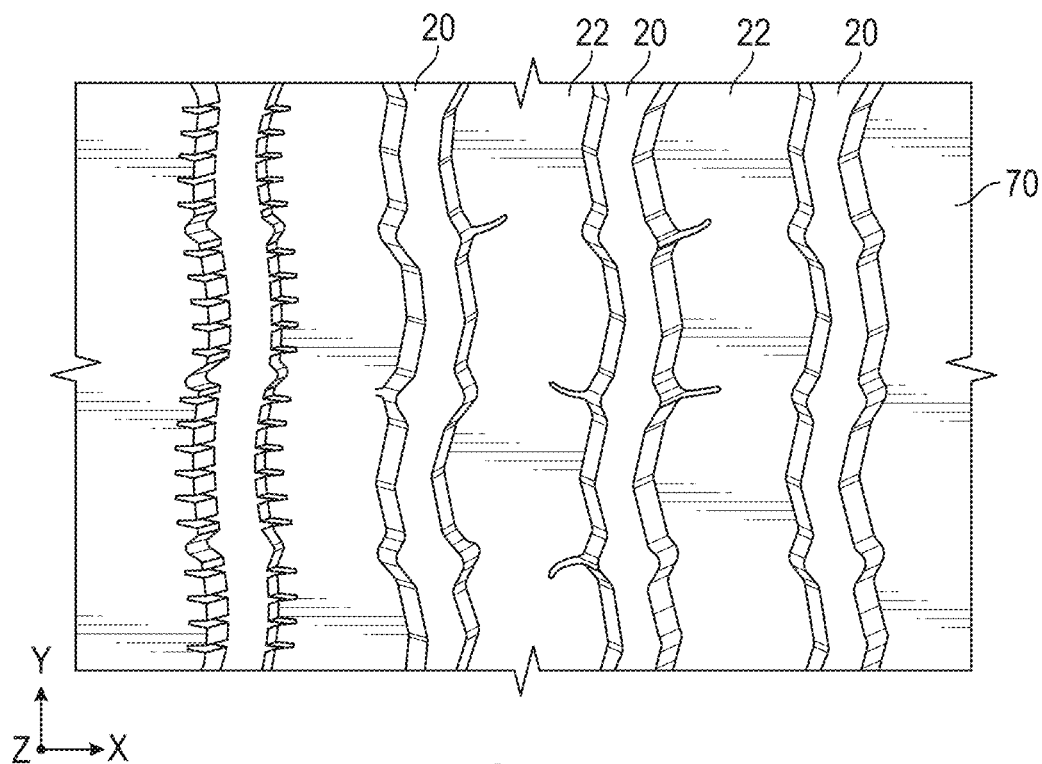
FIG. 17B is a top view of a tire swath of a wire having worn tread.

Referring to FIGS. 17A and 17B, registering the tire swath 70 on a baseline tire swath 70a or secondary tire swath may allow for exploitation of tire geometry that may not be significantly altered with wear. For example, grooves 20 of the tire swath 70 or sidewalls may not significantly change with wear of the tire. Further, techniques such as ICP may be used to further tighten the registration. FIG. 17A illustrates the tire swath 70a of a relatively new tire having little to no wear. FIG. 17B illustrates the tire swath 70 of a secondary scan of the new tire after such tire has been used. As such, the tire swath 70 includes wear.

It should be noted that when examining tread of the tire swath 70, there are a number of machine vision and imaging science techniques that may be used to provide the overall pattern of the tread, to compare the tread of the tire swath 70 to a baseline tire swath or secondary tire swath, and/or to provide quantitative metrics regarding the amount and characteristics of the pattern of the tire swath 70 as compared to the baseline tire swath or secondary tire swath. In one non-limiting example, when a photogrammetric method is used to generate a three-dimensional model of the tread, images 16 may be used to assist in the alignment analysis. First, edges may be detected. There are a number of algorithms that may detect the edges including, but not limited to ideal groove, gradient edge detection (e.g., Sobel 2D gradient with a Hough line transformation), and/or the like. When aligning edges, a simple correlation may use best fit for the tread patterns or the tire swath 70 and the baseline tire swath or secondary tire swath, and as such, deformation due to tread wear may be minimized. In some embodiments, invariant portions of the tire (e.g., the side walls, carcass, and bottom surface of the grooves 20) may be correlated and aligned. In this non-limiting example, tread edges may be compared by finding differences. Quantitative metrics may be found by finding an area between similar lines, and as such, the overall amount of deformation of the tread pattern, as well as angular measurements between two tread edges may be determined.

If photogrammetric images are not available, edges may be detected within the three-dimensional model using a methodology and/or algorithm such as Random Sample Consensus (RANSAC). This iterative method may eliminate outliers in order to find a set of data points that may be used in a simple least squares method in order to fit a line to the three-dimensional data points corresponding to the edges of the tread. Once edges have been identified, the same quantitative metrics described above may be generated using three-dimensional model space instead of the two-dimensional space.

FIGS. 23A-23L illustrate an exemplary method for orienting, cleaning and scaling a tire swath 70. In some embodiments, the IAD system 30 may be a Smartphone configured to provide diagnostics of the object 12. In some embodiments, the IAD system 26 may facilitate capture of images 16 for relevant portions of the object 12 and provide post processing providing basic and advanced diagnostics (e.g., metrics including groove depth, etc). In some embodiments, data (spatial and tabular) may be stored in a cloud for later diagnostics. Generally, the IAD system 30 may filter and/or clean the tire swath 70 and rotate and/or translate the tire swath 70 to the orientation of the tire as seated on a vehicle.

Figure 23A:
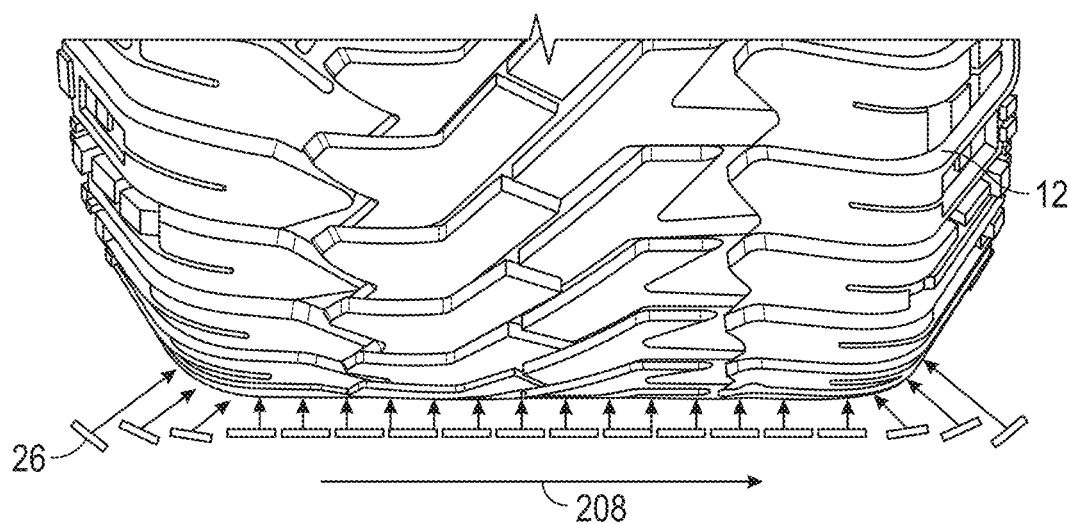
FIGS. 23A-23L illustrate an exemplary method for orienting, cleaning and scaling a tire swath in accordance with the present disclosure.

Referring to FIG. 23A, the IAD system 26 may capture images 16 of the object 12. In some embodiments, the IAD system 26 may use Structure from Motion (SFM), a photogrammetric range imaging technique for estimating three-dimensional structures from two-dimensional image sequences. The IAD system 26 may be moved in a predetermined path 208 (e.g., substantially straight path) across the object 12 (e.g., across tread of tire from bead to bead) to capture a suitable amount of images 16 to enable reconstruction of the object 12 (e.g., tire swath 70).

Figure 22:
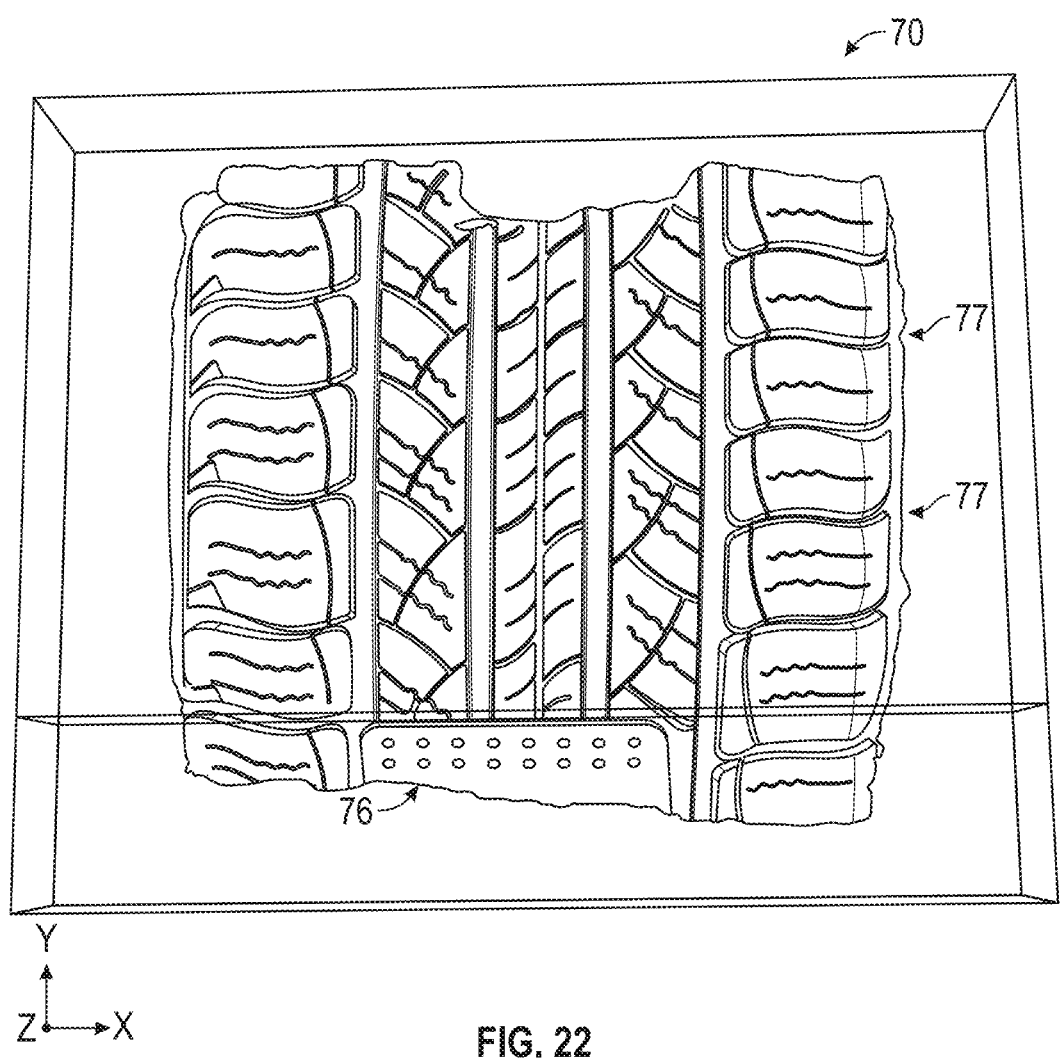
FIG. 22 illustrates cleaning of a tire swath in accordance with the present disclosure.

In some embodiments, a fiducial card may be used to achieve a metric projection as described in further detail herein. After processing, the fiducial card can be clipped from the resulting three-dimensional tire swath 70 as it is not part of the tire. Additional artifacts 77 may also be filtered out by keeping the largest connected component as illustrated in FIG. 22.

In some embodiments, initiation may begin by achieving a rough 180 degree rotational symmetry of the tire swath 70. Depending on conditions of image capture of the tire swath 70 (e.g., images captures evenly and/or the like), the tire swath oriented to its center of mass may already achieve rough starting orientation.

The tire swath 70 may be oriented relative to the Z-axis (e.g., using best fit plane techniques). In some embodiments, the tire swath 70 may be roughly oriented in the Z-direction by searching for the flattest region of the tire (e.g., using plane fitting). Typically, the flattest region of the tire may be located near the center of the tread.

Figure 26A:
FIGS. 26A-26D illustrate additional exemplary methods for orienting a tire swath in accordance with the present disclosure.
Figure 26B:
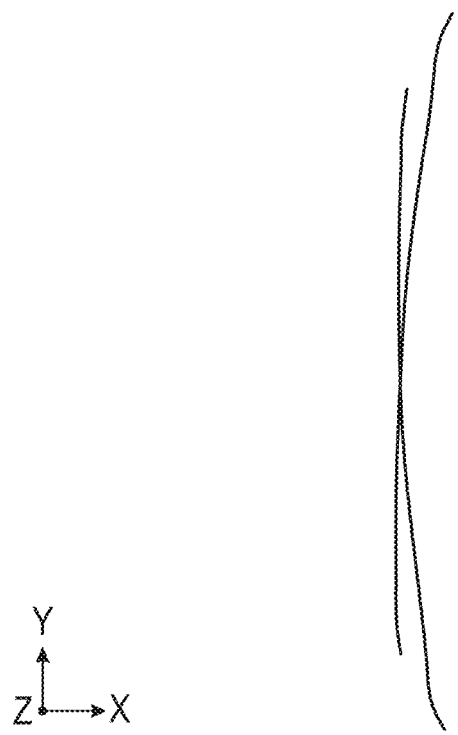
Figure 26C:
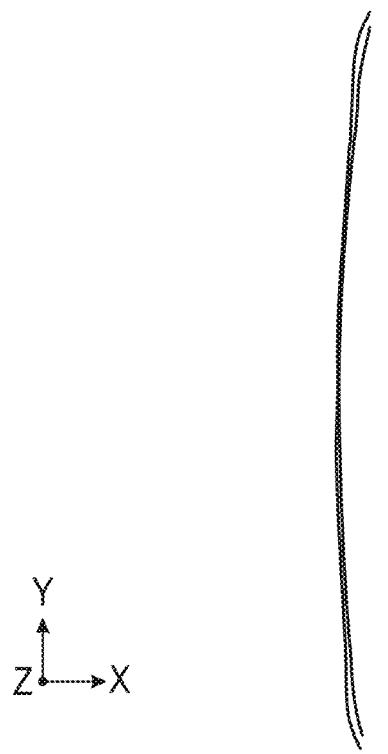

In some embodiments, the tire swath 70 may be roughly oriented in the Y direction (e.g., identifying best fit lines). Rough Y orientation may be achieved by methods including, but not limited to, edge thresholding (e.g., depth on circumferential grooves), identifying vertical line formed by boundaries of protrusions 22, and/or the like. In another example, a series of profiles 360 of the sidewall and shoulder area may be determined using Z-cutting planes as illustrated in FIG. 26A. The Y-orientation may be determined by repetitively reflecting the profiles at the Y origin, and correcting the Y orientation to minimize the distance between the original and reflected profile. FIG. 26B illustrates a profile of the unrotated tire swath 70 alongside its reflection. FIG. 26C illustrates the profile of the Y rotation corrected tire swath 70. Other methods of achieving orientation are described herein.

Figure 26D:
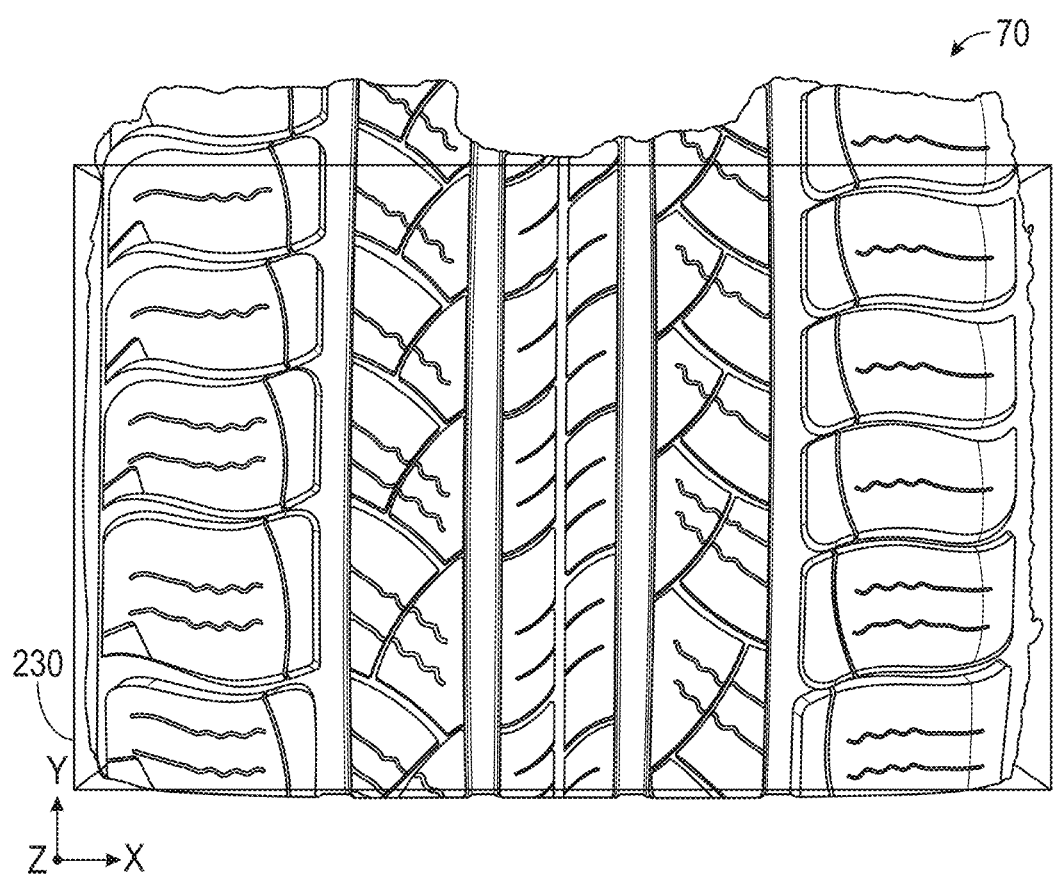
Figure 27A:
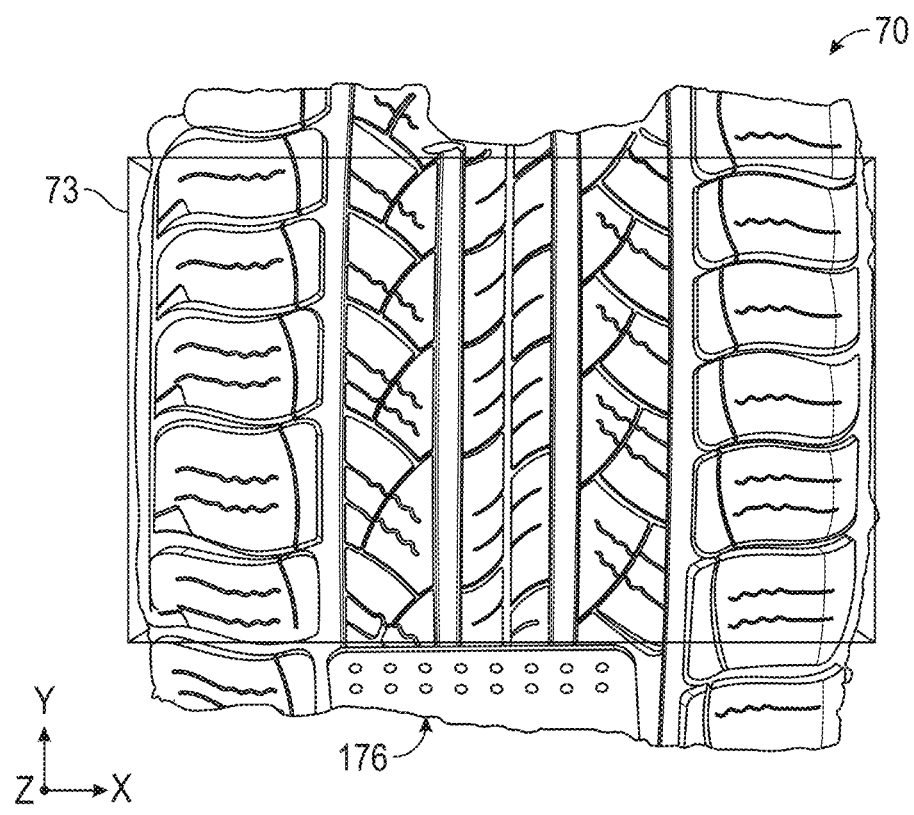
FIGS. 27A and 27B illustrate an exemplary method for removing low quality data using a bounding box in accordance with the present disclosure.
Figure 27B:
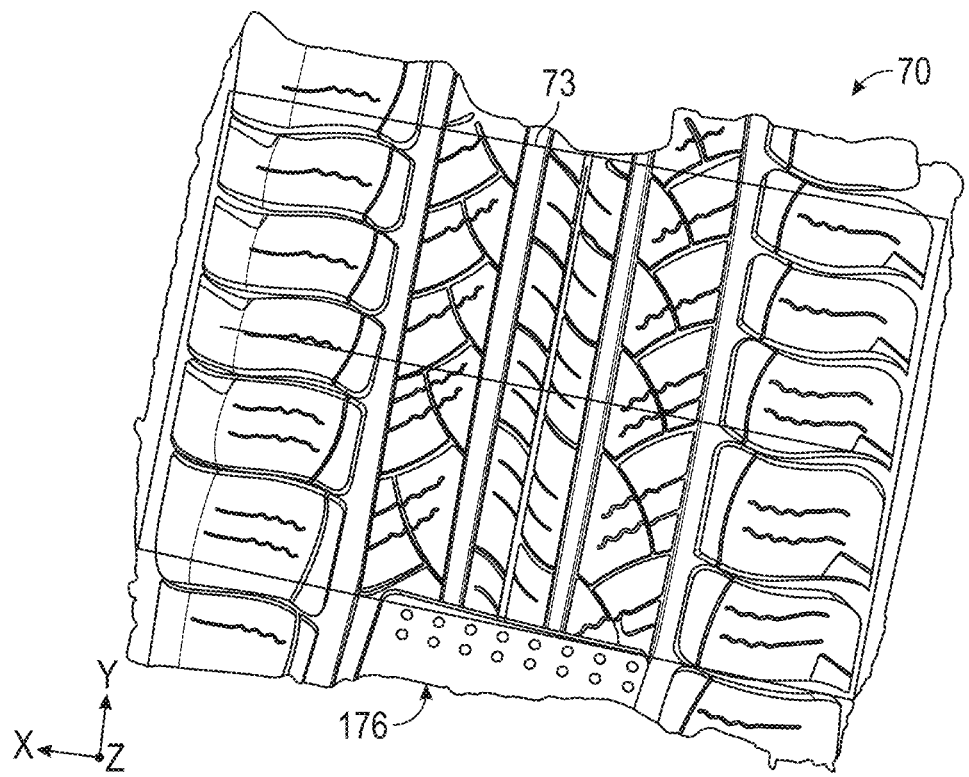

Referring to FIG. 26D, once the swath 70 is roughly oriented in the Y-axis and Z-axis, the swath 70 can be clipped by a bounding box 230 so that it is relatively symmetric in X, Y and Z. low quality data may be removed from the periphery of the tire swath 70. In another example, as illustrated in FIGS. 27A and 27B, the bounding box may be used both to achieve reasonable symmetry on the tire swath 70 and/or to remove extraneous artifacts (e.g., a fiducial card).

Figure 23B:
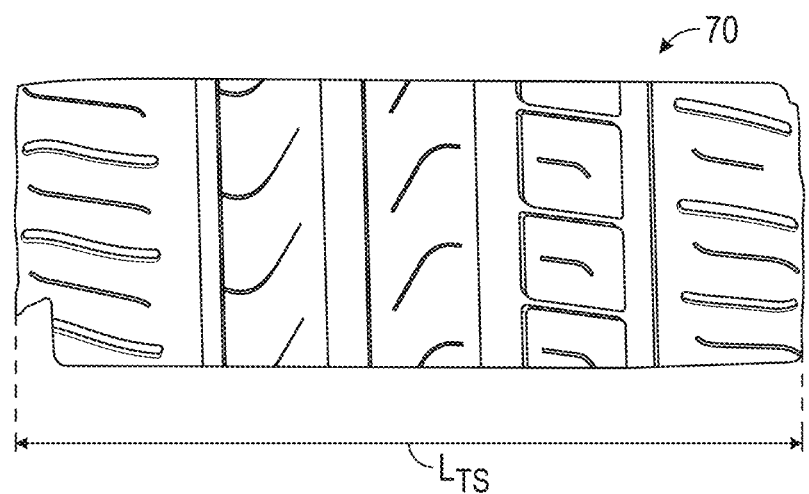
Figure 23C:
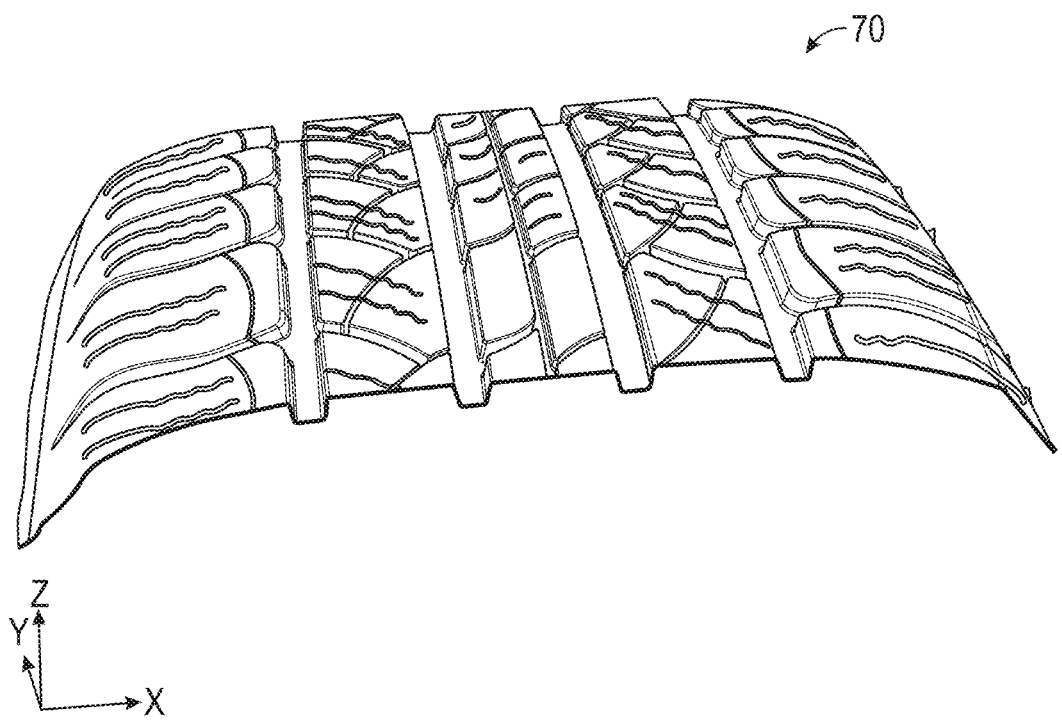
Figure 23D:
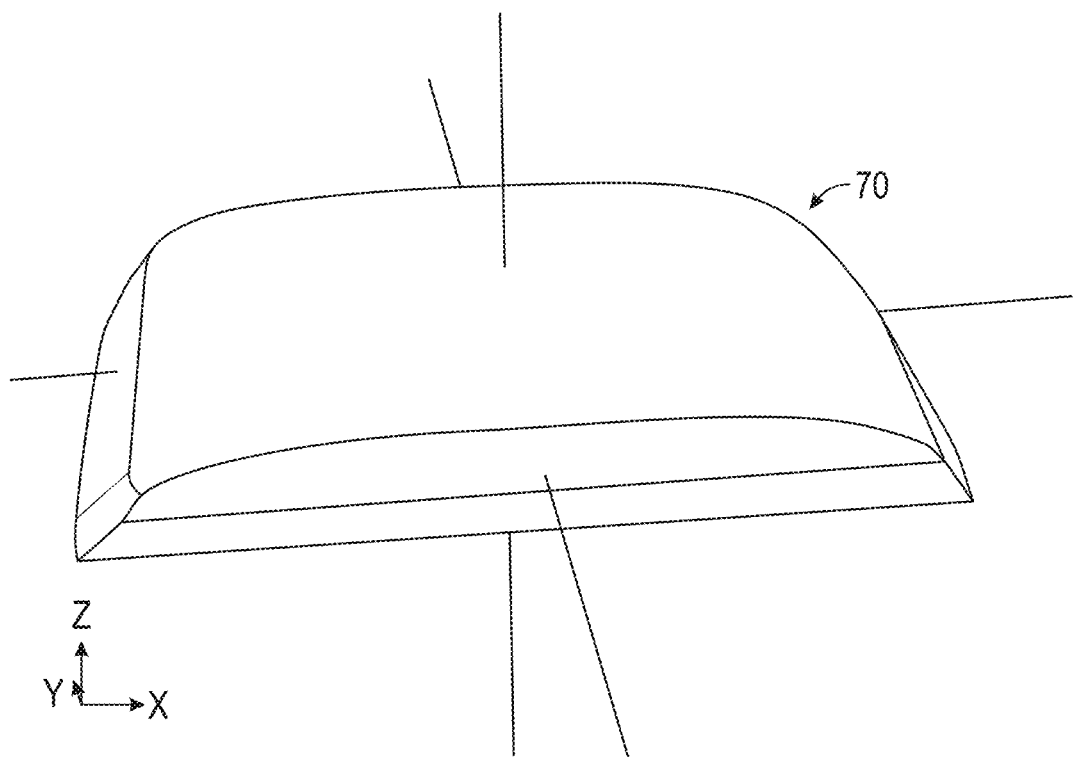
Figure 23E:
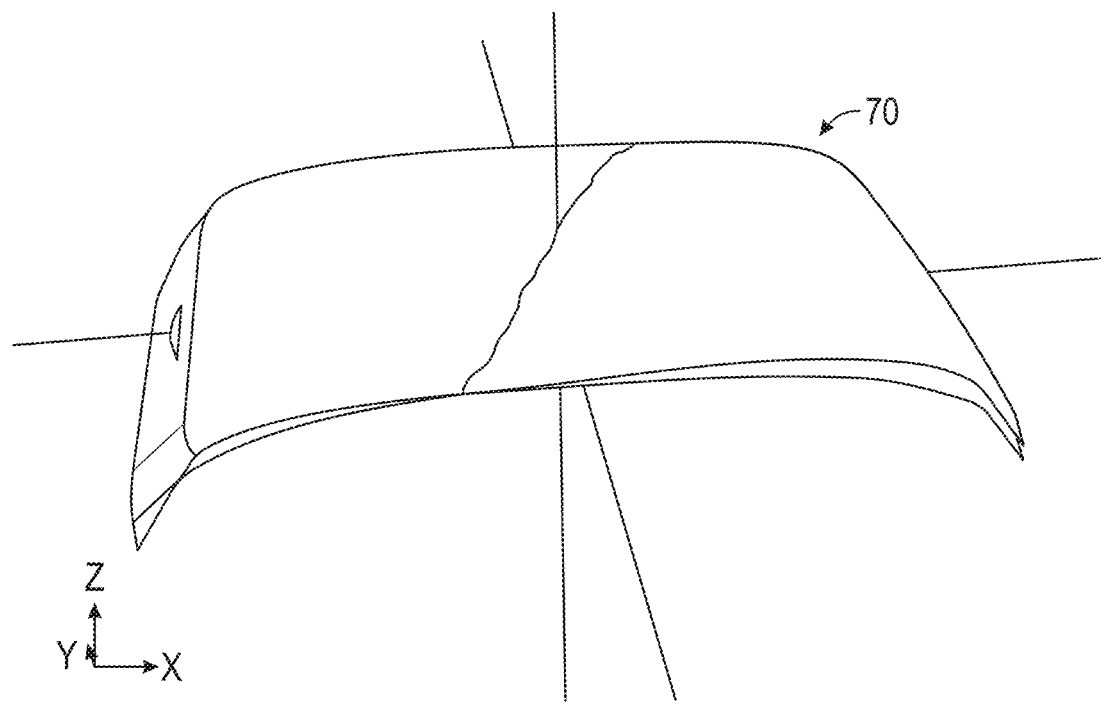
Figure 23F:
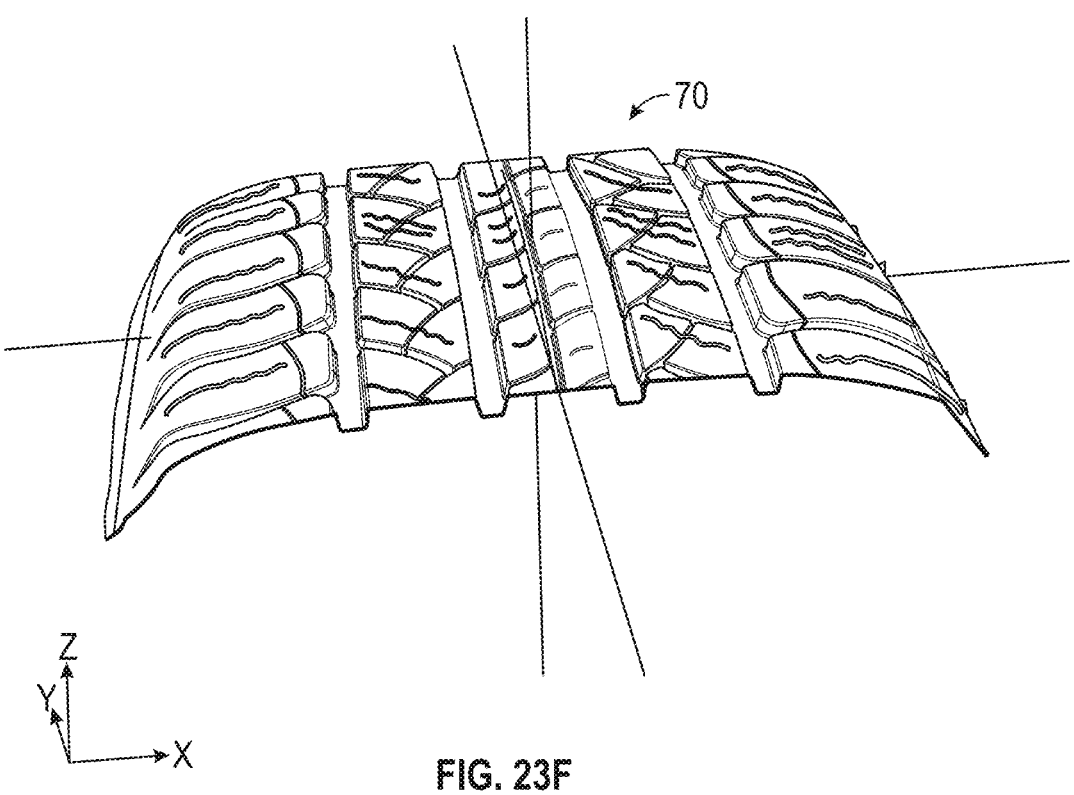

Once the tire swath 70 is roughly oriented and relatively symmetric, FIGS. 23B to 23F illustrate a method to achieve a robust orientation by exploiting symmetry of the tire carcass illustrated in FIG. 23B and FIG. 23C. FIG. 23D illustrates the convex hull of the tire mesh trimmed to remove all faces and points except those at the top (i.e., the hull of the top surface may be extracted (CHTOP)). The resulting tire mesh may be rotated 180 degrees (R180SCHTOP) as illustrated in FIG. 23E. Iterative closet point processing may be performed on the convex hull of the top of the surface (CHTOP) and target (R180CHTOP) registering the original hull to the rotated hull. Distances that are excessively large may be discarded and scale may be adjusted. Without loss of generality (as quaternions or Rodriquez angles may be used as an alternative to rotation matrices), a resultant transformation M (wherein M is applied to the original tire mesh to best fit to the rotated mesh) may be used to better orient the original tire swath 70 in (X, Y, Z) by (a) converting the rotation matrix R in M to Euler notation and separating the translation vector T from M; (b) dividing the resulting Euler angles (x/y/z) and the translation vector by 2 (c) converting the halved Euler angles to a rotation matrix R, and combining R and the modified/halved translation vector T back to a transformation matrix M1; and (d) applying M1 to the original tire mesh as illustrate d in FIG. 23F.

Figure 23G:
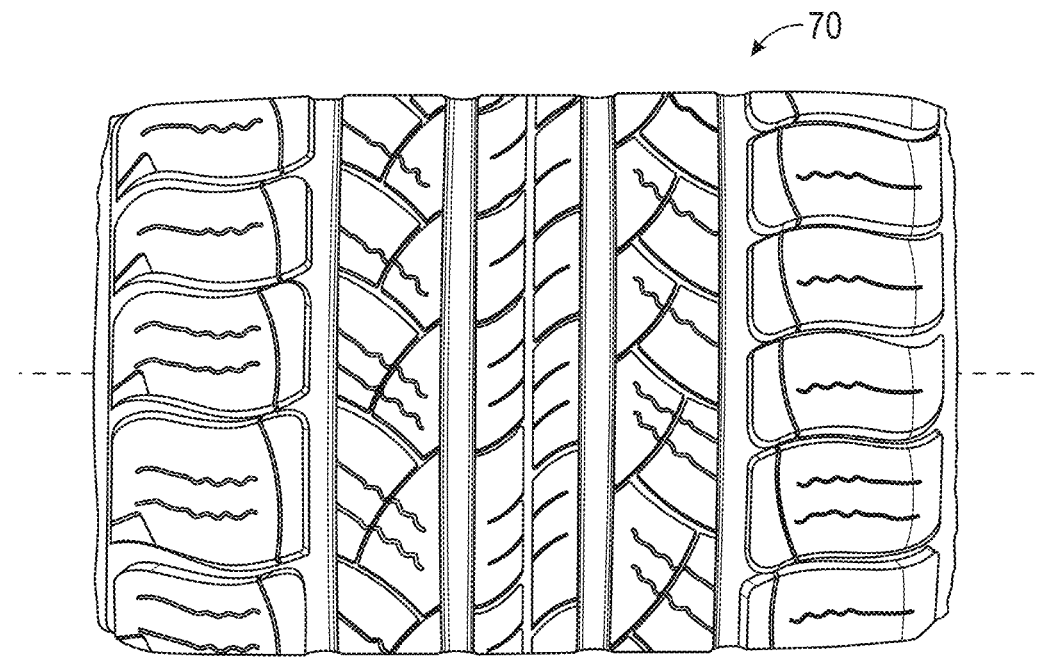
Figure 23H:
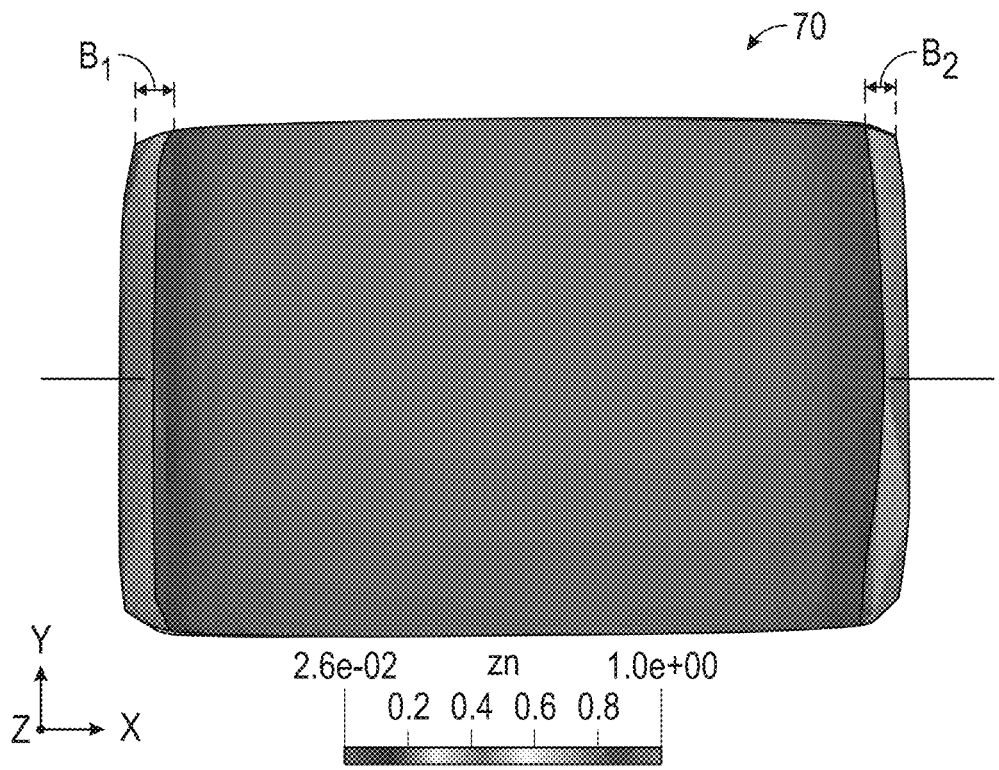
Figure 23I:
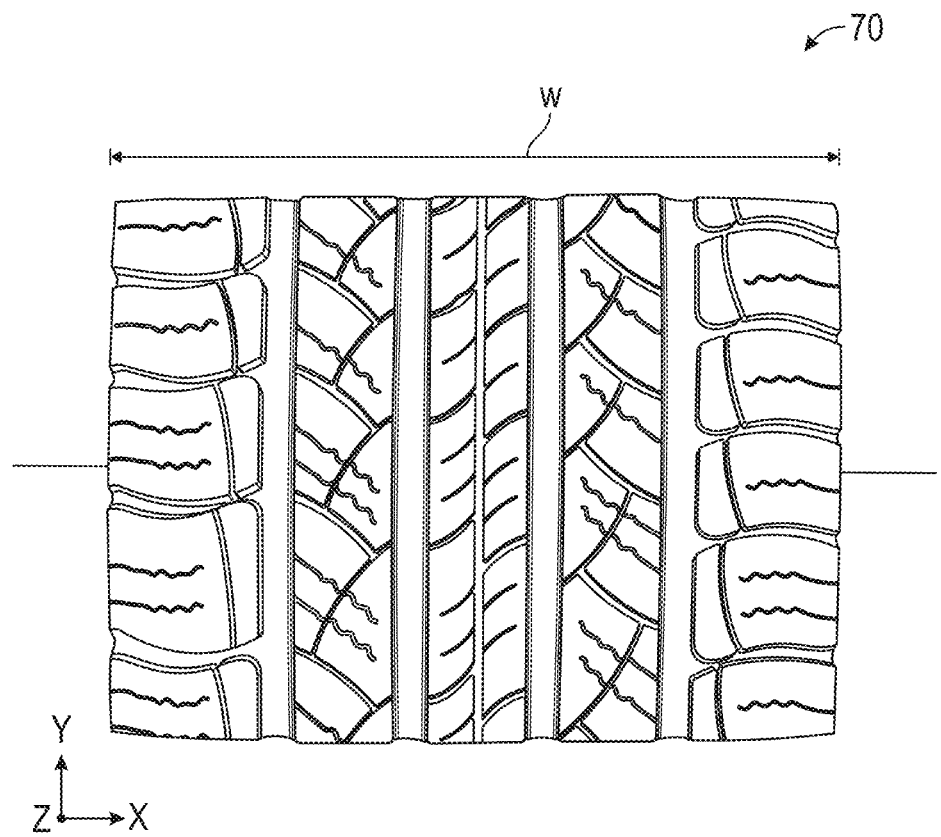

Tire tread width refers to the width of the tire with tread. Tread width is a quantity tracked by tire manufacturers and third party dealers. In swath coordinates, tread width may be measured such as followed. Referring to FIGS. 23G-23I geometric boundaries of tread width may be determined by constructing a convex hull on the tire swath 70 and identifying boundaries B on either side of the tire based on steepest drop. Width of the tire swath 70 may be determined by clipping the tire swath between the boundaries B1 and B2 and determining width. A scale may then be determined between the width of the tread in swath coordinates and world coordinates. In the absence of known tread width, dimensions, it may be estimated as a fraction C of section width. Section width is always a known quantity as section width is branded on each tire. The fraction C may vary between approximately 0.75 and 0.85.

Figure 23J:
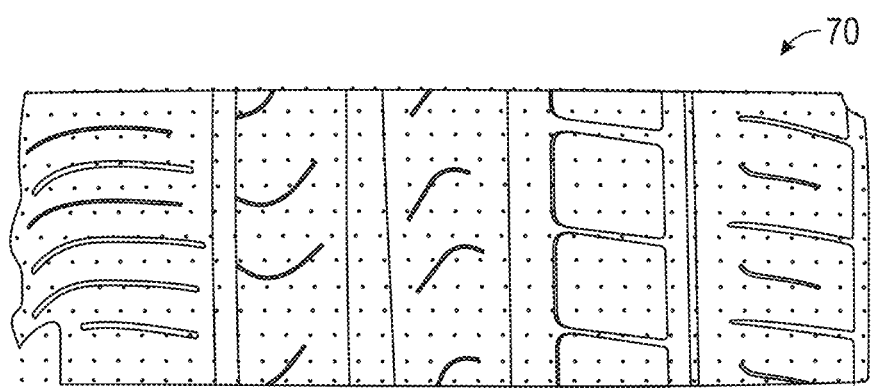

Occasionally, extraneous material (e.g., dirt, stones, vestiges of rubber molding) may be on the object 12 during a scan inducing error such as artificially increasing distance in determining groove depth. In some embodiments, an aggregate convex hull may be determined using multiple slices 220 as shown in FIG. 23J, FIG. 23K and FIG. 23H.

Figure 23K:
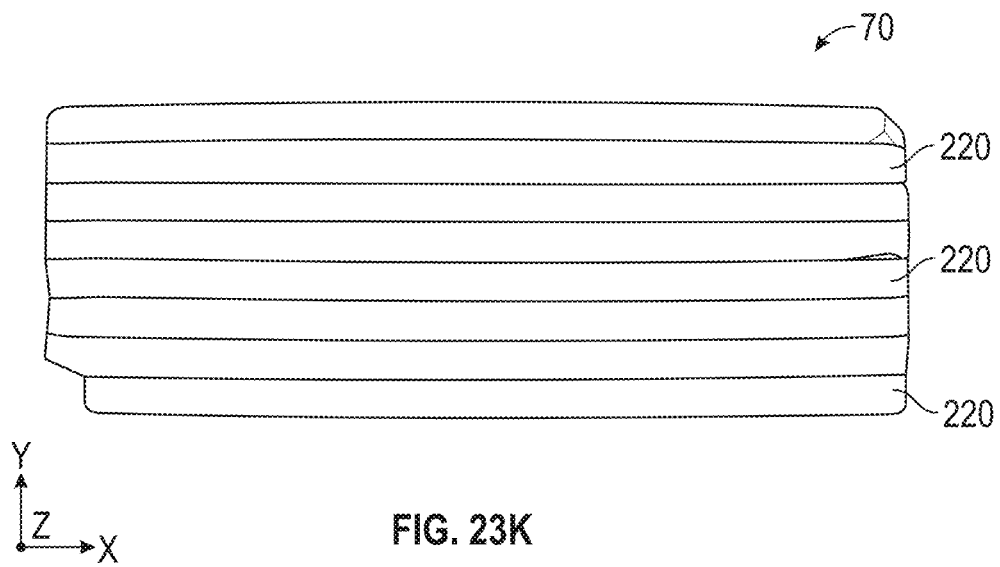
Figure 23L:
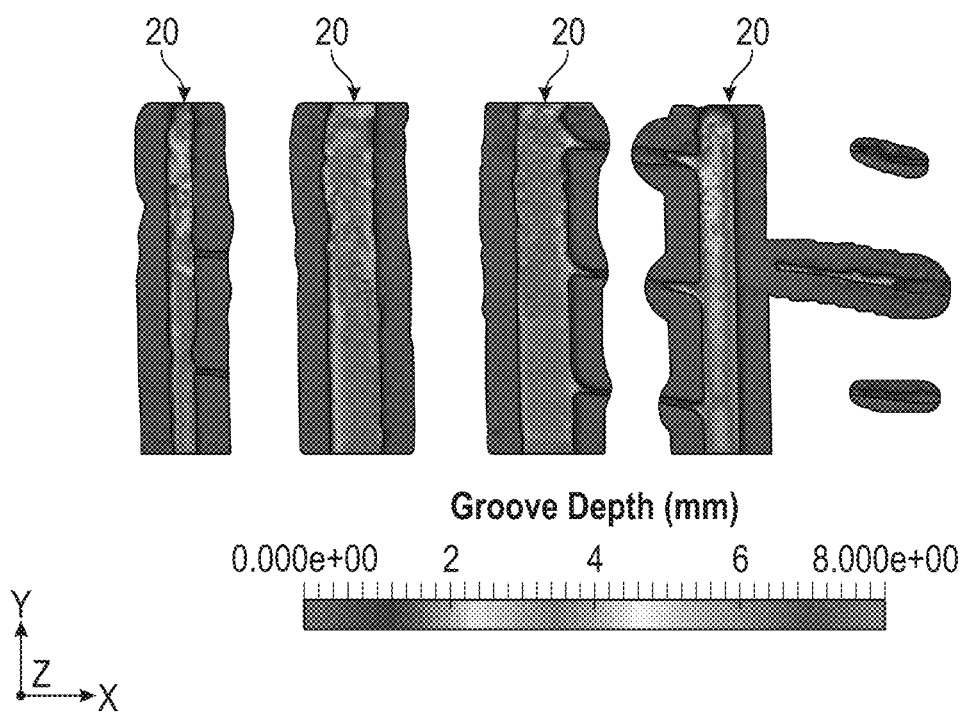

Referring to FIG. 23K, by using the aggregate convex hull with multiple slices 220, the effect of extraneous material may be localized to a cross section. As such, higher depth readings caused by the extraneous material may be removed. In some embodiments wherein the tire surface may not be convex (e.g., due to center wear), depth measurements of the individual grooves 20 may be determined by separating the grooves 20 from the remainder of the object 12 and form convex hulls on each individual groove 20 as illustrated in FIG. 23L Extraneous material outside of the groove 20 may thus be avoided.

In some embodiments, the tire swath 70 may be scaled by capturing at least one image 16 of a known object having known parameters by the IDA system 30. For example, a known object with known parameters may include a penny or a credit card.

Figure 24A:
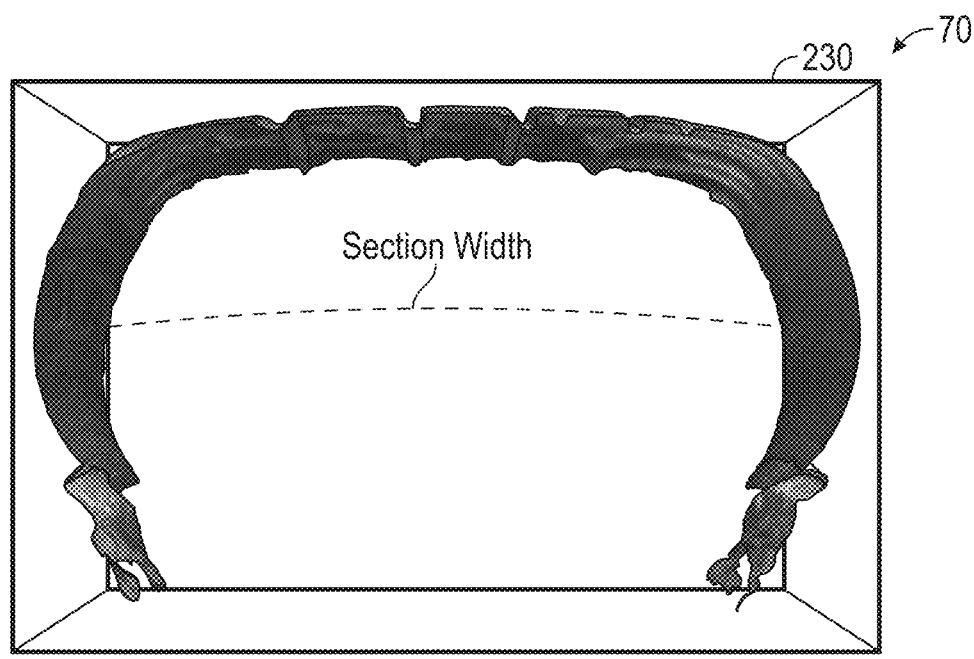
FIGS. 24A-24C illustrate exemplary methods for scaling tire swaths by establishing section width, aspect ratio and/or wheel diameter in accordance with the present disclosure.

Referring to FIG. 24A, in some embodiments, the tire swath 70 may be scaled by establishing section width, aspect ratio and/or wheel diameter. Establishing a scale based on section height may require capture of a larger tire swath 70 or exploitation of tire symmetry, for example. In one example, a scan may be initiated towards the bottom of the outside sidewall of the tire and terminate slightly past the inner shoulder of the tire. A bounding box 230 of the oriented and unscaled tire swath 70 may be used to determine section width, and thus create a swath coordinate to world coordinate scale. It should be noted that three-dimensional extraction of the tire swath that may include section width boundaries may entail capture of a plurality of images across the tire and may be more ergonomically challenging if the tire is mounted on the vehicle. As another alternative, tire diameter may also be used to create a swath coordinate to world coordinate scale.

Figure 24B:
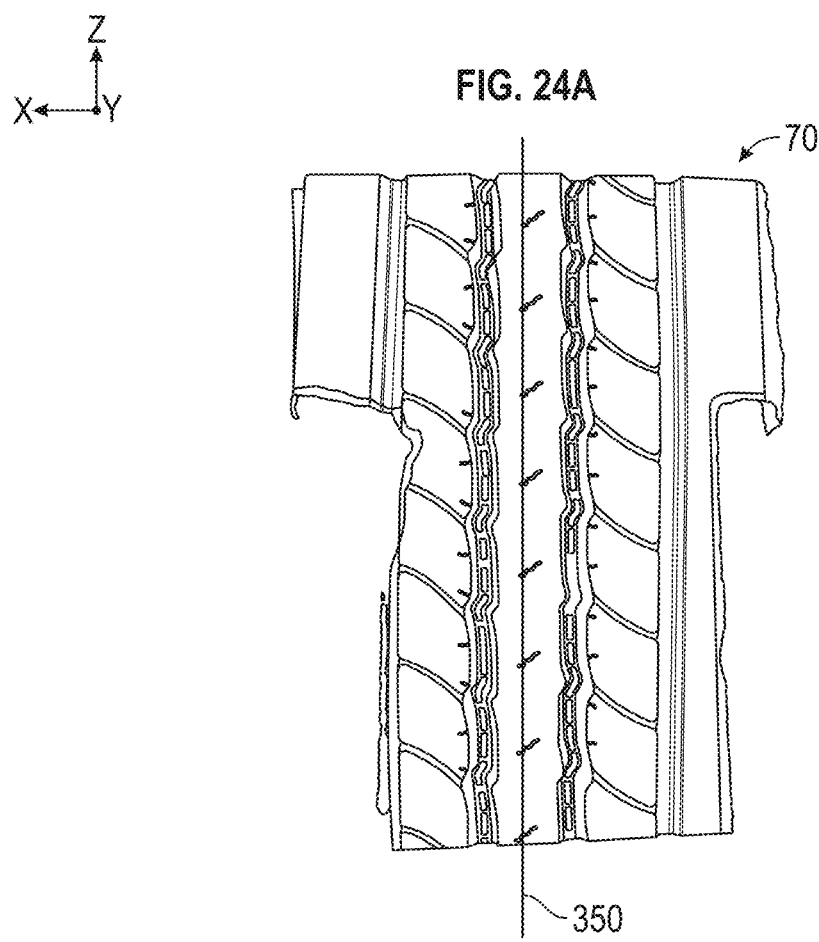
Figure 24C:

Radius of the tire may be determined directly or indirectly from information including section width, aspect ratio and wheel diameter branded on the sidewall of the tire. For example, section height is equal to section width multiplied by aspect ratio and the radius of the tire may be calculated as the sum of the section height of the tire and half of the diameter of the wheel. To estimate the radius of the tire swath 70, a best fit three-dimensional circle may be constructed from a slice down the middle of the tire swath 70 as illustrated in FIG. 24B. In some embodiments, the slice may be thresholded by depth of the grooves 20 to isolate points near protrusions 22 and remove outliers. The slice 350 may then be fit to the best fit circle associated with point in FIG. 24C and a scale may be constructed by using the calculated radius in swath coordinates and the known radius in world coordinates. It should be noted that the accuracy of the estimated radius may depend in part on the circumferential span of the tire swath 70. For example, in FIG. 24B, a sequence of images was captured across the tread and then another sequence of photos was captured down the middle. The top third (approximately) of the tire swath 70, including shoulders on each side, may be used to orient the tire swath 70 (as described herein) for determination of radius.

The tire swath 70 may be registered (e.g., superimposed) on one or more tire swaths 70a obtained from the same and/or similar tires to identify alterations in grooves 20 and 20a and/or protrusions 22 and 22a between the swaths 70 and 70a. Generally, analysis may be on the grooves 20 and 20a as grooves 20 on the tire having wear may not be altered significantly with wear and thus distinguishable within scans. Further, registering the tire swath 70 may include exploitation of geometry of the object 12 that undergoes minimal change or no change during wear of the object 12. For example, if the object 12 is a tire, then grooves 20 of the tire and sidewalls may be used to aid in registering the tire swath 70 to tire swath 70*a*. The tire swath 70*a* may be a new tire or used tire. For example, the tire swath 70*a* may be a used tire and evaluation of the tire swath 70 as compared to the tire swath 70*a* may provide data regarding change in wear over a pre-determined time period (e.g., 2 months).

Figure 18A:
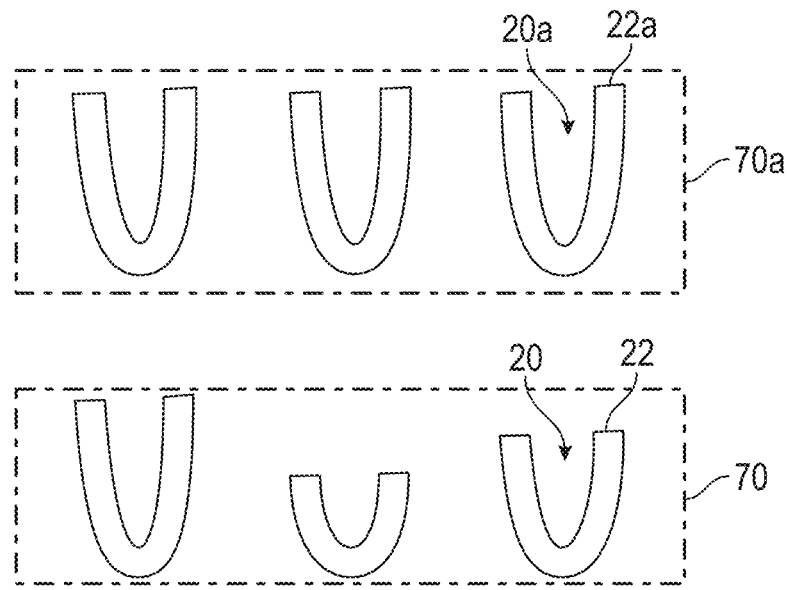
FIGS. 18A-18E illustrate registration of a tire swath using grooves in accordance with the present disclosure.
Figure 18B:
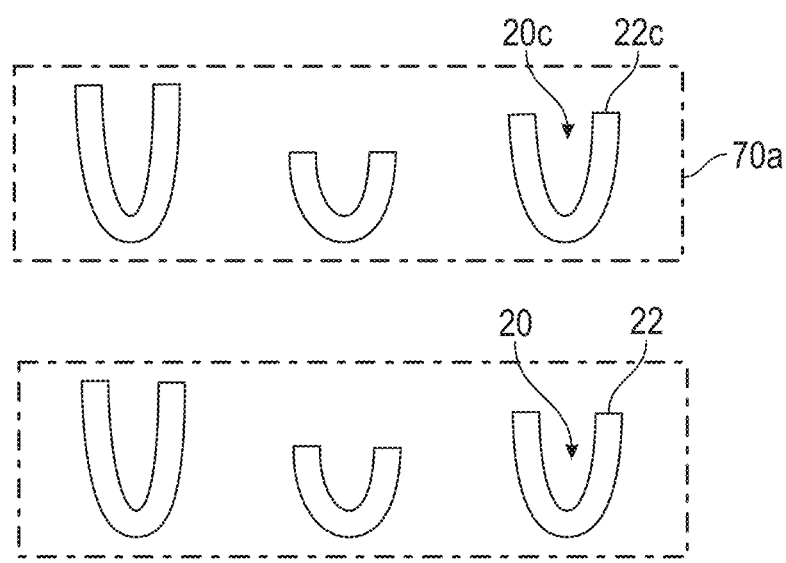
Figure 18C:
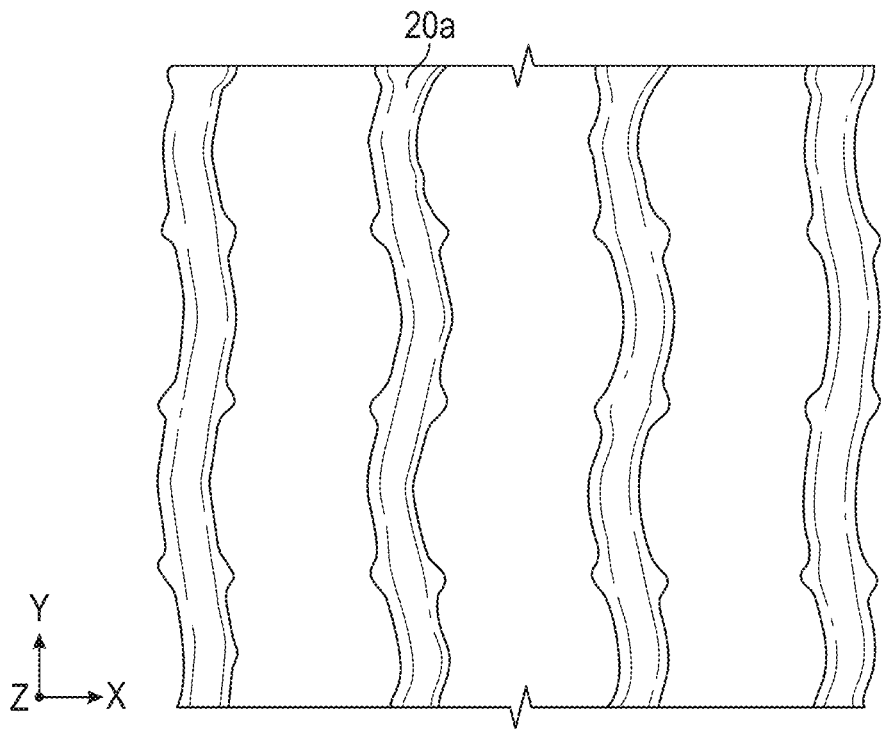
Figure 18D:
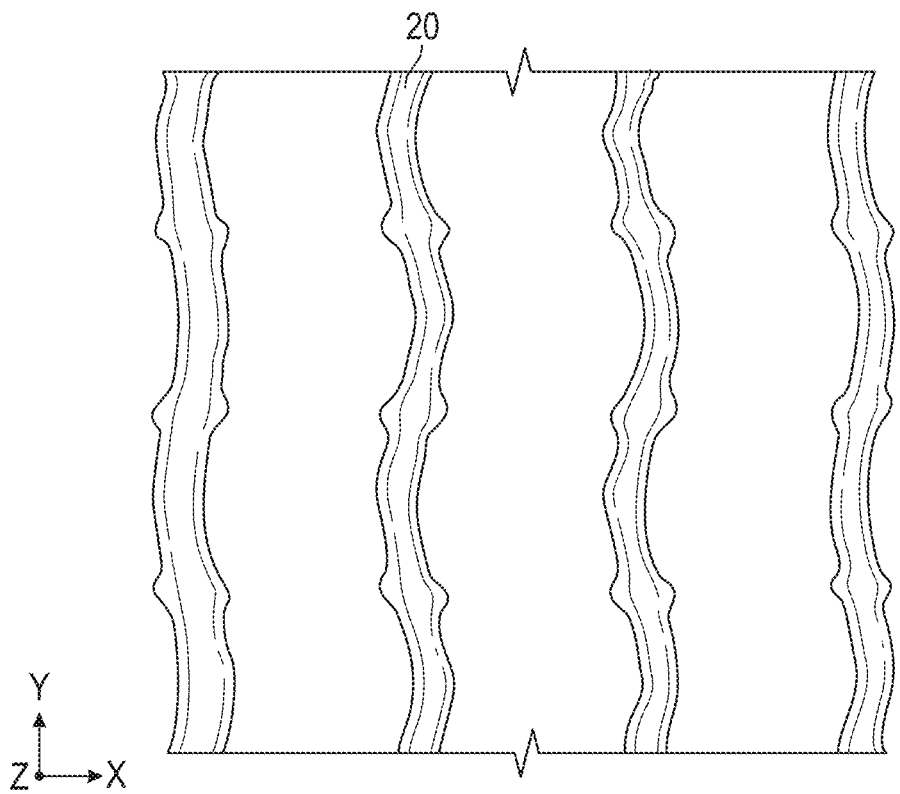
Figure 18E:
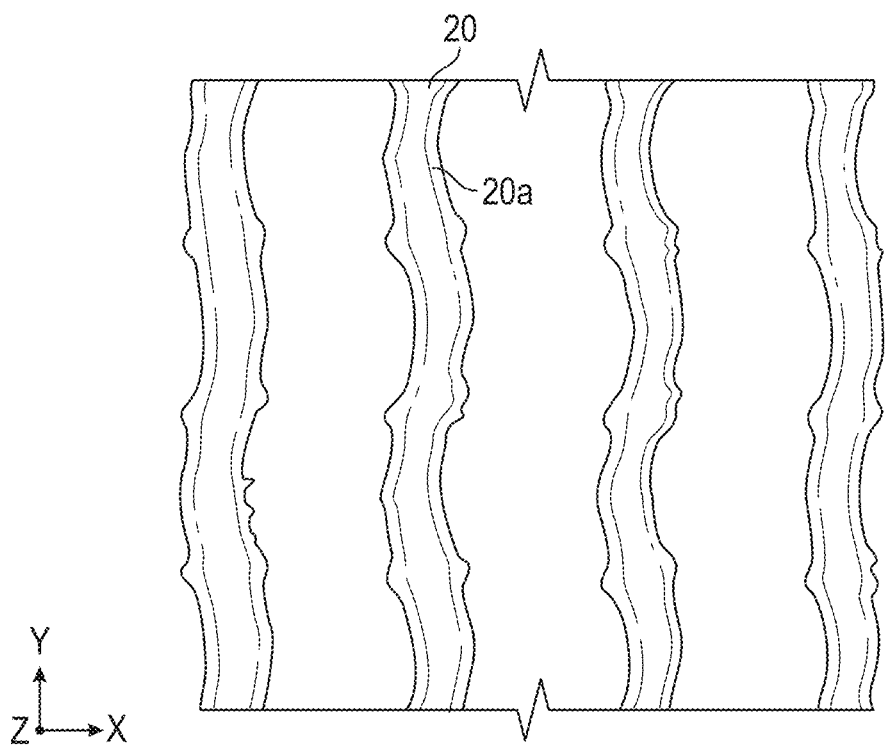

In some embodiments, the scans may be thresholded by distance so as to limit the view to the grooves 20*a* and 20. For example, by thresholding each groove 20*a* of the tire without wear the groove 20*a* may be matched with the depth of the corresponding groove 20 of the tire having wear as shown in FIGS. 18A and 18B. The tire swath 70*a* may be altered such that each groove 20*a* is worn down to approximately the size of the groove 20. Determination of such approximation may be based on approximate distance of wear to obtain groove 20*c* illustrated in FIG. 18B. It should be noted that the size and/or shape of groove 20*c* may not be exactly the size/shape of groove 20. Thresholding may be limited to the average depth of grooves 20 for the tire with wear. Grooves 20 of the tire with wear may then be translated down in the Z axis based on the difference between grooves 20 and grooves 20*a* such that the grooves 20 and 20*c* may be registered as shown in FIGS. 18B and 18C. In some embodiments, ICP (i.e., weighting ICP) may be performed on the grooves 20 and 20*a* providing a transformation T. As such, weighting may provide substantially equal weight latitudinally across the tire swath 70 to the different grooves 20 such that shallow grooves may have as significant an impact on the resulting transformation as deep grooves. The tire swath 70 may be transformed based on the transformation T as shown in FIG. 18D. In some embodiments, rigid body transformation may be performed. In some embodiments, non-rigid body transformation may be performed.

Referring to FIGS. 1 and 18A-18E, in some embodiments, the pattern of the grooves 20 and protrusions 22 may be complicated (e.g., more than simple circumferential groove of same dimension). For complicated patterns, the tire swath 70 may be rotated about the tire swath 70*a* to locate a match of the pattern between the tire swath 70 and the tire swath 70*a*. In this example, the tire swath 70*a* may contain at least one entire pattern (e.g., tread cycle). Further, a map of the tire swath 70 and/or tire swath 70*a* may be determined using one or more metrics. Metrics may include, but are not limited to, depth of grooves 20 (such as described and determined herein), direction of grooves 20, width of grooves 20, and/or the like. For example, a map may be determined using width of grooves 20 with an assumption that width of the groove 20 may diminish as depth of the groove 20 decreases.

Diagnosis of wear of the object 12 may be determined using the convex hull analysis, orientation analysis, registration analysis as described in further detail herein.

In some embodiments, depth of the grooves 20 provided by the convex hull analysis may provide one or more action items related to the object 12. For example, depth of the grooves 20 determined by the convex hull analysis may be averaged and the average may be compared against one or more databases having one or more thresholds for tire replacement recommendation. In another example, depth of the grooves 20 may be determined by the convex hull analysis and each measurement compared against one or more databases having one or more thresholds. New tires may typically come with $10/32"$ or $11/32"$ tread depths. In some embodiments, the threshold for tire replacement recommendation may be based on the U.S. Department of Transportation recommendation of replacement of tires when they read $2/32"$. In some embodiments, the threshold for tire replacement recommendation may be based on state law. For example, the one or more database may include one or more states within the United States and the associated legal threshold for tread depth.

In some embodiments, once the tire swath 70 is oriented, one or more diagnosis related to wear of the tread may be determined. For example, heel toe wear and camber wear may be determined subsequent to orientation of the tire swath 70. Generally, for each of the heel toe wear and camber wear, the tire swath 70 may be compared to known patterns of wear related to heel toe wear and camber wear as described in further detail below.

Figure 19A:
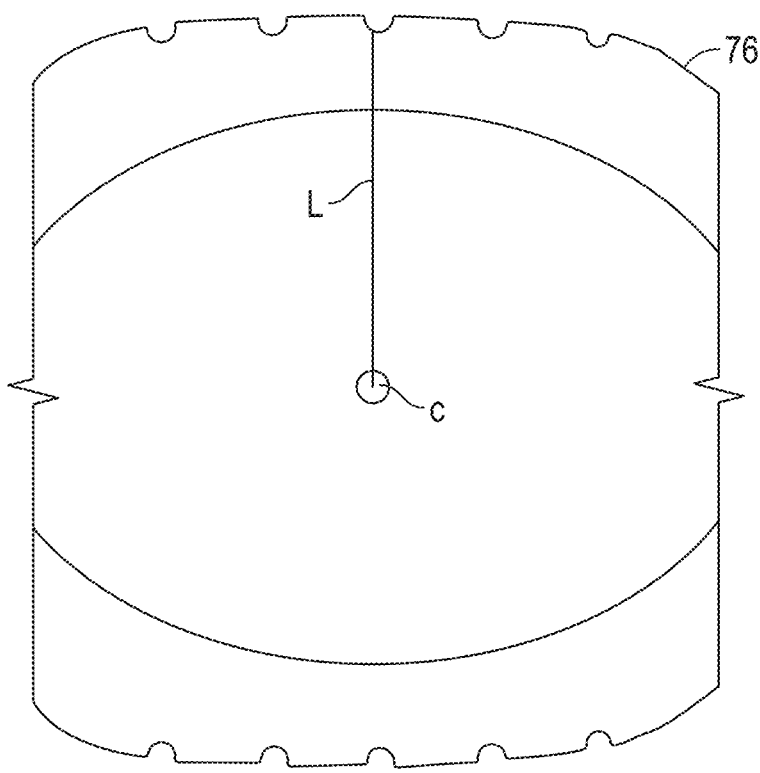
FIGS. 19A and 19B are diagrammatic views of a tire swath illustrating alignment of a tire, and in particular, effects of camber wear on the tire swath of a new tire and a tire having tread wear.
Figure 19B:
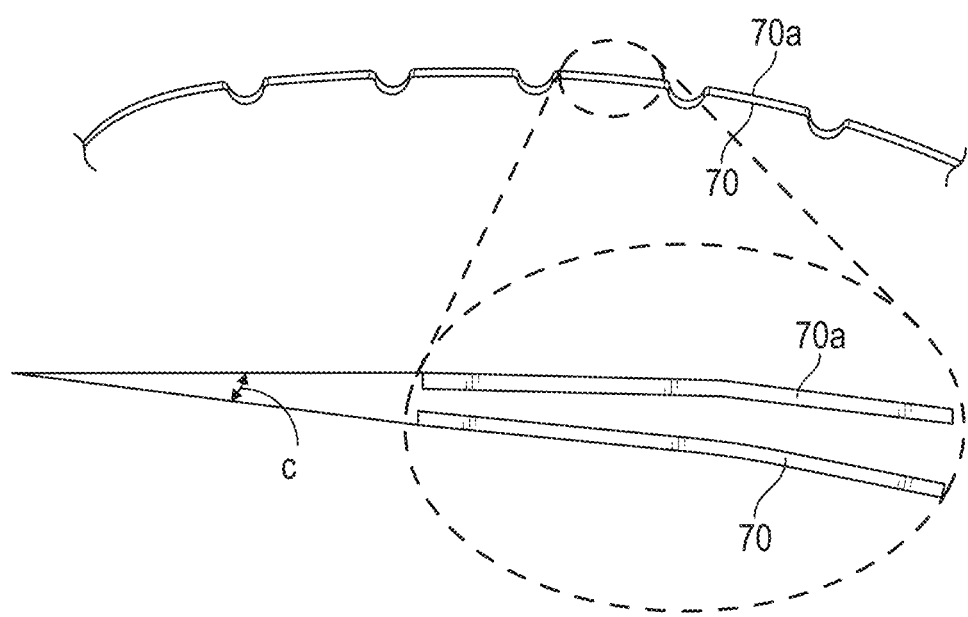

FIG. 19A illustrates the tire swath 70. A vertical line L is provided extending from the center of the wheel. As the surface of the tire is reflective of alignment issues, an evenly worn surface may indicate that the vehicle is correctly aligned. FIG. 19B illustrates the effects of camber wear on the tire swath 70. As the tire is tilted, a portion of the tire may be raised off of the ground while the remaining portion may be heavily worn according to the camber angle $\Theta c$ of the tilt. Generally, for camber diagnostics, the relative angle of the protrusions 22 between the tire swath 70 and the tire swath 70*a* may be evaluated. The baseline tire swath 70*a* may be registered to the tire swath 70 based on the grooves 20 as described in detail herein. For example, in FIG. 19B, the baseline tire swath 70*a* and the tire swath 70 (e.g., worn tire) may be oriented and registered as described in further detail herein. Once oriented and registered, the baseline tire swath 70*a* may have a camber angle $\Theta c$ of 0 degrees even though surface of the protrusion 22 may be slightly angled. The difference between the angle of the tire swath 70*a* and the tire swath 70 is the camber angle $\Theta c$.

Protrusions 22 may develop excessive wear on the edge that touches the road last, known as "heel and toe" wear. An action item, such as changing direction of rotation (e.g., rotating tires) may counteract this pattern. It should be noted that currently industry practice does not provide measurement for heel toe wear. As such, it is contemplated herein, a database may be provided and determined for one or more reference points (e.g., thresholds) for "heel and toe" wear. For example, using system and techniques provided herein, one or more database may be determined having tire type (e.g., manufacturer, model, pattern) and associated measurements related to heel and toe wear as described in detail herein. Additionally, one or more thresholds may be determined to provide one or more action items based on the configured database. For example, by analyzing the configured database, a threshold for one or more measurements may include an action item prompting a user to replace one or more tires.

Figure 20A:
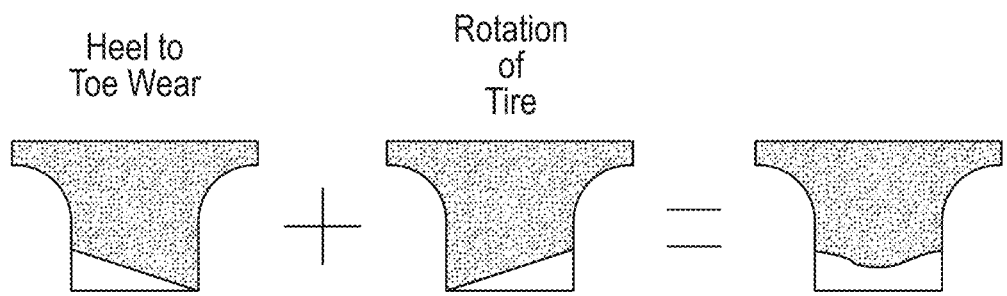
FIGS. 20A and 20B are diagrammatic views of a protrusion of a tire, and in particular, effects of heel and toe wear on the protrusion and effects of rotation of tires to counteract wear.
Figure 20B:
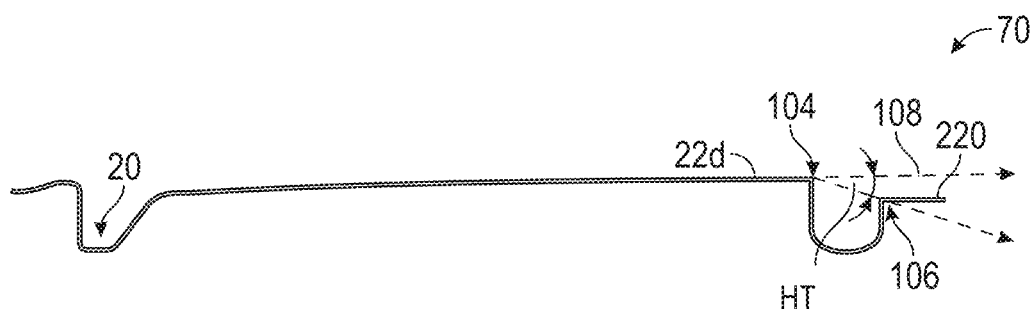

FIG. 20A illustrates effects of heel and toe wear on protrusions 22 and how rotation of tires may aid in counteracting the wear. Referring to FIG. 20B, to determine heel and toe wear, a line 103 may be extended from a first edge 104 of a first protrusion 22*d* to a second edge 106 of a second protrusion 22*e*. The slope S of the line 103 may be determined. Additionally, a line 108 may be extended from the first edge 104 to an expected edge 110 of the second protrusions 22*e*. The angle formed at the intersection of lines 103 and 108 may provide a heel top angle $\Theta_{HT}$. A pre-determined threshold may be determined for the heel top angle $\Theta_{HT}$ for one or more action items. For example, a pre-determined threshold may be determined for the heel top angle $\Theta_{HT}$ for recommendation of the action item of a tire rotation.

In some embodiments, the slope S may be identified circumferentially. For each tire, for example, depth may be determined on multiple sides of the protrusion 22. For example, depth may be determined on the side of the protrusion 22 that leads (i.e., touches ground first) and side of the protrusion 22 that trails. The Heel/Toe Ratio may then be determined using EQ. 3:

$$\text{Heel/Toe} = \text{Average Leading Edge Depth/Trailing Edge Depth} \quad (\text{EQ. 3})$$

A pre-determined threshold may be determined for Heel/Toe Ratio for one or more action items. As such, tires may be rotated when the heel toe ratios reaches a pre-determined threshold, for example.

Figure 21A:
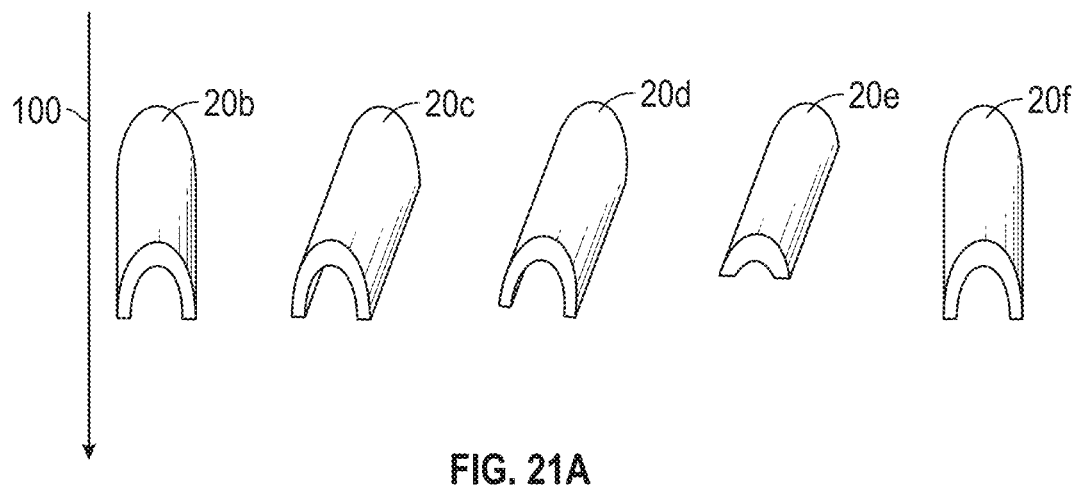
FIGS. 21A-21C illustrate identification of toe wear of a tire swath in accordance with the present disclosure.
Figure 21B:
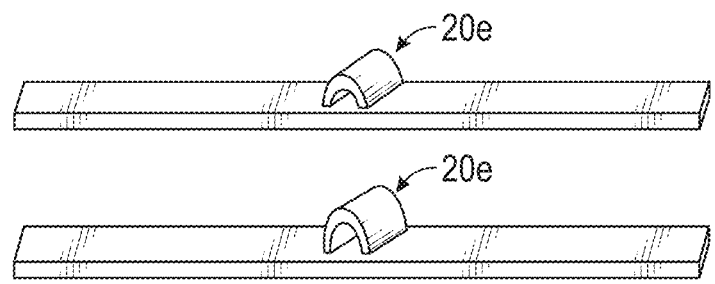
Figure 21C:
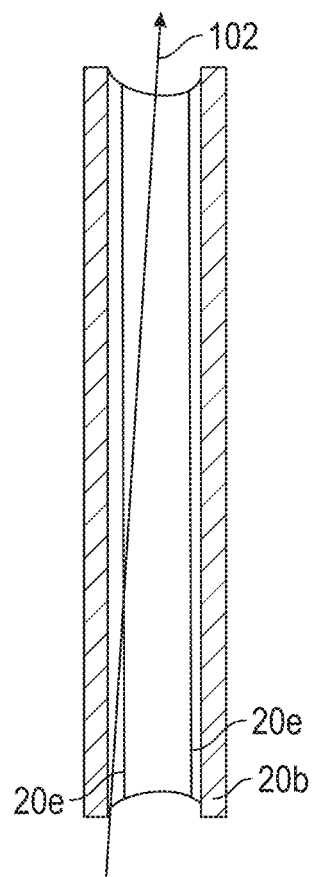

Orientation and registration of the tire swath 70 on a baseline tire swath 70a may provide an indication and diagnosis for toe wear. FIGS. 21A-21C illustrate toe wear of the tire swath 70. FIG. 21A illustrates response of the grooves 20b-20f to different types of wear. The direction of the vehicle is indicated by line 100. Without loss of generality, the driver side tire is herein described. Generally, groove 20b illustrate no wear (i.e., substantially perfect alignment). The groove 20c illustrates a stationary vehicle and shows a slight rotation in the XY plane. The groove 20d illustrates a moving vehicle. The wheel (and thus the groove 20) may be rotated slightly in both the XY and XZ planes. Wearing effect of toe wear may not yet be visible. Referring to FIGS. 21A and 21B, the groove 20e illustrates tread wear after miles. In FIG. 21B, the top figure illustrates later effects of wear while the bottom figure illustrates early effects of wear. Referring again to FIG. 20A, the groove 20f illustrates registering the groove 20e to the groove 20b. The groove 20e may indicate the orientation and magnitude of toe (i.e., negative amount of XY rotation required to register the groove 20b).

FIG. 21C illustrates a planar view of the groove 20e registered to the groove 20b. The arrow 102 may follow the boundary between the groove 20e and the groove 20b. The direction of the arrow 102 may correspond to the amount of toe.

In some embodiments, a tire may be characterized as a series of three-dimensional cylinders, symmetric across the X centerline. Certain properties of the oriented tire swath 70 may be exploited to confirm orientation and/or improve orientation (of the un-oriented tire swath 70) and/or to construct a reliable scale converting the tire swath 70 to a measure surface. These properties may include: center of the tire having the greatest circumference (and a known circumference for purpose of determining a scale); circumference of cylinders at roughly the same X displacement from the centerline may be similar in magnitude; and, assuming one of the three-dimensional circle fitting algorithms (e.g., minimizing Sampson distance, least squares fit, eigenspace decomposition and/or the like) is used to find circumference at a specified X displacement (i.e., latitudinal position) based on a cross section of points from the tire swath 70 captured at X. Measurements from a tire swath that is un-oriented may correspond to an ellipse and may have greater errors (and more outliers) than oriented tire swath.

Figure 25A:
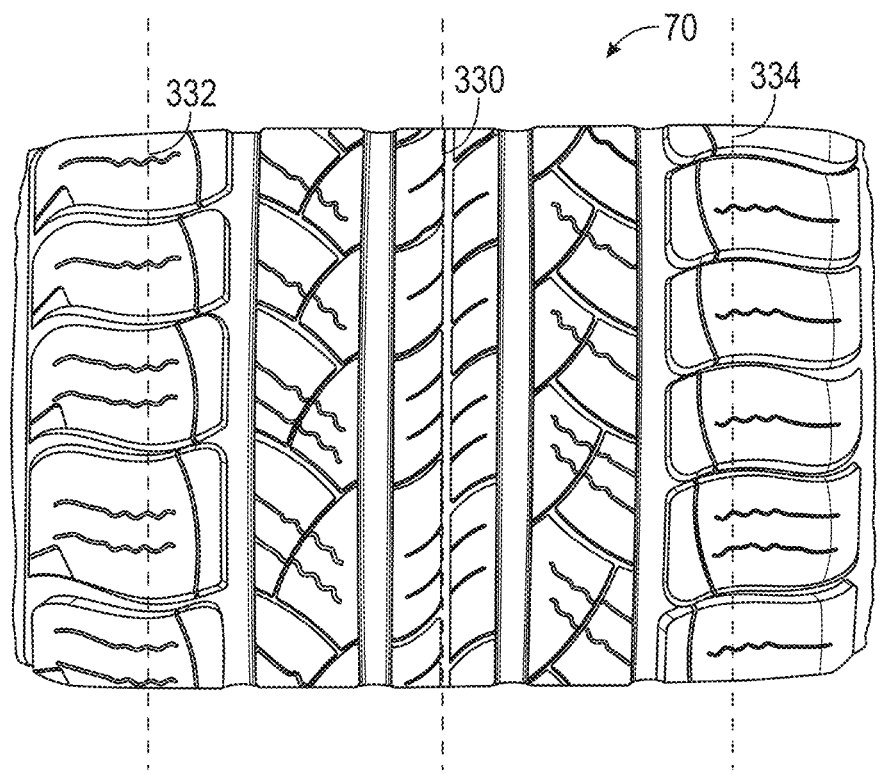
FIGS. 25A-25D illustrate exemplary methods for orienting a tire swath in accordance with the present disclosure.
Figure 25B:
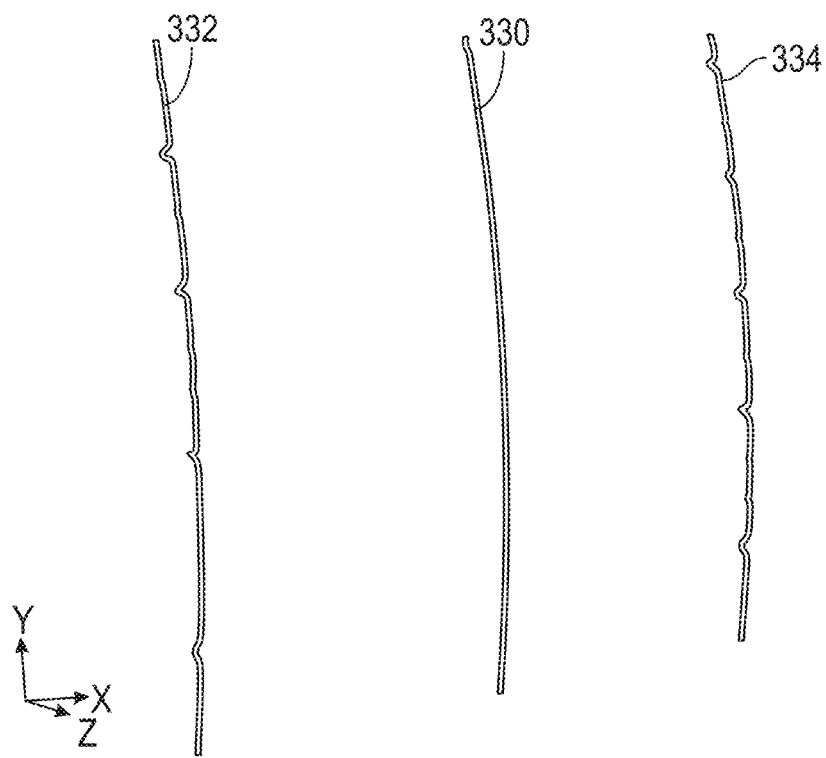
Figure 25C:
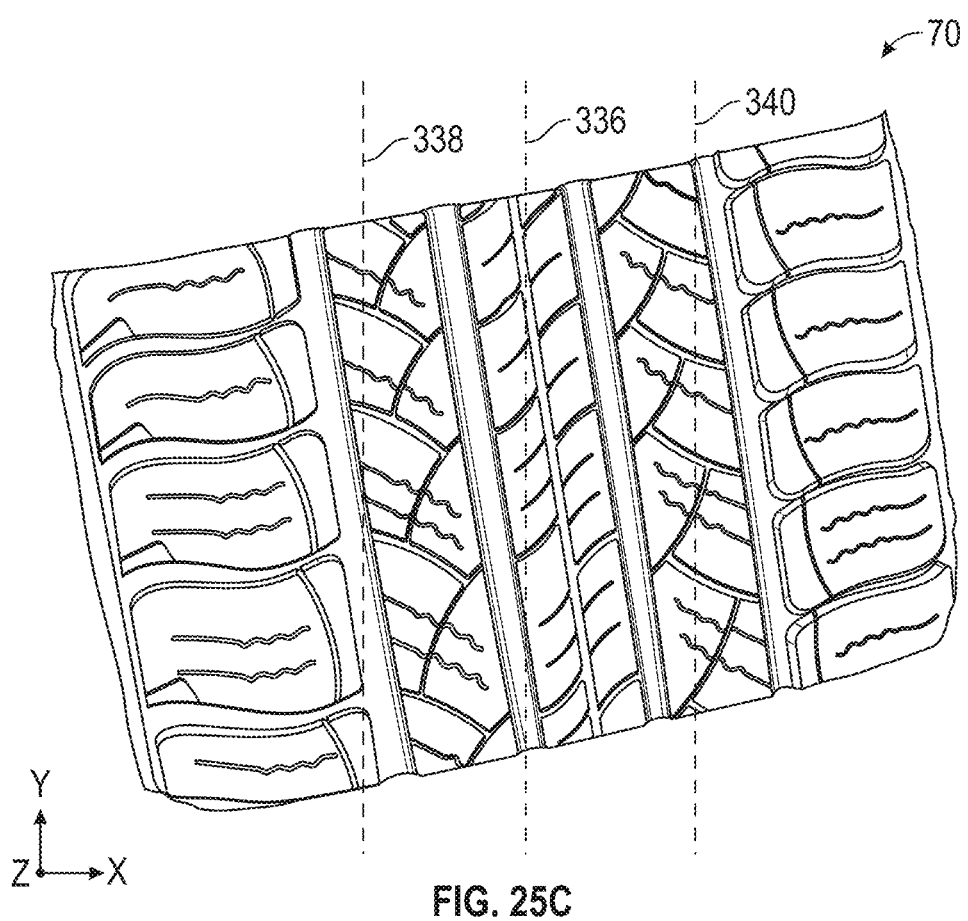
Figure 25D:
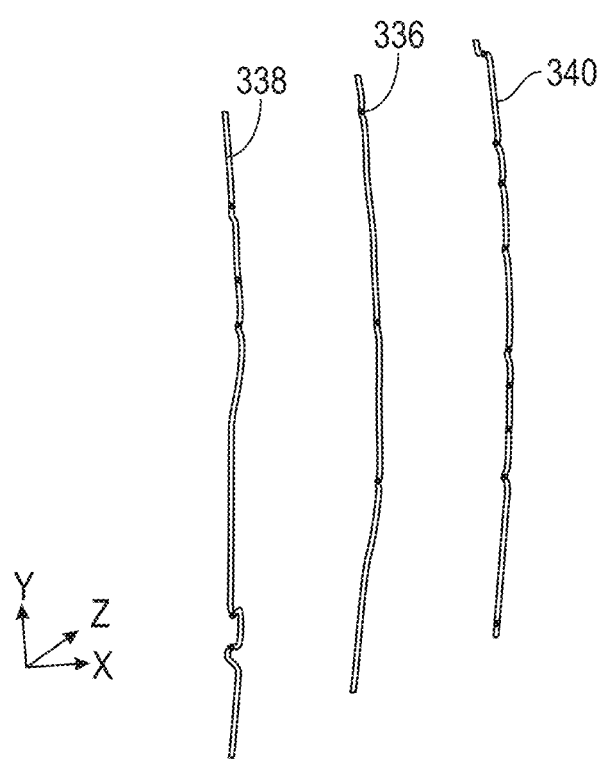

FIGS. 25A-25D illustrate an exemplary method of orienting the tire swath 70 using the cylindrical nature of the oriented swath. FIG. 26A illustrates the oriented tire swath 70 includes a sliced center 330 and displacement slices 332 and 334 at a first side and a second side of the center, respectively. FIG. 25B illustrates the center slice 330 and the displacements slices 332 and 334. The center slice 330 has the largest radius. The radius of the displacement slices 332 and 334 are nearly identical. FIG. 25C illustrates the tire swath 70 unoriented. The unoriented tire swath 70 includes a sliced center 336 and displacement slices 338 and 340. The slices of the tire swath 70 that is unoriented includes slices that may not be circular in nature (i.e., there may be significant outliers using best fit circle). To that end the sliced center 336 may deviate in circumference as compared to the displacement slices 338 and 340 as shown in FIG. 25D.

Figure 28A:
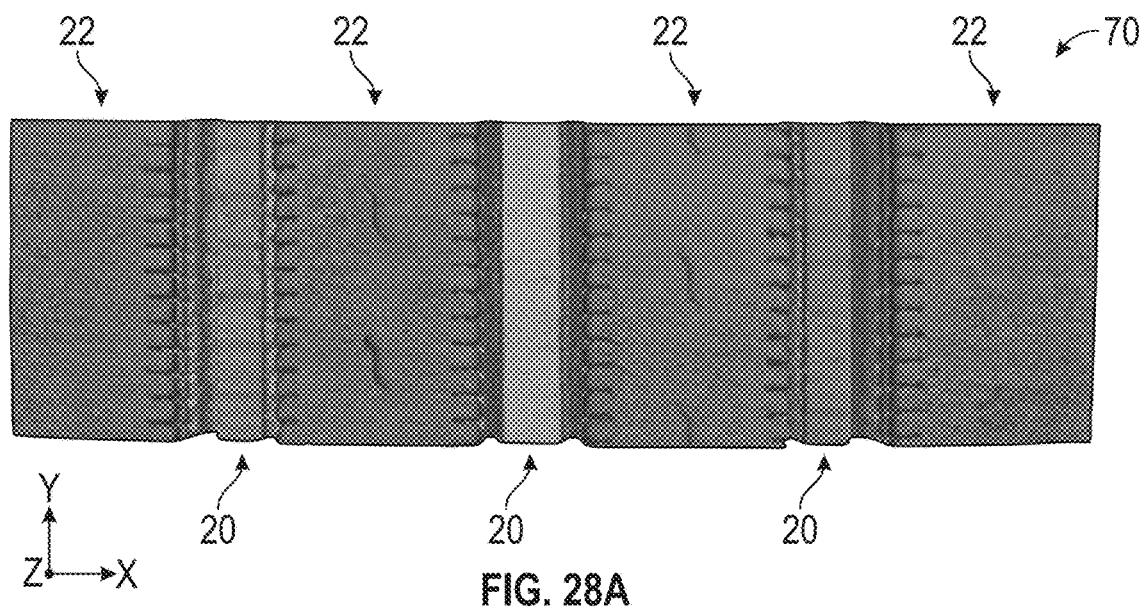
FIGS. 28A-28C illustrate another exemplary method for orienting a tire swath using a metric scale.
Figure 28B:
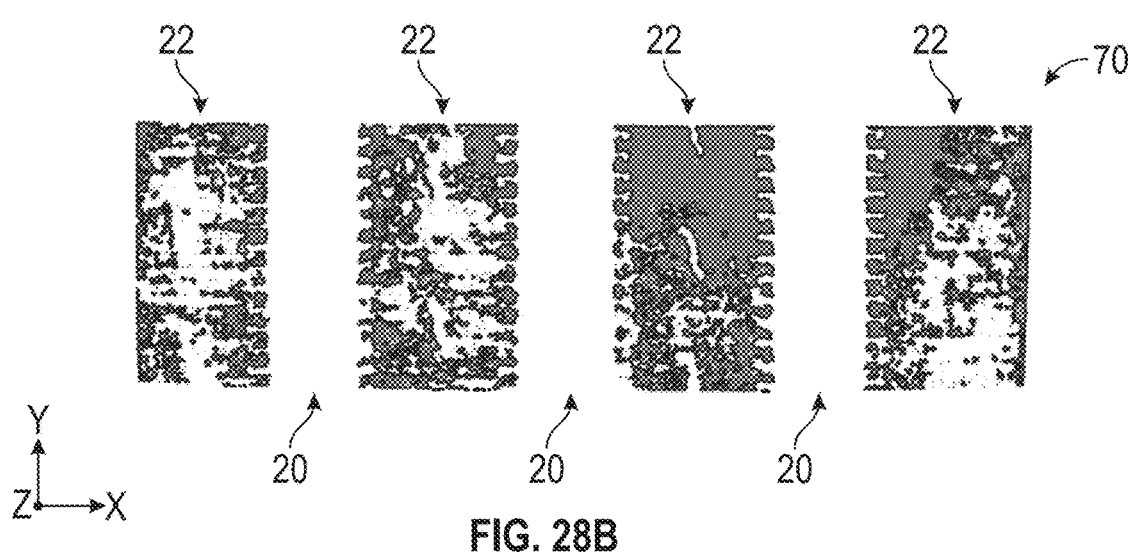
Figure 28C:
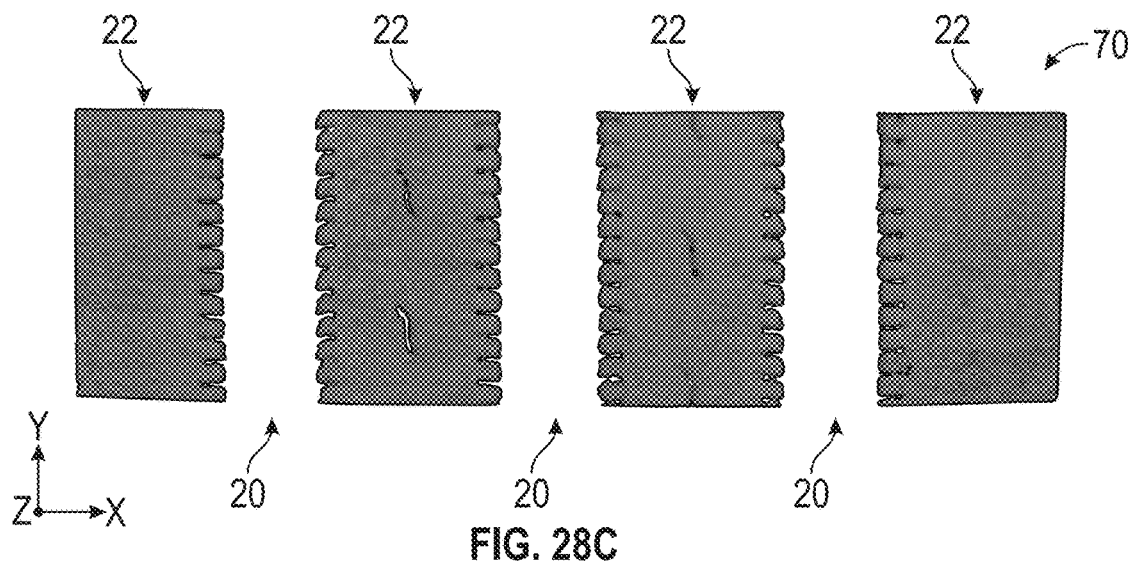

FIGS. 28A-28C illustrate an exemplary method of determining a metric scale for a tire swath 70 based on the distance between grooves of a real world tire, wherein both the tire swath and the real world tire are of substantially the same size (e.g., section width/aspect ratio/wheel diameter) and model.

The tire swath 70 is oriented such that circumferential centerline of the tire is generally symmetric in the YZ plane and crown (top) of the tire is aligned with the Z axis (e.g., as shown in FIGS. 23B-23F). Distance between the selected grooves 20 in both the swath 70 and the real world tire are measured in a consistent way and account for the various symmetries in the tire block and groove cycles as described herein. In some embodiments, distance may be based on maximum distance between the grooves 20, or minimum distance or average distance. In addition, in some embodiments, distance may be measured in a single axis (e.g. X axis) or across the surface of the tire. Deeper grooves 20 may be preferential over shallower grooves 20 as shape of the deeper grooves 20 may be easier to identify over the life of the tire. Widely separated grooves 20 may be preferential over more narrowly separated grooves 20 as the resulting distances measured between grooves 20 may provide a more consistent scale. In some embodiments, distance between grooves is measured in the X axis by averaging the distance of a series of latitudinal slices (across the tire), and starting at the deepest point of one circumferential outer groove 20 and ending at the deepest point of the other circumferential outer groove 20. Depth 88 of the groove 20 is measured as a way to segment groove 20 from protrusion 22 (i.e., block). One or more tentative grooves may be segmented from the one or more protrusions 22 (e.g., tread blocks) using, for example, void ratio as a guideline for where to initiate separation. Void ratio is a number indicating percentage of the surface of the tire that is grooved (i.e., not in contact with the road). Generally, segmentation may be such that the grooves 20 and the protrusions 22 are at a depth wherein shapes are each clearly defined as illustrated in FIGS. 28A-28C. FIG. 28A illustrates the tire swath 70. FIG. 28B illustrates segmentation of protrusions 22 from grooves 20 wherein threshold choice may misidentify one or more portion of the protrusions 22 as grooves 20. FIG. 28C illustrates an adjusted threshold of segmentation wherein the boundaries of the groove 20 and the protrusions 22 are separated and identified. Inverting the segmentation thresholds yields the actual grooves whereby the outer grooves can be sliced, deepest points can be sampled, and X distances between the deepest points of the outer grooves of the respective slices can be measured.

Figure 29A:
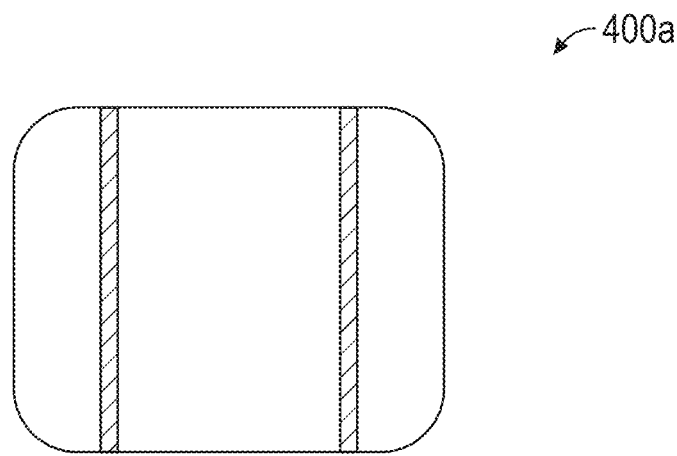
FIGS. 29A-29C illustrates exemplary patterns of tread on a tire.
Figure 29B:
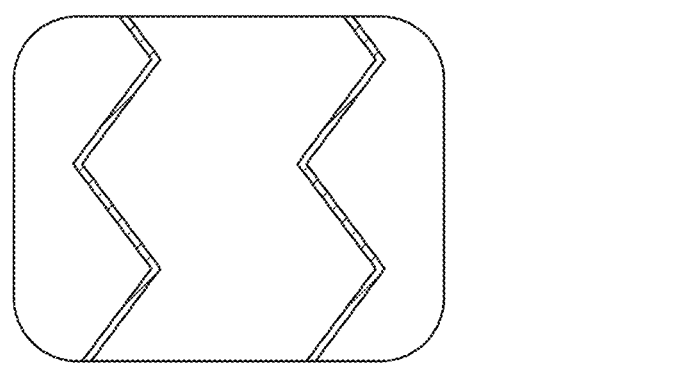
Figure 29C:
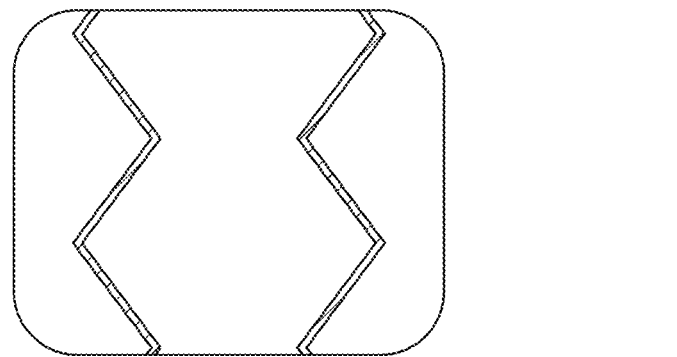

In some embodiments, determining distance between outer grooves consistently may include accounting for circumferential symmetry of the outer grooves. Referring to FIGS. 29A-29C, three sample patterns 400a-400c of tread are shown, respectively. The sample pattern 400a and 400b generally maintain uniform distance between outer grooves 20. The sample pattern 400c includes outer grooves 20 that are offset circumferentially. To account for the offset, one or more repeating cycles of one or more patterns may be determined with measurement of average distance within a repeating cycle providing distance between outer grooves 20.

Figure 30A:
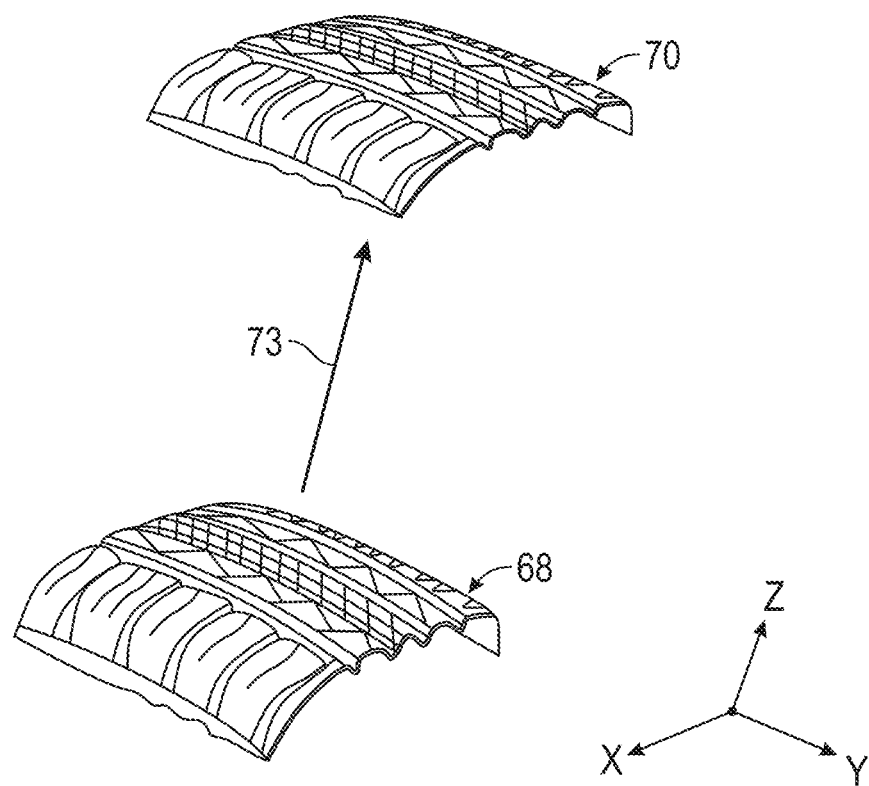
FIGS. 30A-30C illustrate an exemplary method for identifying circumferential wear in accordance with the present disclosure.
Figure 30B:
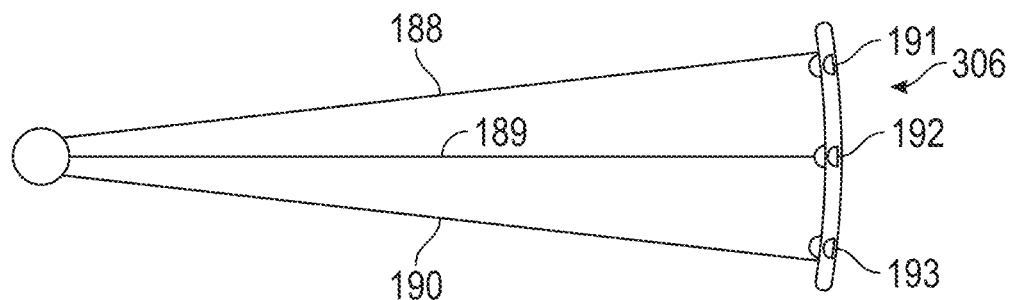
Figure 30C:
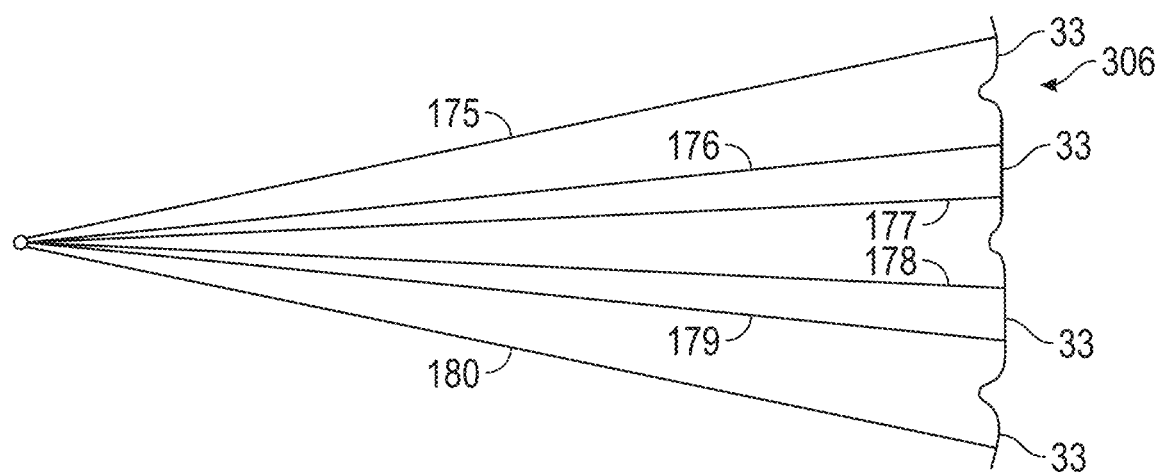

FIGS. 30A-30C illustrate an exemplary method for identifying circumferential wear on the tire swath 70. The tire swath 70 is provided as true-to-scale and oriented with respect to y and x axes as described herein. Referring to FIG. 30A, the tire swath 70 may be translated to a vector 73 in the z axes based on the radius of the tire. Referring to FIG. 30B, to assess circumferential wear across the swath 70, the swath 70 may be sliced with a series of planes in the ZY axes, such as slice 306 shown in FIG. 30B wherein a number of distances 188, 189 and 190 between the intersection of the x-axis to the surface of swath 191, 192, and 193 (excluding grooves), respectively, may be determined. Generally, distances to the surface of the swath 70 may be uniform in the absence of circumferential wear.

FIG. 30C illustrates an expanded view of an area about the swath 70, including slice 306 and distances 175, 176, 177, 178, 179, 180 from the x-axes to the protrusions 22. The flat shape of the block in the region of 176 and 177, as defined by the magnitude of the distances illustrates circumferential wear. Analysis of the wear pattern (flat block—illustrated as a bold line in FIG. 30C) may indicate a variety of causes including, for example, a skid, a failing brake system, or a dormant vehicle.

Depending on the cause, circumferential wear may manifest as an issue that repeats circumferentially around the tire (e.g. heel/toe wear) or non-circumferentially around the tire. In the latter situation, it is important that the tire swath 70 is captured at the circumferential position where the suspect wear is to be found.

FIGS. 31A-31F illustrate an exemplary method for measuring, visualizing and/or providing depth of one or more grooves 20 of one or more swaths 70 obtained from the three-dimensional mesh 71 (e.g., surface model) of the object 12 provided by the sensing system 14. The swath 70 is be true-to-scale and oriented with respect to y and z axes as described herein.

Figure 31A:
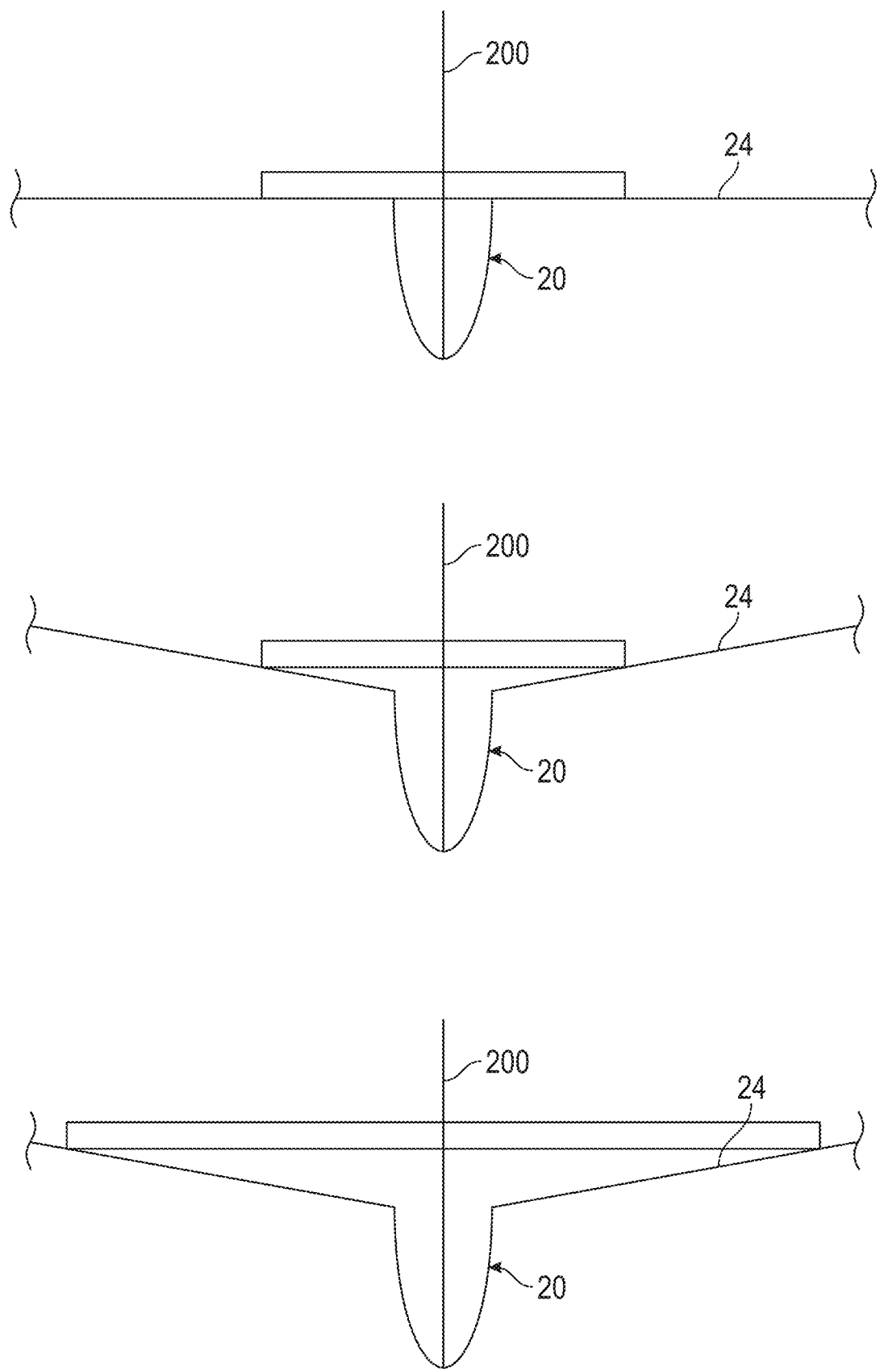
FIGS. 31A-31F illustrate an exemplary method for measuring, visualizing and/or providing depth of one or more grooves of one or more tire swaths obtained from a three dimensional mesh of an object in accordance with the present disclosure.

Generally, the method described in FIGS. 31A-31F provides a virtual tread depth gauge to model tread depth using geometric objects. Referring to FIG. 31A, a plurality of locations within the groove 20 may be sampled wherein a location may be an (x,y,z) point, for example. In some embodiments, the plurality of locations may be generated and/or selected via a user.

Figure 31B:
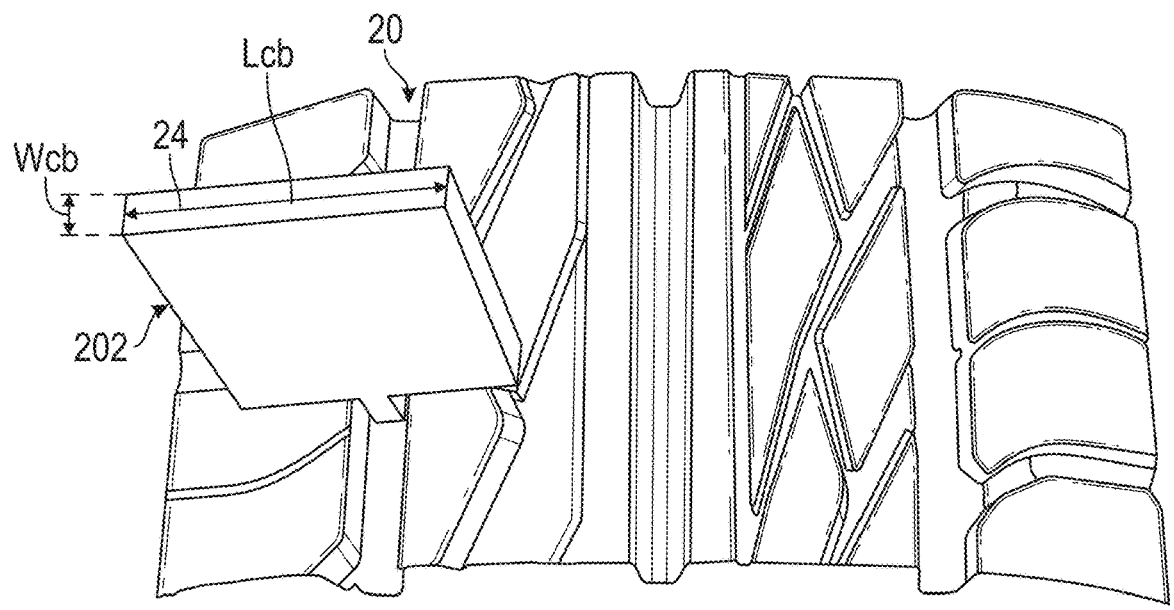
Figure 31C:
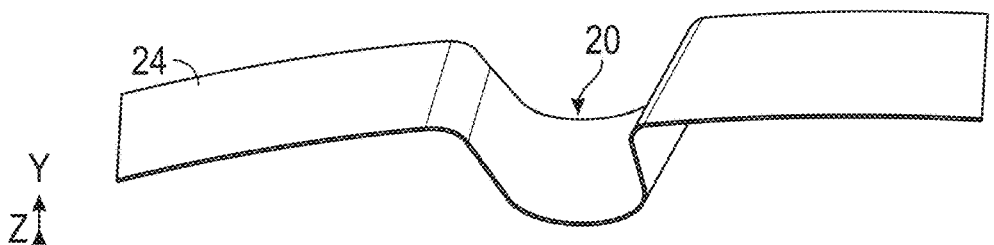

Referring to FIG. 31B, subsequent to orienting the groove 20 as described herein, a clipping box 202 of dimensions $W_{cb}$ (i.e., shorter dimension of real tread depth gauge) and $L_{cb}$ (longer dimension of real tread depth gauge plus widest section of the groove 20) may be used to extract a portion of the tire (i.e., groove 20 and surface 24) wherein depth of the groove 20 is to be sampled (shown in FIG. 31C).

Figure 31D:
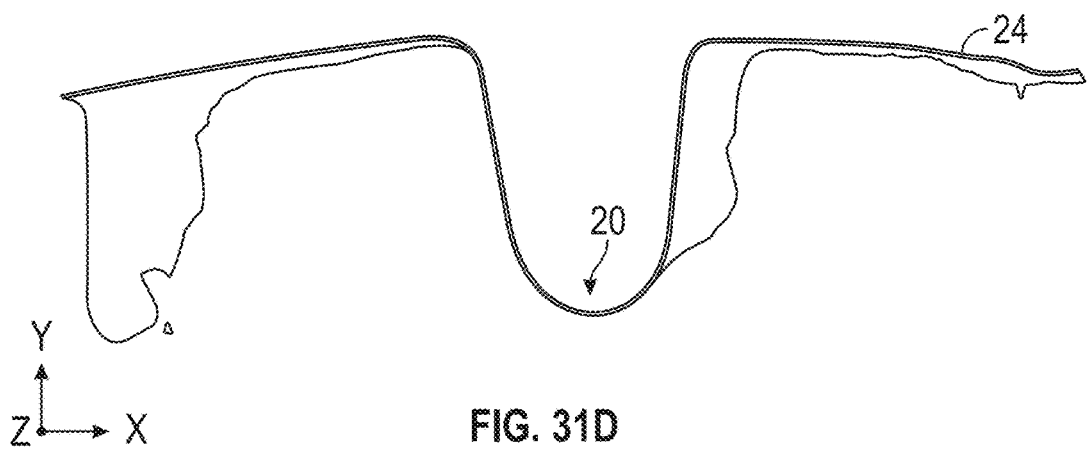

The clipped surface 24 of the groove 20 region is oriented with the convex hull of the groove (in this region) and the widest section of the groove (in this region). A plane P of short dimension $W_{tdg}$ and long dimension $L_{tdg}$ (corresponding to the dimension of the real tread depth gauge) may then be positioned from the Z-axis onto the tread until resting on both sides 210 and 212 of surface 24 defining the groove 20. (as shown in FIG. 31D).

Figure 31E:
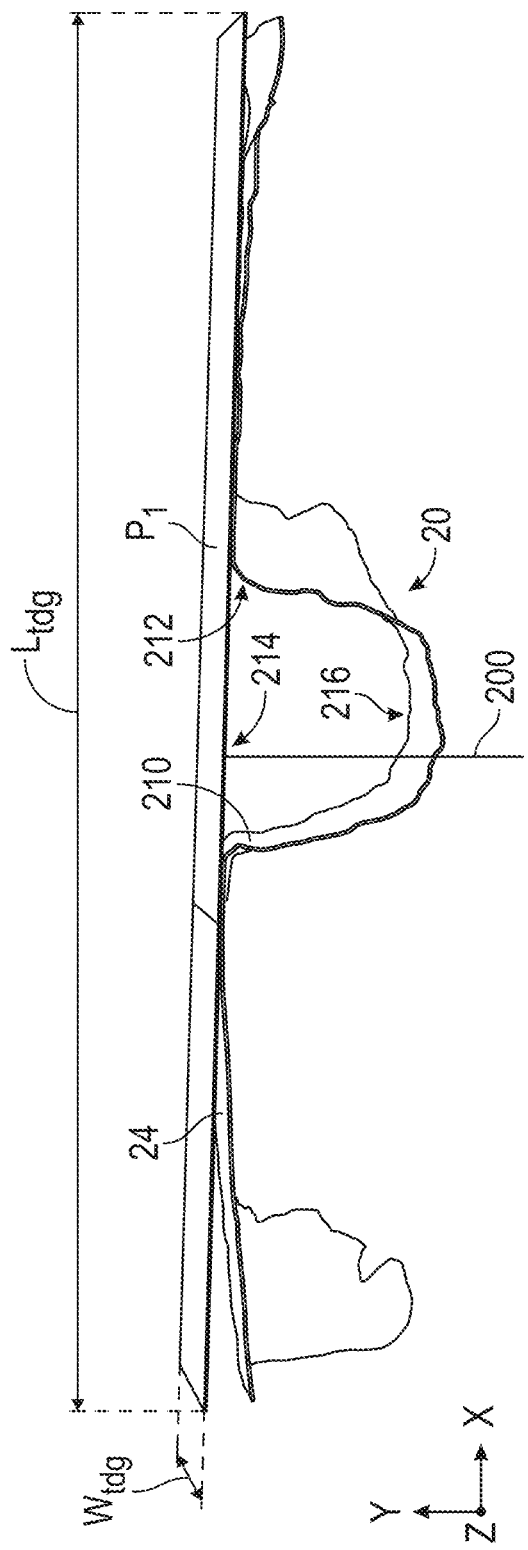
Figure 31F:
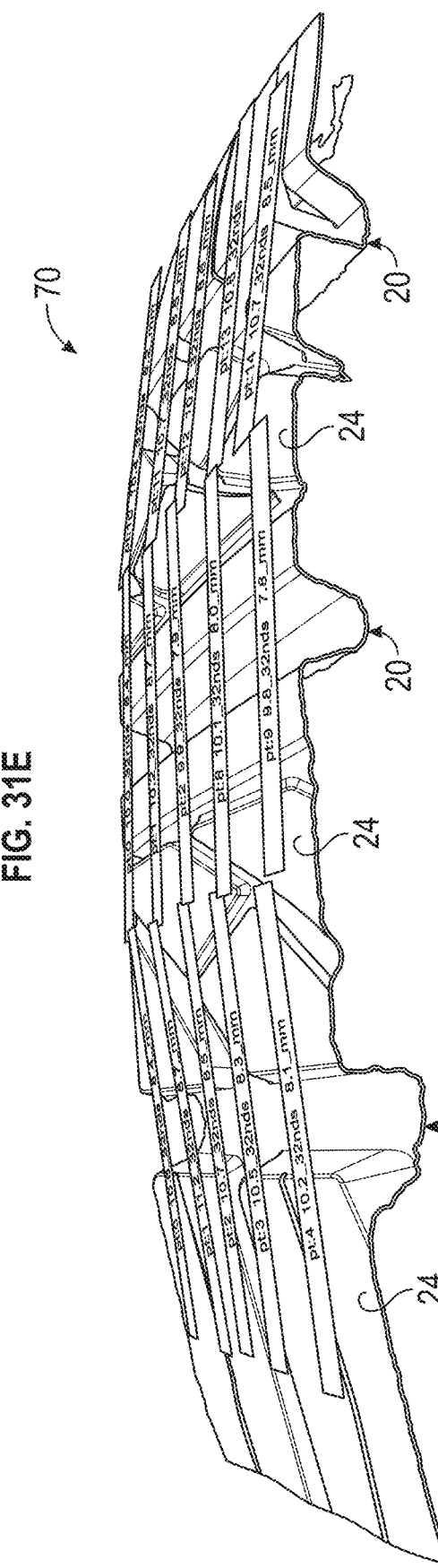

The plane P may first be lowered to a high point (e.g., on side 210) and then pivoted in the Y-axis until reaching a high point of the alternate surface (e.g., on side 212). Any method known within the art may be used to drop and/or project an object onto a surface. A line 200 representing the tread depth gauge probe may be positioned in the center of the plane P and orientated with the plane P as shown in FIG. 31E. The distance from a first side 214 of the probe needle to where the probe contacts the bottom of the surface 216 of the groove 20 may determine the tread depth of the groove 20. FIG. 31F illustrates results of tread depth gauge orientation and depth measurements of grooves 20.

In using a real tread gauge, generally, a location of the groove 20 of a tire is selected, the real tread gauge is slid across the widest portion of the groove 20 at the selected location, and the probe is iteratively depressed such that the measurement of depth (and maximum tread depth) is across the groove 20 at the selected location. Similarly, multiple locations (e.g., two or more) across the groove 20 may be sampled using methods described herein, such that a plane may be positioned at multiple probe points across the groove 20 to establish maximum groove depth.

Using the system and methods as described herein, one or more tire profiles may be determined. The tire profile may define one or more metrics for the tire including, but not limited to, squareness (underinflation), roundness (overinflation) and/or the like. By examining and comparing the defined tire profile using secondary scans, one or more diagnosis may be determined and one or more action items may be recommended. Further prior history (e.g., prior scans including the baseline scans and secondary scans) may be analyzed (e.g., in succession) and used to diagnosis and/or recommend one or more action items.

Referring to FIG. 1, once a diagnosis is made for the wear of the tread of the object 12, one or more reports may be provided to the user system 26. Reports may be one or more communications to the user system 26 identifying one or more actions based on the one or more diagnosis. Communications may be by text, e-mail, notification, and/or the like.

What is claimed is:

1. An automated tread analysis system, comprising:
 a sensing system having:
 a plurality of cameras providing a plurality of sequential two-dimensional images;
 an analysis system configured to provide at least one surface model of a first object via photogrammetry using the plurality of sequential two-dimensional images, the first object having at least one pattern with at least two grooves and at least one protrusion; and,
 a user system executing processing software operable to cause the user system to:
 read data corresponding to the at least one surface model of the first object, the surface model corresponding to a current condition of the first object;
 analyze the at least one surface model of the first object; and,
 provide at least one indicative wear metric or reference scale metric based on the analysis of the surface model of the first object;
 wherein the at least one surface model is oriented such that circumferential centerline of the first object is approximately symmetric to a YZ plane and top of the first object is approximately aligned with Z axis in a Cartesian coordinate system.

2. The automated tread analysis system of claim 1, wherein the at least one indicative wear metric or reference scale metric is based on empirical or engineered dimensional relationships of a specific tire to construct a metric surface model from the at least one surface model of the first object.

3. The automated tread analysis system of claim 2, wherein the metric surface model is constructed from at least one surface model of the first object using distance between grooves.

4. The automated tread analysis system of claim 3, wherein the metric surface model is constructed from at least one surface model of the first object using distance between circumferential grooves.

5. The automated tread analysis system of claim 4, wherein the metric surface model is constructed from at least one surface model of the first object using distance between circumferential outer grooves.

6. The automated tread analysis system of claim 5, wherein the at least one wear metric includes circumferential wear.

7. The automated tread analysis system of claim 1, wherein the at least one wear metric includes circumferential wear.

8. The automated tread analysis system of claim 7, wherein the first object is a tire and the processing software executed by the user system further analyzes circumferential wear providing at least one report identifying repeating circumferential wear of the tire.

9. The automated tread analysis system of claim 7, wherein the first object is a tire and the processing software executed by the user system further analyzes circumferential wear providing at least one report identifying non-repeating circumferential wear of the tire.

10. The automated tread analysis system of claim 7, wherein the first object is a tire having a swath and wherein providing circumferential wear further includes identifying at least one plane in the ZY axis of the swath and determining distance of the at least one plane from intersection of the X axis to surface of the swath.

11. A method, comprising:
providing at least one surface model of a tire via photogrammetry using a plurality of sequential two-dimensional images, the tire having a crown and at least one pattern with at least two grooves and at least one protrusion;
receiving data corresponding to the at least one surface model of the tire, the surface model corresponding to a current condition of the tire;
analyzing the at least one surface model of the tire; and,
providing circumferential wear analysis based on the at least one surface model of the tire;
wherein the at least one surface model is oriented such that circumferential centerline of the tire is approximately symmetric to a YZ plane and the crown is approximately aligned with Z axis in a Cartesian coordinate system.

12. The method of claim 11, wherein analyzing the at least one surface model of the tire, further includes:
analyzing empirical or engineered dimensional relationships of a specific tire to construct a metric surface model from the at least one surface model of the tire wherein the metric surface model is constructed from at least one surface model of the tire using distance between grooves.

13. The method of claim 11, further comprising the step of analyzing circumferential wear of the tire to provide at least one report identifying repeating circumferential wear of the tire.

14. The method of claim 11, further comprising the step of analyzing circumferential wear providing at least one report identifying non-repeating circumferential wear of the tire.

15. An automated tread analysis system, comprising:
a sensing system having:
a plurality of cameras providing a plurality of sequential two-dimensional images;
an analysis system configured to provide at least one surface model of an object via photogrammetry using the plurality of sequential two-dimensional images, the object having at least one pattern with at least one groove and at least one protrusion; and,
a user system and executing processing software reading:
data corresponding to the at least one surface model of the object, the surface model corresponding to a current condition of the object;
analyzing the at least one surface model of the object to determine a plurality of sampling locations within the at least one groove;
determining orientation and width of the at least one groove; and,
providing groove depth of the at least one groove using the orientation and width of the at least one groove.

16. The automated analysis system of claim 15, wherein providing groove depth further includes clipping at least one region of the groove, positioning a plane resting on each side defining the groove, and determining minimum distance between the plane and surface of the groove.

17. The automated analysis system of claim 16, wherein a line representing tread depth gauge probe may have a first end and a second end, the first end positioned at center of the plane and the second end intersecting the surface of the groove, wherein distance of the line from the first end to the second end is depth of the groove.

18. The automated analysis system of claim 17, wherein maximum depth of the groove is determined from analysis of multiple distance lines.

* * * * *

UNITED STATES PATENT AND TRADEMARK OFFICE
CERTIFICATE OF CORRECTION

| | |
|---|---|
| PATENT NO. | : 11,472,234 B2 |
| APPLICATION NO. | : 16/983743 |
| DATED | : October 18, 2022 |
| INVENTOR(S) | : Jack M. Zoken and Alper Yilmaz |

It is certified that error appears in the above-identified patent and that said Letters Patent is hereby corrected as shown below:

In the Specification

Column 11, Line 45: Delete "ATs" and replace with -- $A_{TS}$ --

Column 11, Line 47: Delete "ATs" and replace with -- $A_{TS}$ --

Column 13, Line 60: Delete both instances of "20am" and replace with -- 20a, --

Signed and Sealed this
Fourteenth Day of February, 2023

Katherine Kelly Vidal
*Director of the United States Patent and Trademark Office*